(12) United States Patent
Penilla et al.

(10) Patent No.: US 9,648,107 B1
(45) Date of Patent: May 9, 2017

(54) METHODS AND CLOUD SYSTEMS FOR USING CONNECTED OBJECT STATE DATA FOR INFORMING AND ALERTING CONNECTED VEHICLE DRIVERS OF STATE CHANGES

(71) Applicants: Angel A. Penilla, Sacramento, CA (US); Albert S. Penilla, Sunnyvale, CA (US)

(72) Inventors: Angel A. Penilla, Sacramento, CA (US); Albert S. Penilla, Sunnyvale, CA (US)

( * ) Notice: Subject to any disclaimer, the term of this patent is extended or adjusted under 35 U.S.C. 154(b) by 163 days.

(21) Appl. No.: 14/338,636

(22) Filed: Jul. 23, 2014

Related U.S. Application Data

(63) Continuation-in-part of application No. 14/275,569, filed on May 12, 2014, now Pat. No. 9,467,515, which is a continuation of application No. 13/784,823, filed on Mar. 5, 2013, now Pat. No. 9,285,944, application No. 14/338,636, which is a continuation-in-part of application No. 13/842,158, filed on Mar. 15, 2013, now Pat. No. 9,229,905, application No. 14/338,636, which is a continuation-in-part of application No. 13/452,882, filed on Apr. 22, 2012, now Pat. No. 9,123,035.

(60) Provisional application No. 61/745,729, filed on Dec. 24, 2012, provisional application No. 61/478,436, filed on Apr. 22, 2011.

(51) Int. Cl.
*H02J 7/00* (2006.01)
*H04L 29/08* (2006.01)

(52) U.S. Cl.
CPC .............. *H04L 67/12* (2013.01); *H04L 67/18* (2013.01)

(58) Field of Classification Search
CPC ......... H04L 67/12; H04L 67/18; Y02T 90/14; Y02T 10/7005; Y02T 90/128; Y02T 10/7088; Y02T 90/163
USPC ......................................................... 320/109
See application file for complete search history.

(56) References Cited

U.S. PATENT DOCUMENTS

| | | | |
|---|---|---|---|
| 3,690,397 A | 9/1972 | Parker |
| 3,799,063 A | 3/1974 | Reed |
| 3,867,682 A | 2/1975 | Ohya |
| 4,052,655 A | 10/1977 | Vizza |

(Continued)

*Primary Examiner* — Arun Williams

(57) ABSTRACT

Methods and systems are provided. One method includes receiving geo-locations of a vehicle and identifying heading direction of the vehicle based on changes in the geo-locations of the vehicle. The method may also include, in some examples, receiving sensor data for a surrounding area of the vehicle. The method includes receiving state information from a connected object that is located within an area of influence associated with a current geo-location of the vehicle and sending an alert to the vehicle when the vehicle is at the current geo-location. In one example, the alert is sent upon determining that the state information changed while the current geo-location of the vehicle remains unchanged for a threshold period of time after the state information changed. In various examples, methods, systems and infrastructure for enabling connected vehicles to communicate with cloud services and with other vehicles or connected objects are provided. Alerts can be in the form of notifications, messages, changes to display screens, presentation of color indicators on display screens, instructions to cause or communicate tactile feedback, and/or audio alerts and combinations thereof.

21 Claims, 39 Drawing Sheets

(56) References Cited

U.S. PATENT DOCUMENTS

| | | |
|---|---|---|
| 4,102,273 A | 7/1978 | Merkle et al. |
| 4,132,174 A | 1/1979 | Ziegenfus et al. |
| 4,162,445 A | 7/1979 | Campbell |
| 4,309,644 A | 1/1982 | Reimers |
| 4,347,472 A | 8/1982 | Lemelson |
| 4,383,210 A | 5/1983 | Wilkinson |
| 4,389,608 A | 6/1983 | Dahl et al. |
| 4,405,891 A | 9/1983 | Galloway |
| 4,433,278 A | 2/1984 | Lowndes et al. |
| 4,450,400 A | 5/1984 | Gwyn |
| 4,532,418 A | 7/1985 | Meese |
| 4,789,047 A | 12/1988 | Knobloch |
| 4,815,840 A | 3/1989 | Benayad-Cherif et al. |
| 5,049,802 A | 9/1991 | Mintus et al. |
| 5,121,112 A | 6/1992 | Nakadozono |
| 5,132,666 A | 7/1992 | Fahs |
| 5,184,058 A | 2/1993 | Hesse |
| 5,202,617 A | 4/1993 | Nor |
| 5,297,664 A | 3/1994 | Tseng et al. |
| 5,306,999 A | 4/1994 | Hoffman |
| 5,315,227 A | 5/1994 | Pierson |
| 5,327,066 A | 7/1994 | Smith |
| 5,343,970 A | 9/1994 | Severinsky |
| 5,422,624 A | 6/1995 | Smith |
| 5,434,781 A | 7/1995 | Alofs |
| 5,441,122 A | 8/1995 | Yoshida |
| 5,449,995 A | 9/1995 | Kohchi |
| 5,487,002 A | 1/1996 | Diller et al. |
| 5,488,283 A | 1/1996 | Dougherty et al. |
| 5,492,190 A | 2/1996 | Yoshida |
| 5,548,200 A | 8/1996 | Nor et al. |
| 5,549,443 A | 8/1996 | Hammerslag |
| 5,555,502 A | 9/1996 | Opel |
| 5,563,491 A | 10/1996 | Tseng |
| 5,585,205 A | 12/1996 | Kohchi |
| 5,594,318 A | 1/1997 | Knor |
| 5,595,271 A | 1/1997 | Tseng |
| 5,596,258 A | 1/1997 | Kimura et al. |
| 5,612,606 A | 3/1997 | Guimarin et al. |
| 5,627,752 A | 5/1997 | Buck et al. |
| 5,636,145 A | 6/1997 | Gorman et al. |
| 5,642,270 A | 6/1997 | Green et al. |
| 5,666,102 A | 9/1997 | Lahiff |
| 5,691,695 A | 11/1997 | Lahiff |
| 5,694,019 A | 12/1997 | Uchida et al. |
| 5,701,706 A | 12/1997 | Kreysler et al. |
| 5,736,833 A | 4/1998 | Farris |
| 5,760,569 A | 6/1998 | Chase, Jr. |
| 5,778,326 A | 7/1998 | Moroto et al. |
| 5,790,976 A | 8/1998 | Boll et al. |
| 5,892,598 A | 4/1999 | Asakawa et al. |
| 5,916,285 A | 6/1999 | Alofs et al. |
| 5,974,136 A | 10/1999 | Murai |
| 5,998,963 A | 12/1999 | Aarseth |
| 6,014,597 A | 1/2000 | Kochanneck |
| 6,049,745 A | 4/2000 | Douglas et al. |
| 6,067,008 A | 5/2000 | Smith |
| 6,081,205 A | 6/2000 | Williams |
| 6,085,131 A | 7/2000 | Kim |
| 6,151,539 A | 11/2000 | Bergholz et al. |
| 6,175,789 B1 | 1/2001 | Beckert et al. |
| 6,225,776 B1 | 5/2001 | Chai |
| 6,234,932 B1 | 5/2001 | Kuroda et al. |
| 6,236,333 B1 | 5/2001 | King |
| 6,252,380 B1 | 6/2001 | Koenck |
| 6,301,531 B1 | 10/2001 | Pierro |
| 6,307,349 B1 | 10/2001 | Koenck |
| 6,330,497 B1 | 12/2001 | Obradovich et al. |
| 6,330,499 B1 | 12/2001 | Chou et al. |
| 6,370,475 B1 | 4/2002 | Breed et al. |
| 6,373,380 B1 | 4/2002 | Robertson et al. |
| 6,416,209 B1 | 7/2002 | Abbott |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi |
| 6,487,477 B1 | 11/2002 | Woestmanm et al. |
| 6,498,454 B1 | 12/2002 | Pinlam |
| 6,511,192 B1 | 1/2003 | Henion |
| 6,586,866 B1 | 7/2003 | Ikedo |
| 6,614,204 B2 | 9/2003 | Pellegrino et al. |
| 6,629,024 B2 | 9/2003 | Tabata |
| 6,727,809 B1 | 4/2004 | Smith |
| 6,741,036 B1 | 5/2004 | Ikedo |
| 6,765,495 B1 | 7/2004 | Dunning et al. |
| 6,789,733 B2 | 9/2004 | Terranova |
| 6,794,849 B2 | 9/2004 | Mori et al. |
| 6,850,898 B1 | 2/2005 | Murakami |
| 6,915,869 B2 | 7/2005 | Botti |
| 6,922,629 B2 | 7/2005 | Yoshikawa et al. |
| 6,937,140 B1 | 8/2005 | Outslay |
| 6,940,254 B2 | 9/2005 | Nagamine |
| 7,013,205 B1 | 3/2006 | Hafner |
| 7,039,389 B2 | 5/2006 | Johnson, Jr. |
| 7,084,781 B2 | 8/2006 | Chuey |
| 7,201,384 B2 | 4/2007 | Chaney |
| 7,269,416 B2 | 9/2007 | Guthrie et al. |
| 7,289,611 B2 | 10/2007 | Iggulden |
| 7,376,497 B2 | 5/2008 | Chen |
| 7,379,541 B2 | 5/2008 | Iggulden et al. |
| 7,402,978 B2 | 7/2008 | Pryor |
| 7,532,965 B2 | 5/2009 | Robillard |
| 7,565,396 B2 | 7/2009 | Hoshina |
| 7,630,802 B2 | 12/2009 | Breed |
| 7,650,210 B2 | 1/2010 | Breed |
| 7,674,536 B2 | 3/2010 | Chipchase |
| 7,683,771 B1 | 3/2010 | Loeb |
| 7,693,609 B2 | 4/2010 | Kressner et al. |
| 7,698,078 B2 | 4/2010 | Kelty et al. |
| 7,740,092 B2 | 6/2010 | Bender |
| 7,751,945 B2 | 7/2010 | Obata |
| 7,778,746 B2 | 8/2010 | McLeod et al. |
| 7,796,052 B2 | 9/2010 | Katz |
| 7,850,351 B2 | 12/2010 | Pastrick et al. |
| 7,869,576 B1 | 1/2011 | Rodkey et al. |
| 7,885,893 B2 | 2/2011 | Alexander |
| 7,949,435 B2 | 5/2011 | Pollack |
| 7,956,570 B2 | 6/2011 | Lowenthal |
| 7,979,198 B1 | 7/2011 | Kim et al. |
| 7,986,126 B1 | 7/2011 | Bucci |
| 7,991,665 B2 | 8/2011 | Hafner |
| 8,006,793 B2 | 8/2011 | Heichal et al. |
| 8,027,843 B2 | 9/2011 | Bodin et al. |
| 8,036,788 B2 | 10/2011 | Breed |
| 8,054,048 B2 | 11/2011 | Woody |
| 8,072,318 B2 | 12/2011 | Lynam |
| 8,103,391 B2 | 1/2012 | Ferro et al. |
| 8,256,553 B2 | 9/2012 | De Paschoal |
| 8,262,268 B2 | 9/2012 | Pastrick et al. |
| 8,265,816 B1 | 9/2012 | LaFrance |
| 8,266,075 B2 | 9/2012 | Ambrosio et al. |
| 8,294,420 B2 | 10/2012 | Kocher |
| 8,333,492 B2 | 12/2012 | Dingman et al. |
| 8,336,664 B2 | 12/2012 | Wallace et al. |
| 8,350,526 B2 | 1/2013 | Dyer et al. |
| 8,366,371 B2 | 2/2013 | Maniscalco et al. |
| 8,392,065 B2 | 3/2013 | Tolstedt |
| 8,405,347 B2 | 3/2013 | Gale |
| 8,482,255 B2 | 7/2013 | Crombez |
| 8,483,775 B2 | 7/2013 | Buck et al. |
| 8,483,907 B2 | 7/2013 | Tarte |
| 8,490,005 B2 | 7/2013 | Tarte |
| 8,508,188 B2 | 8/2013 | Murtha et al. |
| 8,521,599 B2 | 8/2013 | Rivers, Jr. et al. |
| 8,527,135 B2 | 9/2013 | Lowrey et al. |
| 8,527,146 B1 | 9/2013 | Jackson |
| 8,552,686 B2 | 10/2013 | Jung |
| 8,589,019 B2 | 11/2013 | Wallace et al. |
| 8,624,719 B2 | 1/2014 | Klose |
| 8,630,741 B1 | 1/2014 | Matsuoka et al. |
| 8,635,091 B2 | 1/2014 | Amigo |
| 8,643,329 B2 | 2/2014 | Prosser et al. |
| 8,660,734 B2 | 2/2014 | Zhu et al. |
| 8,686,864 B2 | 4/2014 | Hannon |

(56) References Cited

U.S. PATENT DOCUMENTS

| | | |
|---|---|---|
| 8,694,328 B1 | 4/2014 | Gormley |
| 8,706,394 B2 | 4/2014 | Trepagnier et al. |
| 8,713,121 B1 | 4/2014 | Bain |
| 8,717,170 B1 | 5/2014 | Juhasz |
| 8,725,551 B2 | 5/2014 | Ambrosio et al. |
| 8,751,065 B1 | 6/2014 | Kato |
| 8,751,271 B2 | 6/2014 | Stefik et al. |
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B2 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |
| 8,836,281 B2 | 9/2014 | Ambrosio et al. |
| 2002/0064258 A1 | 5/2002 | Schelberg et al. |
| 2002/0085043 A1 | 7/2002 | Ribak |
| 2002/0133273 A1 | 9/2002 | Lowrey et al. |
| 2003/0137277 A1 | 7/2003 | Mori et al. |
| 2003/0153278 A1 | 8/2003 | Johnson |
| 2003/0205619 A1 | 11/2003 | Terranova et al. |
| 2003/0234325 A1 | 12/2003 | Marino et al. |
| 2004/0046506 A1 | 3/2004 | Mawai et al. |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0181334 A1* | 9/2004 | Blumbergs ............. G01C 21/26 701/538 |
| 2004/0265671 A1 | 12/2004 | Chipchase et al. |
| 2005/0021190 A1 | 1/2005 | Worrell et al. |
| 2005/0044245 A1 | 2/2005 | Hoshina |
| 2005/0200500 A1* | 9/2005 | Wing ................ G08G 1/09623 340/907 |
| 2005/0231119 A1 | 10/2005 | Ito et al. |
| 2006/0125620 A1 | 6/2006 | Smith et al. |
| 2006/0182241 A1 | 8/2006 | Schelberg |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0203973 A1 | 8/2008 | Gale et al. |
| 2008/0228613 A1 | 9/2008 | Alexander |
| 2008/0281663 A1 | 11/2008 | Hakim |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0030712 A1 | 1/2009 | Bogolea |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1* | 3/2009 | Agassi ................. B60L 3/12 701/532 |
| 2009/0091291 A1 | 4/2009 | Woody et al. |
| 2009/0092864 A1 | 4/2009 | McLean |
| 2009/0112382 A1* | 4/2009 | Treharne ............. B60K 26/021 701/22 |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0004856 A1* | 1/2010 | Kobori ................. G01S 19/48 701/532 |
| 2010/0013434 A1 | 1/2010 | Taylor-Haw et al. |
| 2010/0017045 A1 | 1/2010 | Nesler et al. |
| 2010/0017249 A1 | 1/2010 | Fincham et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0057306 A1 | 3/2010 | Ishii et al. |
| 2010/0112843 A1 | 5/2010 | Heichal et al. |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |
| 2010/0198513 A1 | 8/2010 | Zeng |
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |
| 2011/0032110 A1 | 2/2011 | Taguchi |
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |
| 2011/0112969 A1 | 5/2011 | Zaid et al. |
| 2011/0130885 A1 | 6/2011 | Bowen et al. |
| 2011/0187521 A1 | 8/2011 | Beruscha et al. |
| 2011/0191265 A1 | 8/2011 | Lowenthal et al. |
| 2011/0193522 A1 | 8/2011 | Uesugi |
| 2011/0202218 A1 | 8/2011 | Yano |
| 2011/0246252 A1 | 10/2011 | Uesugi |
| 2011/0279083 A1 | 11/2011 | Asai |
| 2011/0309929 A1 | 12/2011 | Myers |
| 2012/0013300 A1 | 1/2012 | Prosser et al. |
| 2012/0019204 A1 | 1/2012 | Matsuo |
| 2012/0025765 A1 | 2/2012 | Frey et al. |
| 2012/0028680 A1 | 2/2012 | Breed |
| 2012/0041624 A1 | 2/2012 | Stewart et al. |
| 2012/0053754 A1 | 3/2012 | Pease |
| 2012/0074903 A1 | 3/2012 | Nakashima |
| 2012/0105197 A1 | 5/2012 | Kobres |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158244 A1 | 6/2012 | Talty et al. |
| 2012/0179323 A1 | 7/2012 | Profitt-Brown et al. |
| 2012/0203427 A1* | 8/2012 | Ehlgen ................. B60Q 1/085 701/36 |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |

(56) References Cited

U.S. PATENT DOCUMENTS

| | | |
|---|---|---|
| 2013/0021162 A1 | 1/2013 | DeBoer et al. |
| 2013/0037339 A1 | 2/2013 | Hickox |
| 2013/0099892 A1 | 4/2013 | Trucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0127247 A1 | 5/2013 | Oh et al. |
| 2013/0135093 A1 | 5/2013 | Araki |
| 2013/0144520 A1 | 6/2013 | Ricci |
| 2013/0145065 A1 | 6/2013 | Ricci |
| 2013/0179057 A1 | 7/2013 | Fisher et al. |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0280018 A1 | 10/2013 | Meirer et al. |
| 2013/0300554 A1 | 11/2013 | Braden |
| 2013/0317693 A1 | 11/2013 | Jefferies et al. |
| 2013/0317694 A1 | 11/2013 | Merg et al. |
| 2013/0328387 A1 | 12/2013 | Venkateswaran |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1 | 1/2014 | McCool |
| 2014/0042968 A1 | 2/2014 | Hiroe |
| 2014/0047107 A1 | 2/2014 | Maturana et al. |
| 2014/0066049 A1 | 3/2014 | Cho et al. |
| 2014/0089016 A1 | 3/2014 | Smullin et al. |
| 2014/0106726 A1 | 4/2014 | Crosbie |
| 2014/0118107 A1 | 5/2014 | Almomani |
| 2014/0120829 A1 | 5/2014 | Bhamidipati et al. |
| 2014/0125355 A1 | 5/2014 | Grant |
| 2014/0142783 A1 | 5/2014 | Grimm et al. |
| 2014/0163771 A1 | 6/2014 | Demeniuk |
| 2014/0163774 A1 | 6/2014 | Demeniuk |
| 2014/0164559 A1 | 6/2014 | Demeniuk |
| 2014/0172192 A1 | 6/2014 | Kato |
| 2014/0172265 A1 | 6/2014 | Funabashi |
| 2014/0172727 A1 | 6/2014 | Abhyanker et al. |
| 2014/0179353 A1 | 6/2014 | Simon |
| 2014/0200742 A1 | 7/2014 | Mauti et al. |
| 2014/0203077 A1 | 7/2014 | Gadh et al. |
| 2014/0207333 A1 | 7/2014 | Vandivier et al. |
| 2014/0214261 A1 | 7/2014 | Ramamoorthy et al. |
| 2014/0214321 A1 | 7/2014 | Kawamata et al. |
| 2014/0218189 A1 | 8/2014 | Fleming et al. |
| 2014/0232331 A1 | 8/2014 | Stamenic et al. |
| 2014/0236414 A1 | 8/2014 | Droz et al. |
| 2014/0236463 A1 | 8/2014 | Zhang et al. |
| 2014/0253018 A1 | 9/2014 | Kong et al. |
| 2014/0277936 A1 | 9/2014 | El Dokor et al. |
| 2014/0278089 A1 | 9/2014 | Gusikhin et al. |
| 2014/0300739 A1 | 10/2014 | Mimar |

\* cited by examiner

Manufacturer API 130
Class:
HVAC

1950

1954 — Data declarations:
currentTempLeft = 60
currentTempRight = 70
StatusAC = True
isAuto = True
isDual = True
displaySkin = modern
scheduleAMtemp(time)
learnedTemp1 = 74
learnedTemp1Time = 803am
learnedTemp1Days = MTWTHF
learnedTemp2 = 60
learnedTemp2Time = 513pm
learnedTemp2Days = MTWTHF
learnedTemp2AC = on
IcePresent = false
fastefrostMode = off
Errors = false 1956 — Function Declarations
updateTemp(left,right);
getTempRight(temp);
getTempLeft(temp);
setTempLeft(temp);
setTempLeft(temp);
toggleAC();
toggleAuto();
toggleDual();
toggleSkin(skinID);
scheduleAMTemp(temp, time, date, frequency);
schedulePMTemp(temp,time,date,frequency);
learnTempBackgroundRoutine(temp, time, date, frequency);
updateDisplay()

104
↘EZ FUN HVAC APP
1972
↘updateTemp(80,76);
{
    setLeftTo = 80;
    setRightTo = 76;
    theCurrentTempR = getTempRight(temp);
    theCurrenTempL = getTempLeft(temp);
    if setLeftTo != theCurrentTempL
    {
        setTempLeft(left);
    }
    if setRightTo != theCurrentTempR
    {
        setTempRight(right);
    }
    updateDisplay()

If isError()
    {
        return isError();
    }

Learned Behavior Vehicle Application

Past Actions Data

Average for a Monday in December
Engine start: 803am
Fuel level range: 50 miles
Temp in vehicle at start: 32F
Heat set to after vehicle start: 75F
Ice present on windshield: yes
Defrost activated: yes
How long between defrost process and vehicle moving: 7 minutes
Vehicle depart time: 810am
AC set to after vehicle start: NA
Miles driven at vehicle shut off: 15 miles
Engine start: 505PM
Fuel level range: 35 miles
Temp in vehicle at start: 76F
Heat Set to after vehicle start: NA
AC set to after vehicle start: 65F
Time to reach 65F: 4 minutes
Miles Driven at vehicle shut off: 15 miles

Average for a Tuesday in December
Engine start: 805am
Fuel level range: 20 miles
Temp in vehicle at start: 30F
Heat set to after vehicle start: 80F
Ice present on windshield: yes
Defrost activated: yes
How long between defrost process and vehicle moving: 7 minutes
Vehicle depart time: 812am
AC set to after vehicle start: NA
Miles driven at vehicle shut off: 18 miles
Engine start: 510PM
Fuel level range: 5 miles
Temp in vehicle at start: 78F
Heat Set to after vehicle start: NA
AC set to after vehicle start: 65F
Time to reach 65F: 5 minutes
Miles Driven at vehicle shut off: 15 miles

Past Actions Data

Average for a Saturday in December
Engine start: 12:15PM
Fuel level range: 40 miles
Temp in vehicle at start: 65F
Heat set to after vehicle start: NA
Ice present on windshield: no
Defrost activated: no
How long between defrost process and vehicle moving: NA
Vehicle depart time: 12:16PM
AC set to after vehicle start: NA
Miles driven at vehicle shut off: 5 miles
Engine start: 12:28PM
Fuel level range: 35 miles
Temp in vehicle at start: 65F
Heat Set to after vehicle start: NA
AC set to after vehicle start: NA
Time to reach NAF: NA
Miles Driven at vehicle shut off: 5 miles

Learned Behavior Vehicle Application

<u>Learned Behavior Logic Assumptions and Deductive Reasoning</u>

Check the user's calendar and adjust assumptions based on when the first meeting is, the meeting's location, how long it will take to get the vehicle's temperature and defrosting if applicable completed and if the user needs to re-fuel before arriving at work.

User most likely will start the engine between 803am and 805am

If the temperature is in the 30s inside the vehicle, the user will most likely heat the vehicle to the mid 70s to 80 degrees. Also the user is not likely to use the AC.

If there is ice present on the windshield, the user will most likely activate defrosting measures for 7 minutes before departure.

User usually drives between 15 and 18 miles

The user usually starts the vehicle in the afternoon between 5:05 and 5:10PM

If the temperature is in the mid 70s, the user usually activates the AC to achieve a temperature of 65 degrees The user is normally comfortable on Saturdays when the temperature in the vehicle is 65 degrees. No advance cooling or heating required. The usually makes frequent stops on Saturday and may benefit from route prioritization apps and Gas/Time saving routes, fuel stations, sponsored paths etc.

Learned Behavior Vehicle Application

Potential Actions using Logic & Past Data

Vehicle Learning App Decisions:

Tuesday PM:
The user will most likely need to drive ~16.5 miles on Wednesday morning but only has a range of 5 miles. Email and or text the user that they will need extra time to get to work in the morning due to re-fueling and that the vehicle will be auto starting 12 minutes earlier than usual. Confirm decision is ok with the user.

Wednesday AM:
Vehicle is usually started at ~804am and defrosted for 7 minutes when ice is present and usually departs at 811am, but the user needs 12 minutes to refuel. Start vehicle at 752am and defrost until 759am while heating to 77F because when the temperature is 34F like today inside the vehicle, the user likes the temperature to be about 77F. Set the user's ratio station to 102.5, the most commonly listened to station at this time. Display stock information for the most commonly queries stocks at this time. Check most common commute route in and make sure there aren't delays, else suggest a new route in advance. The user typically goes to coffee on the way to work. Launch the nearest Starbucks coffee location APP. The user usually "one button touch" orders and pays for a medium coffee. Directly from the app.

Friday PM:
Tell the user Saturdays are normally full of errands. Suggest the user send tomorrow's itinerary to the vehicle's app on the network or directly on the vehicle to report if and when the user should get started due to traffic, road construction, suggest fuel locations and ask if 65F degrees is still ok or adjust to a different temperature before the user enters the car around 12pm. Ask the user what time they will most likely depart if its not at 12pm like usual. Download specials and coupons for locations the user typically frequents on Saturdays and display to the user on the vehicle's interface on the user's mobile device.

Saturday PM:
The user said they would like to get started at 10am today but the vehicle interior is more than 20% lower than the user usually likes it. Turn the vehicle on at 955am and heat to 65F since 65F seems to be the user's most commonly used temperature. Display the specials for the nearest dry cleaner since the user typically gets dry cleaning done on Saturdays based on GPS data. Show the user lunch specials nearby and deals to claim since the user usually stops for lunch while out on errands on Saturday.

METHODS AND CLOUD SYSTEMS FOR USING CONNECTED OBJECT STATE DATA FOR INFORMING AND ALERTING CONNECTED VEHICLE DRIVERS OF STATE CHANGES

CLAIM OF PRIORITY

The present application is a continuation-in-part application of U.S. application Ser. No. 14/275,569, entitled "Methods and Systems for Sending Contextual Content to Connected Vehicles and Configurable Interaction Modes for Vehicle Interfaces," filed on May 12, 2014, which claims priority from U.S. application Ser. No. 13/784,823, entitled "Methods and Systems for Defining Custom Vehicle User Interface Configurations and Cloud Services for Managing Applications for the User Interface and Learning Setting Functions," filed on Mar. 5, 2013, which claims priority to U.S. Provisional Patent Application No. 61/745,729, filed on Dec. 24, 2012, and entitled "Methods and Systems For Electric Vehicle (EV) Charging, Charging Systems, Internet Applications and User Notifications", and all of which are herein incorporated by reference.

This Application is also a continuation-in-part application of U.S. application Ser. No. 13/842,158, filed on Mar. 15, 2013, and entitled "Methods and Systems for Defining Vehicle User Profiles and Managing User Profiles via Cloud Systems and Applying Learned Settings to User Profiles," which claims priority to U.S. Provisional Patent Application No. 61/745,729, filed on Dec. 24, 2012, and entitled "Methods and Systems For Electric Vehicle (EV) Charging, Charging Systems, Internet Applications and User Notifications", and all of which are herein incorporated by reference.

This Application is also a continuation-in-part application of U.S. application Ser. No. 13/452,882, filed Apr. 22, 2012, and entitled "Electric Vehicle (EV) Range Extending Charge Systems, Distributed Networks Of Charge Kiosks, And Charge Locating Mobile Apps", which claims priority to U.S. Provisional Application No. 61/478,436, filed on Apr. 22, 2011, all of which are incorporated herein by reference.

FIELD OF THE EMBODIMENTS

The present invention relates to systems and methods for enhancing communication between connected vehicles and connected objects, and methods for exchanging information with cloud-based processing systems.

BACKGROUND

Vehicles, such as motorized vehicles and electric vehicles have been around for some time. Vehicles provide a way that enable humans to drive from place to place. In today's world, vehicles have become an indispensable mode of transportation, and provide the freedom to travel at any time of day and for various distances. Vehicles can be publically operated or can be privately owned. Humans most commonly operate vehicles, no matter the type, whether electric or combustion engine based. In recent years, technology has been advancing to allow for better wireless interfacing and networking with vehicles.

It is in this context that embodiments of the invention arise.

SUMMARY

The methods, systems and apparatus include electronics and software of vehicles that drive display devices in vehicles and communicate wirelessly with Internet services. Some embodiments define method and systems for enabling communication between connected vehicles and other connected objects. Connected objects can be other vehicles, stationary objects, objects installed in various locations, such as streets, street intersections, traffic lights, traffic cameras, traffic sensors, and the like. In one embodiment, a subject vehicle may receive information from other connected objects based on the geo-location of the subject vehicle, and certain of the connected objects within a zone of influence to the subject vehicle may be surfaced to the subject vehicle and/or mobile devices within the vehicle or associated with the vehicle.

In some implementations, a connected vehicle may arrive or be headed toward at an intersection and the state of a traffic light may be understood by software/hardware of the vehicle. For instance, the state may be the color of the traffic light and identification of one or more of the traffic lights that are relevant to the direction of the travel of the subject vehicle. Still further, some implementations may utilize information regarding the state of operation of the vehicle, such as steering, turning, turn signals, direction of viewing by the driver, gestures by the driver, merging into certain turn lanes at the intersection, etc., to identify an intent or predict a direction of travel through the intersection. Based on this information, software and/or systems of the vehicle may receive information from cloud processing systems regarding the state of a traffic light. For instance, if the vehicle is in the left turn lane (as identified by GPS and/or cameras and/or sensors), the state of the left hand turn arrow may be displayed on one or more screens.

The screens may be the screens of the vehicle, such as in an area that is close to other applications that the user may be using while stopped and waiting for the light. Thus, when the light turns green, the green arrow or green color or some other text indictor or sound indicator or tactile feedback may be provided to the user, so as to alert the user that he or she needs to look forward and drive the vehicle. If during the time that the user was looking down at a display a pedestrian or some object came close to the vehicle, while the user was looking down, and the light turns green, sensors of the vehicle may delay showing of the green arrow or alert the driver that some obstacle is still present, even though the light turned green. In some other embodiments, the screen or display of the vehicle may present one or more lights or indicators, showing the state of the lights at the intersection. For instance, if the user arrives at the intersection, and it is uncertain whether the driver is turning left, right or going straight, the indicator shown on the display screen of the vehicle may be two or more lights or indicators. For instance, the screen may show icons or text or colors for more than one options of proceeding (e.g., one light for left turn, one light for straight, one light for right turn, or fewer or more lights depending on the intersection or the certainty of the anticipated direction of travel).

In some embodiments, the notifications and/or alerts and/or indicators can be dynamically managed to be more or less sensitive, based on user preference and/or learned preferences of users. For instance, if one user prefers to have more sensitivity to alerts or notifications, the number of alerts and/or notifications may increase. Additionally, for certain drivers, such as handicapped drivers, the notifications and/or alerts may be more magnified to improve safety. In other cases, the alerts and/or notifications may be reduced, e.g., by reducing the sensitivity. Thus, the notifications and/or alerts may be dynamically throttled based on user profile settings, preferences, learned preferences or adjustments made over time.

In still other embodiments, sensors and/or cameras installed on or near traffic lights or intersections may be used to track the movement of objects past or at the intersection. The tracking can occur in an unanimous manner, simply to identify traffic flows and provide vehicles with status or state regarding traffic lights. In such examples, the traffic lights or its systems may be connected to the internet, and the information can be shared with cloud processing servers. The cloud processing servers that receive information from vehicles can also access the traffic light data and motion or movement of traffic at the intersection.

In one embodiment, it is possible to find an intersection of the traffic tracking by the traffic light systems or sensors with the information of the vehicle location. The intersection of this tracking data can be used to verify or reinforce the identification of location of the vehicle at a particular intersection and provide state information to the correct vehicles at a particular intersection. Still further, tracking data from intersection sensors combined with tracking data of connected vehicles can be used as overlay data to mapping and traffic prediction systems.

In one embodiment, a method is provided that includes receiving geo-locations of a vehicle and identifying heading direction of the vehicle based on changes in the geo-locations of the vehicle. The method may also include, in some examples, receiving sensor data for a surrounding area of the vehicle. The method includes receiving state information from a connected object that is located within an area of influence associated with a current geo-location of the vehicle and sending an alert to the vehicle when the vehicle is at the current geo-location. In one example, the alert is sent upon determining that the state information changed while the current geo-location of the vehicle remains unchanged for a threshold period of time after the state information changed. In various examples, methods, systems and infrastructure for enabling connected vehicles to communicate with cloud services and with other vehicles or connected objects are provided.

In some implementations, the connected object is independent of the vehicle, and the state information from the connected object is utilized while the current geo-location of the vehicle is within the area of influence.

In one embodiment, a method may further include receiving state information from additional connected objects that are within the area of influence of the current geo-location of the vehicle; and identifying which of the connected object or one of the additional connected objects is a primary connected object to be used for determining that the state information changed.

In some implementations, the primary connected object is identified based at least in part on the heading direction of the information and current geo-location of the vehicle.

In some implementations, the alert is one of a notification to a computer of the vehicle, or a notification to a user device located in the vehicle, or a combination thereof.

In some implementations, the alert includes instructions for enabling tactile feedback to be applied by a portion of the vehicle, such that the tactile feedback provides an indication that the state information changed.

In some implementations, the tactile feedback is provided when the state information changed or after a period of time passes from when the state information changed.

In some implementations, the alert includes instructions communicated to a device of a passenger of the vehicle, the instructions directing activation of tactile feedback as an indication that the state information changed.

In some implementations, the connected object is independent of the vehicle and has an independent connected identity, the connected object being in communication with a network of one or more servers and storage, the storage is configured to store data received from the connected object including the state information and changes to the state information, wherein state information and the changes to the state information of the connected object are received by a cloud services server that is connectable to the vehicle, the cloud services server being configured to send the alert to the vehicle over a wireless network.

In some implementations, the connected object is one of another car, or a sensor, or a building, or a road sensor, or a traffic light, or a traffic metering sensor, or a global positioning system device, or a stationary device, or a moving device, or an intersection sensor, or a camera, or a motion sensor, or a radar sensor, or multiple traffic lights, or multiple cars, or a connected device, or an internet connected device, or a light post, or a light, or combinations thereof.

In some implementations, the received sensor data for a surrounding area of the vehicle is defined by one or more of motion sensors of the vehicle, or one or more cameras of the vehicle, or radar sensors of the vehicle, or biometric sensors of the vehicle, or weight sensors of the vehicle, or temperature sensors of the vehicle, or climate sensors of the vehicle, or tire sensors of the vehicle, or brake sensors of the vehicle, or seat sensors of the vehicle, or occupancy sensors of the vehicle, or user identification sensors of the vehicle, or passenger sensors of the vehicle, or pedestrian sensors around the vehicle, or object sensors around the vehicle, or combinations thereof.

In some implementations, the heading direction obtained from the changes in geo-location of the vehicle identify a direction of travel, and wherein in the area of influence, a plurality of connected objects are identified, the method further comprising, (i) identifying, from the plurality of connected objects, stationary connected objects and non-stationary connected objects; (ii) filtering stationary connected objects in the area of influence to exclude connected objects that are not in the direction of travel; and (iii) using at least the stationary objects that are in the direction of travel for determining that the state information changed while the current geo-location of the vehicle remains unchanged for the threshold period of time after the state information changed.

In some implementations, the heading direction obtained from the changes in geo-location of the vehicle identify a direction of travel, and wherein the direction of travel is periodically updated using changes in the geo-location of the vehicle, and/or turn signal indicator data, and/or steering direction changes, and/or mapped direction data.

In some implementations, the alert further includes control information for causing one or more of, a change in state of operation of a user interface of the vehicle; and a change in state of operation of a user device within a driver control zone of the vehicle.

In some implementations, when the alert is indicative that active driving should resume, the change in state of operation includes one of a disabling, fading or reduction in function of content accessible or apps usable via a user interface of the vehicle or a user interface of a device within a driver control zone within the vehicle.

In some implementations, receiving sensor data for a surrounding area of the vehicle includes processing sensor data from sensors of the vehicle and/or sensor data of other co-located vehicles and/or sensor data of connected objects within the area of influence to the vehicle.

In some implementations, the alert further includes or is data that is used to set a color indicator on a screen of the vehicle or a screen of a device within the vehicle, the color being a color of a traffic light that corresponds to the vehicle for a geo-location location of the vehicle, wherein updates to the data used to set the color indicator are received such that the color indicator changes when or after the color of the traffic light changes.

In some implementations, when the color indicator changes to red or stop, a reduction in functional operation of certain applications or content of the screen of the vehicle and/or the screen of the device is processed.

In one embodiment a method is provided for receiving, at a server, geo-locations of a vehicle. The method includes identifying heading direction of the vehicle based on changes in the geo-locations of the vehicle and receiving state information from a connected object that is located within an area of influence associated with a current geo-location of the vehicle. The method further includes sending an alert to the vehicle when the vehicle is at the current geo-location, the alert being sent upon determining that the state information changed while the current geo-location of the vehicle remains unchanged for a threshold period of time after the state information changed. In one example, the connected object is independent of the vehicle and has an independent connected identity, the connected object being in communication with a network of one or more servers and storage, the storage is configured to store data received from the connected object including the state information and changes to the state information. In one example, state information and the changes to the state information of the connected object are received by a cloud services server that is connectable to the vehicle, the cloud services server being configured to send the alert to the vehicle over a wireless network, the method being executed by a processor.

In some implementations, the heading direction is obtained from the changes in geo-location of the vehicle identify a direction of travel, and wherein in the area of influence, a plurality of connected objects are identified, the method further comprising, (i) identifying, from the plurality of connected objects, stationary connected objects and non-stationary connected objects; (ii) filtering stationary connected objects in the area of influence to exclude connected objects that are not in the direction of travel; and (iii) using at least the stationary objects that are in the direction of travel for determining that the state information changed while the current geo-location of the vehicle remains substantially unchanged for the threshold period of time after the state information changed.

In one example, an interaction mode defines one or more settings of a vehicle that can be customized for user interaction. For a particular interaction mode, settings within settings may also be configured. In still other implementations, interaction modes can be defined, selected and customized via any connected device over the Internet or through the vehicle computer and interfaces inputs. In some embodiments, the interaction modes can be applied to the vehicle dynamically, so such as when the interaction mode is specific to a particular driver profile. In such embodiments, the interaction mode can be set once the user logs in to the vehicle, is identified using biometrics, synced via wireless keys or detection, pairing, or the like. As the user makes use of the inputs and settings provided the interaction mode, refinements can occur based on learned preferences.

In one embodiment, an interaction mode can define a single setting, or a plurality of settings. If a plurality of settings is defined for one interaction mode, individual settings of that interaction mode may be modified by the user or automatically in view of learned patterns, learned behavior, or the like. In some embodiments, the learned patterns can be identified from a collection of similar users. For example, if other users are registered with a cloud service for connected vehicles, typical settings, changes, control modifications, preferences, demographic preferences, regional/cultural preferences, language preferences, etc. can be mined to identify patterns. In one embodiment, these patterns can be mined without requiring the actual identify of a user, so that privacy protection can be maintained for all user accounts.

In some implementations, the learning and predicting embodiments may utilize learning and prediction algorithms that are used in machine learning. In one embodiment, certain algorithms may look to patterns of input, inputs to certain user interfaces, inputs that can be identified to biometric patterns, inputs for neural network processing, inputs for machine learning (e.g., identifying relationships between inputs, and filtering based on geo-location and/or vehicle state, in real-time), logic for identifying or recommending a result or a next input, a next screen, a suggested input, suggested data that would be relevant for a particular time, geo-location, state of a vehicle, and/or combinations thereof. In one embodiment, use of machine learning enables the vehicle to learn what is needed by the user, at a particular time, in view of one or more operating/status state of the vehicle, in view of one or more state of one or more sensors of the vehicle. Thus, one or more inputs or data presented to the user may be provided without explicit input, request or programming by a user at that time.

Overtime, machine learning can be used to reinforce learned behavior, which can provide weighting to certain inputs.

In one embodiment, the custom configuration is generated using tools and programs made available on a website. The tools and programs may be executed by computers, such as computers of a data center to provide cloud based processing. The data centers can be distributed geographically and the communication to specific vehicles can be dynamically assigned to various geographic data centers, as the vehicles move around geographically.

BRIEF DESCRIPTION OF DRAWINGS

FIG. 19B describes one example of how stored data and function declarations may be compiled to provide intermediary access to a vehicle's computer controlling vehicle systems, in accordance with one embodiment.

FIG. 19C describes a set of computer readable and executable code that can be compiled together by a third party APP developer in the form of an APP, in accordance with one embodiment.

FIG. 22B describes how one of many types of inputs into an assumption and reasoning logic module can be compiled over time, in accordance with one embodiment.

FIG. 22C describes one example of what an assumption and reasoning logic module may produce using the data points collected on an ongoing basis in FIG. 22B, in accordance with one embodiment.

FIG. 22D describes an example list of decision the decision and action engine may take based on information provided by the assumption and reasoning logic module and sets of assumptions created, in accordance with one embodiment.

DETAILED EMBODIMENTS

Figure 1:
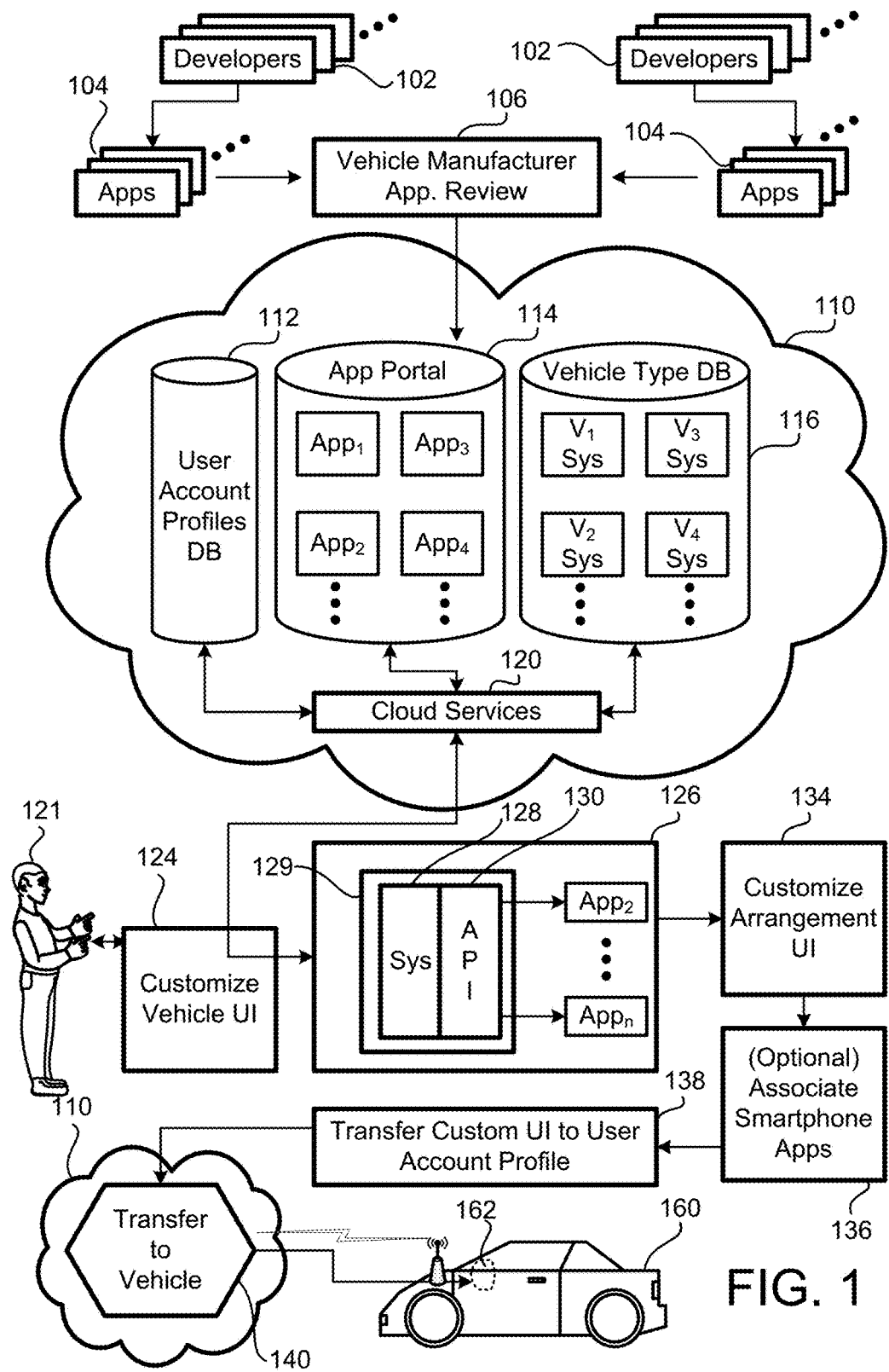
FIG. 1 shows a block diagram of a system for allowing developers to create applications for specific features and functionality to be integrated with one or more vehicles of vehicle databases, in accordance with one embodiment.

Embodiments of the present invention define methods, systems and apparatus for use with connected vehicles and interaction with cloud services. Some embodiments illustrate methods and systems for enabling communication between connected vehicles and other connected objects (COs). Connected objects can be other vehicles, stationary objects, objects installed in various locations, such as streets, street intersections, traffic lights, traffic cameras, traffic sensors, and the like. In one embodiment, a subject vehicle may receive information from other connected objects based on the geo-location of the subject vehicle and/or sensor data of the connected vehicle. In various examples, the data exchanged or received by a connected vehicle may be dependent upon whether certain of the connected objects are within a zone of influence to the subject vehicle and may be surfaced to the subject vehicle and/or mobile devices within the vehicle or associated with the vehicle.

In some embodiments, when a vehicle reaches a stop (e.g., some intersection or read location), some vehicle user interfaces (UIs) and/or access to certain apps of smart devices may be enabled. When the vehicle starts to move, the UIs of some devices may be disabled as well as some smart devices or apps. In one embodiment, implementations provide various ways to notify vehicle drivers when traffic lights have changed state and will require the driver to begin moving the vehicle. One embodiment is provided to enable vehicles to communicate with traffic lights (or traffic lights via the Internet or cloud server), so that drivers can be provided with alerts of state changes (i.e., traffic light changes). In one embodiment, the alert may be provided when a driver is detected to be actively using a device. In other embodiments, the alert can be provided in various forms such as tactile feedback (e.g., seat vibrates), sound, voice, user device screen changes, color icons, color text, user device color changes, user device notifications, vehicle computer screen changes, vehicle screen notifications, colors associated with traffic lights, and/or combinations thereof.

In another embodiment, in addition to detecting state changes of traffic lights, vehicles can also communicate with other vehicles within the vicinity or proximity of the subject vehicle. In one embodiment, a vicinity or proximity or zone of influence may be within 100 meters of the vehicle. In other embodiments, where more connected objects are located proximate to the vehicle, the range may be less, such as within 50 meters or within 30 meters of the vehicle. In certain cases, where the vehicle is moving slowly, e.g., less than 25 miles per hour, the range may be less than 20 meters of the vehicle. In other cases, where the vehicle is stopped or almost stopped, the zone may be within 10 meters around the vehicle (e.g., so as to identify vehicles in front or behind or beside the subject vehicle). In such cases, the range for detecting nearby vehicles by different than a range for detecting traffic lights (e.g., to identify which traffic lights are relevant to the subject vehicle). That is, the range for traffic light correspondence or relevance may be larger than the range for nearby vehicles.

In one example, a vehicle can detect that a vehicle in front has started to move away, yet the subject vehicle remained stopped at a traffic light that required the vehicle to move. This can signal that the user needs to resume driving, so an alert can be sent. In one embodiment, the UI and/or device may be disabled when the vehicle resumes driving or upon receiving the alert or just before receiving the alert. In other embodiments, communication with traffic lights is not required, but vehicles can communicate with other vehicles utilizing sensors of the vehicles themselves and communication can also be had with cloud services. The vehicle sensors can include, for example, cameras, ultrasonic sensors, radar, motion sensors, inertial sensors, IR sensors, GPS, etc. to determine that the vehicle in front has moved away, after the vehicle was stopped (presumably at a stop light).

In one embodiment, GPS can also be used to determine if the user is on the road and/or at an intersection, which can be used to throttle the ON/OFF use of this feature. For example, if the driver is in his home driveway (or some other location that would not benefit from alerts), the system would know this or predict it, so it would not turn on the alerts automatically. The system can also learn when the user needs alerts or when alerts should be sent. The learning can occur, for instance, if the user turns off alerts when in town, when at home, or turns on alerts when in a large city or when in the country, etc. Also, learning can be used to determine when the user wishes to use alerts, such as only on weekends, only for AM driving, etc. Further, learning can be used to determine if the user prefers alerts when other passengers are also in the vehicle or only when the user is alone. The learning, in one embodiment, can be processed to make predictions of use of the alert and notification features, and such information can be associated with the user profile of the user and/or user account.

Another embodiment, the user may be arriving at a stop light. As the vehicle gets closer to stop and the light is red, the vehicle may get data from connected objects (e.g., either directly or via a cloud server), such as traffic lights (i.e., select ones that correspond to the direction of travel). In one example, a light indicator can be provided in the vehicle display or a device of the user indicating the color of the traffic light. Thus, the traffic light color may be surfaced to the display of the vehicle to provide indication of the state of the traffic light. This information may be useful in various contexts. One example contact may be for vehicles that may be stopped (e.g., at an intersection) behind a row of vehicles and the traffic light is not visible. Still further, the light may be surfaced to a user's phone, tablet, or other connected device, and these devices may show the color of the traffic light is well in some region of the display screen. In one configuration, when the light turns green, the light shows green on the phone and the phone fades to sleep so the user does not use the phone while driving.

In still a further embodiment, the system may detect the vehicle's direction of travel and determine if the direction of travel will lead the user to an intersection where a right turn or left turn will be made instead of progressing forward. Indicators from the vehicle may be used to identify if the user intends to make a turn. Such indicators can include identifying if a blinker for turning is active in the vehicle, using turns in steering wheel, using where the user is looking (e.g., via face/eye detection), using a mapped destination/ direction navigation, or combinations thereof.

In some embodiments, information regarding use of alerts and/or communication with connected objects may be shared with others/friends on social network, and/or may be provided to build data sources from crowd-sourced data, or the like.

With the above features in mind, the following examples will provide additional embodiments and configurations and implementations that can be used with alerts regarding other connected objects (COs) or instead of using alerts. In some examples, combinations of elements can be use or substituted for others, so as to define implementations of connected vehicles, vehicles with access to cloud services, vehicles with customized displays, vehicles that share state with other vehicles, and remote access of vehicles, systems and notifications.

For additional discussion regarding examples of connected object (CO) communication, alerts and traffic light interactions with connected vehicles, reference can be made to FIGS. 28-34. However, it is understood that any feature described herein and/or incorporated herein by reference may be combined to define specific implementations.

The methods, systems and apparatus include electronics of vehicles that drive display devices in vehicles and communicate wirelessly with Internet services. Some embodiments define method and systems for enabling customization of displays of a vehicle. The displays can be customized based on a user profile, and can include settings based on learned preferences. The displays and outputs of the vehicle are also configured to output or display supplemental content obtained for the user profile, based on contextually relevant information.

The contextual relevance can be based on information associated with the geo-location of the vehicle, the state/ condition of the vehicle, learned preferences, information in user online accounts, information from social networks, information from patterns of use by the user, information based on the time of day, week, month or based on when certain inputs or data is requested or looked up by the user. The intersection of these information points allows for the system (e.g., server, vehicle computer, user device, or combinations thereof) to provide contextually relevant information to the vehicle, when the user needs the information, so that distracted driving can be reduced.

Further, the vehicle can be customized or the user account/profile can be customized for vehicles to allow interaction modes to be used. Interaction modes define the way of access-input, look and feel, content, simplicity, complexity, skins, etc. of the user interfaces or controls of the vehicle. By enabling this level of customization, vehicles can be configured or customized over time to the way each user is most comfortable, thus reducing distracted driving. This customization can also extend to physical inputs, such as knobs, switches, buttons, dials, etc. The customization can be, in one embodiment, by adding display screens to physical inputs to define hybrid inputs. The display screens can be on the physical inputs or beside the inputs, so that the content displayed can change, thus changing the functionality of each or some or one of the physical input based on an interaction mode or setting. By providing this level of customization, distracted driving can be reduced, as the vehicle is customized to what the user is most comfortable with and can thus concentrate on driving.

The Internet services provide access to cloud services. The cloud services provide access to user accounts and access to settings, configurations, applications and other customization defined by the user. Customization can include user interface customization of a vehicle display or displays. The customization can include the ability to select specific applications (APPS) to be activated by the vehicle and interfaced via the display or displays, voice input, touch input, etc. The customization is also provided with a learning engine that learns use by the user, and automatically implements settings or programming to aspects of the user interface. The programming can include automatic programming at certain times, days, months, years, etc., and can be updated or molded over time as the user continues to use the vehicle UI.

In one embodiment, a user can access cloud services for a vehicle manufacturer and identify the particular vehicle from selected choices. The user can then identify a customization profile for the vehicle by defining the look and feel of a UI display, arrangement of vehicle controls on displays, add and associate third party APPS to the vehicle display, and save the configuration.

The configuration, in one embodiment, is saved to the profile of the user. In one embodiment, the profile is saved on a database of a specific vehicle manufacturer that offers the customization option. In still other embodiments, once a configuration is saved to the profile account of a user, that configuration can be shared to other vehicles of the user. In still other embodiments, when a user buys a new car, the custom configuration can be transferred either entirely or partially to the new vehicle. In some embodiments, if the vehicle has more or less system functions, the customization can be adjusted automatically or the user can be provided with options to update the customization to add or delete features. In one embodiment, the customization will be facilitated via a website. In one embodiment, the website may be of the vehicle manufacturer. In one embodiment, the website of the vehicle manufacturer can allow the user to add APPS that are created by third parties. The third parties can create APPS that communicate with APIs of the system components of specific vehicles of the manufacturer. Once APPS are selected, the user can add them to the custom user interface (UI) display.

The user can also be allowed to arrange the APPS or icons of APPS in a specific custom arrangement that is saved to the user's profile. In one embodiment, the user's profile can also be run on various vehicles, other than those owned by the user. For instance, if the user is renting a vehicle and the vehicle has access to cloud services, the user can enter his user name and password (or other identifiers), which log the user into the cloud services and saved profiles. The saved profiles will then enable logic to build a custom UI for the user based on the vehicle being driven. In one embodiment, the system components and APIs of the system components of the rented vehicle can be paired or linked to the users saved APP selections.

The user's saved UI configuration may also be transferred to the display of the rented (or other vehicle) vehicle. A best-fit configuration can also be generated using the user's profile selections, so that the configuration provided for the other vehicle will closely resemble or appear as it does for the configured vehicle. In other embodiments, the user's use metrics can be monitored. The use metrics can include use of APPS, use be of system components of the vehicle, use of the vehicle, environment conditions, and historical actions taken by the user via the input/output controls of the vehicle (e.g., buttons, levers, keys, fobs, display selections, display interface actions, communication actions, etc.).

These historical actions can then be used to define learned actions. The learned actions can be analyzed to change configuration settings in the user's saved profile. For instance, if the user uses a particular APP every day at a particular time, that APP icon can be surfaced to the display or preset to start. The APP can then provide information to the user at about the same time the user normally needs the information. Other historical use patterns can be monitored and such data can be saved to the user's profile. The data can then be used by algorithms that build assumptions based on historical inputs by a user as well as environmental inputs, location inputs, vehicle diagnostic inputs; internet connected marketing deals, the user's calendar, traffic conditions as well as news. The assumptions the algorithm builds are then processed into decisions and actions by an additional algorithmic process to activate local or remote audio and visual alerts, change vehicle systems, display information on a vehicle's displays and request a decision from a user locally or remotely to complete an action.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles.

A cloud processing system, as described herein, will include systems that are operated and connected to the Internet or to each other using local networking communication protocols. A cloud processing system can be defined as interconnected and distributed physical or virtual software defined network that utilizes virtual or physical processing and storage machines that enable various applications and operating systems to facilitate the communication with and between various client devices (vehicles, user devices, structures, objects etc.). The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In other embodiments, the electronics of a vehicle can synchronize with a user's portable electronics. The user's electronics can include, for example mobile devices that include smartphones, tablet computers, laptop computers, general-purpose computers, special purpose computers, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

The wireless communication can include cellular tower communication that couples and communicates through various networks to the Internet, to provide access to cloud processing 120. Other methods can include providing Wi-Fi communication to local Wi-Fi transmitters and receivers, which communicate with cloud processing 120. Other types of communication can include radio frequency communication, such as 802.11.ac, 802.11ad and subsequent wireless networking protocols, Bluetooth communication or combinations of Wi-Fi and Bluetooth. It should be understood that vehicle electronics can communicate with cloud processing 120 via any number of communication methods, so long as exchanges of data can be made with cloud processing 120 from time to time.

The communication can be made by vehicle electronics while the vehicle is on or when the vehicle is off, so long as communication and processing circuitry of vehicle electronics has a power source. The power source can include battery power that powers vehicle electronics to communicate with cloud processing 120 when vehicle is turned off. When vehicle is turned on, the battery that drives vehicle electronics can be recharged.

FIG. 1 shows a block diagram of a system for allowing developers to create applications for specific features and functionality to be integrated with one or more vehicles of vehicle databases. As shown, developers 102 create APPS 104 which is provided to a vehicle manufacturer 106. The APPS, in one embodiment, can be reviewed by the manufacturer to determine if they are save to play in the vehicle or can add restrictions. The restrictions can include, for example, allow access when the vehicle is in "park" mode, stopped, or access may be enabled by passengers. Passengers may be verified for presence, before enabling features for the passengers.

The applications provided to the vehicle manufacturers can also verify functionality and approve aspects of the application to be provided to an applications database. Users of vehicles, made by the manufacturer, can then access a website to select specific applications for addition to their vehicles. In one example, an Internet site 110 may therefore be managed by or for the vehicle manufacture. User account profiles 112 can be managed to provide access to APPS of an app portal 114. In other examples, the site 110 can be managed by third party companies, partner companies that cooperate with a vehicle manufacturers, and/or internet companies that provide some or all of the backend or front end services and cloud storage and processing.

The vehicle manufacturer may also manage or provide a vehicle type database 116, or provide data for the database 116. As the vehicle manufacturer makes updates to existing APPS, systems or adds new vehicles to its vehicle lines, the vehicle type database may also be updated accordingly. Updates can also be forwarded to the vehicle over time or can be automatically installed. The updates, in one embodiment, can provide new UI features, controls, etc. As shown, the app portal 114 may include a plurality of applications that have been developed by developers 102 and/or also approved by the manufacturer of the vehicle.

The app portal 114 can also include APPS that are produced by the vehicle manufacturer or applications that are made for the vehicle manufacturer. Cloud services 120 includes various modules that allow customers of the vehicle manufacturers to access the vehicle manufacturers cloud services, and provide interconnection to the vehicles in operation. In one example, a user 121 uses a computing device to access cloud services 120 in order to customize 124 the user interface of a vehicle. Broadly speaking, the user interface of a vehicle can include any display device in the vehicle.

In one embodiment, the display device can include displays that can provide instrumentation normally provided by standard vehicle indicators. The display device is not limited to a display normally placed in the center console, but can also any display screen. The display screen can also include that used to normally provide speed, and systems settings in the dash over the wheel. The display screen can also include other screens in a vehicle, such as those in passenger areas. Additionally, the user interface can also include display devices that display systems and auxiliary information, such as that provided by applications generated by developers 102, and/or applications produced by the vehicle manufacture. In one embodiment, the vehicle manufacturer will produce a software module for systems information that allows access to the system components of the vehicle.

The systems component is shown as "SYS" 128, which is interfaced with an application-programming interface (API) 130. The vehicle module 129 will therefore include the systems component and the API that will provide access and interface with applications produced by third parties and applications produced by the vehicle manufacture. In one embodiment, the system components interfaced with selected ones of the applications will produce a customized configuration 126. The customize configuration 126 will define the selected applications that were interfaced with the systems of the selected vehicle by the user 121. Once the customize configuration 126 has been selected (e.g., the APPS selected by the user to add or augment the current system APPS or system controls), the user may be provided with options to customize the arrangement of the UI (user interface) 134.

The customization, in one embodiment includes enabling the user to customize the user interface by arranging specific components of the user interface and specific locations on the display. For example, a user is allowed to select specific components, modules, applets, widgets, code pieces, and arrange them in specific locations that are preferred to the specific user for ease-of-use, or frequency of use, or for a specific look and feel.

This arrangement of the UI will therefore enable specific applications to act as modules that can be arranged on a display. The applications can then expand or contract to occupy the entire display when selected and exposing additional functions buttons annualize when selected. As will be defined below, additional customization of the arrangement of the UI 134 will allow user interaction with the user interface to customize itself based on learned use activity (e.g., over a history period) by the user.

In one optional embodiment, a user is allowed to associate a smartphone or portable device having applications with the customization configuration 126, in operation 136. For example, if certain applications are already loaded on a smartphone or portable device that is proximate or in the vehicle, the applications can synchronize or pair with the applications that are part of the customize configuration 126. The capability of synchronizing certain applications with the customize configuration 126 of the vehicle, allows for an integration of applications known and used by the user on the personal device, and applications that were made part of the customize configuration 126, using the customization tools of the vehicle manufacturer.

Once the user has customized the arrangements and has associated any portable device applications to the customized configuration 126, the custom UI may be transferred to the user account profile in operation 138. The transfer of the customize UI to that user account profile can include saving specific identifier information, application information, and any customization desired by the user for that specific vehicle or plurality of vehicles. Once the custom UI has been saved to the user account profile database 112, the user can then transfer or the manufacturer cloud services 120 can transfer the profile and custom UI to the vehicle in operation 140.

The transfer of the custom UI to the vehicle can be made by Internet connection between the vehicle electronics and the Internet 110. As shown in FIG. 1, the transfer of the custom UI to the vehicle 160 can occur once the customization has occurred. In one embodiment, the customization configured by the user 121 can also be saved to the user account of user 121 in a database of the manufacturer. If the user 121 then buys another car from the same manufacturer, the custom user interface can be transferred to the other vehicle in a seamless manner. If the other vehicle has additional features not provided by the earlier, a mapping algorithm provided by cloud services 120 can adjust the settings for the new vehicle to match or substantially match those of the earlier vehicle based on the user's preferences. In one embodiment, the matching can be a best-fit or compatible scenario, which provides the user with substantially similar configuration. The configuration can then be updated by the user if the custom settings or configurations made by the cloud services do not meet the user's desire or configuration.

Figure 2:
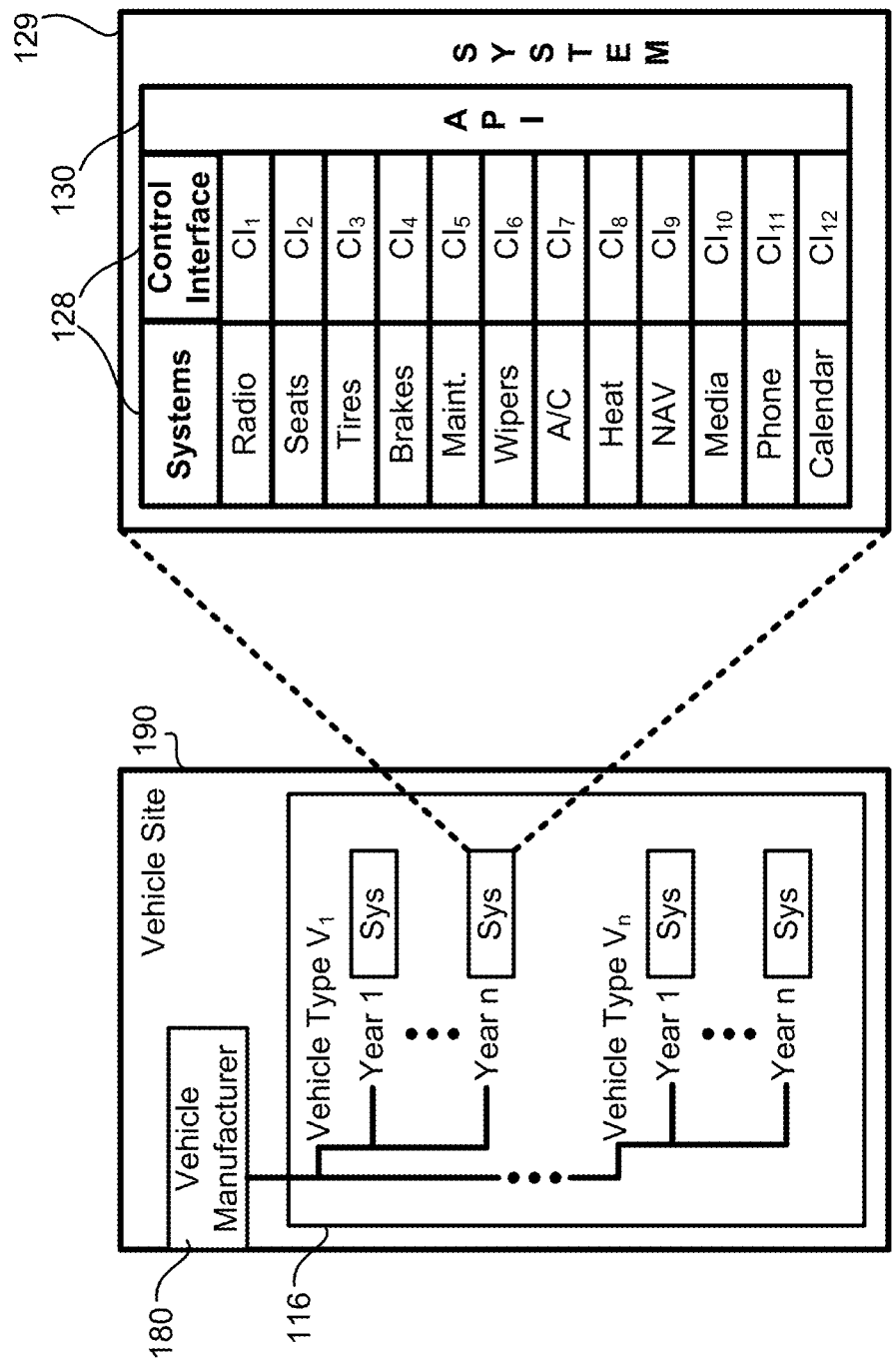
FIG. 2 illustrates one embodiment where a system component is provided, for interfacing with applications, in accordance with one embodiment.

FIG. 2 illustrates one embodiment where a system component 129 is provided, for interfacing with applications. In one embodiment, the system component 129 includes a definition of systems and control interfaces (CIs). The systems can include a number of standard systems utilized, which are commonly provided in manufacturing settings of vehicles by vehicle manufacturers. These systems are provided with corresponding control interfaces, which enable access to the system components. The control interfaces, for example, may enable access to the functionality provided by each of the system elements. For example, if the system is a radio, the radio will be provided with control interfaces or a control interface that enable functional access to the features of the radio. Functional features can include for example, volume, station selection, seek, pause, base, balance, storing of stations, etc. Other system features will be provided with their corresponding control interfaces, which will be then accessible via an application programming interface (API) 130.

The API provides a defined method and structure for accessing the various control interfaces of the system elements of a vehicle. Other types of systems can also include add-on components, plug-ins, such as those that may be downloaded to the vehicle from third party companies, from the manufacturer, or installed by the manufacturer automatically (or with pre-permission). Still further, other systems can include displays, which may be part of the vehicle. The displays can be provided with a control interface to enable the API to access the display functionality. In one embodiment, a vehicle can have a number of displays. The number displays can be, for example, the main dashboard for vehicle, a center console of the vehicle, a rear display, a passenger display, a glass display, a mirror display, a heads-up display, glasses of the driver, the windshield of a vehicle with display capability, a window of the vehicle, a touch surface of the vehicle, or portable devices link or synchronized to the vehicle electronics that provide access to the display system and control interfaces via the API 130.

As illustrated, the system component 129 may be defined by a vehicle manufacturer for a specific vehicle type. In one embodiment, a vehicle website 190, or third-party site may provide access to system component definitions for specific vehicles. In one example, the vehicle website 190 may be provided by a vehicle manufacturer 180. The vehicle manufacturer 180 may provide a listing of the types of vehicles sold by the manufacturer, and the various years for those vehicles as model types and functionality in each model change over time. In one embodiment, a user can visit the vehicle manufacturer 180 via websites or a cloud service, and select the vehicle to obtain the system component 129. In one embodiment, a particular vehicle type and year of vehicle may make use of more than one system component 129 if the manufacturer provided more than one system component or update.

Figure 3:
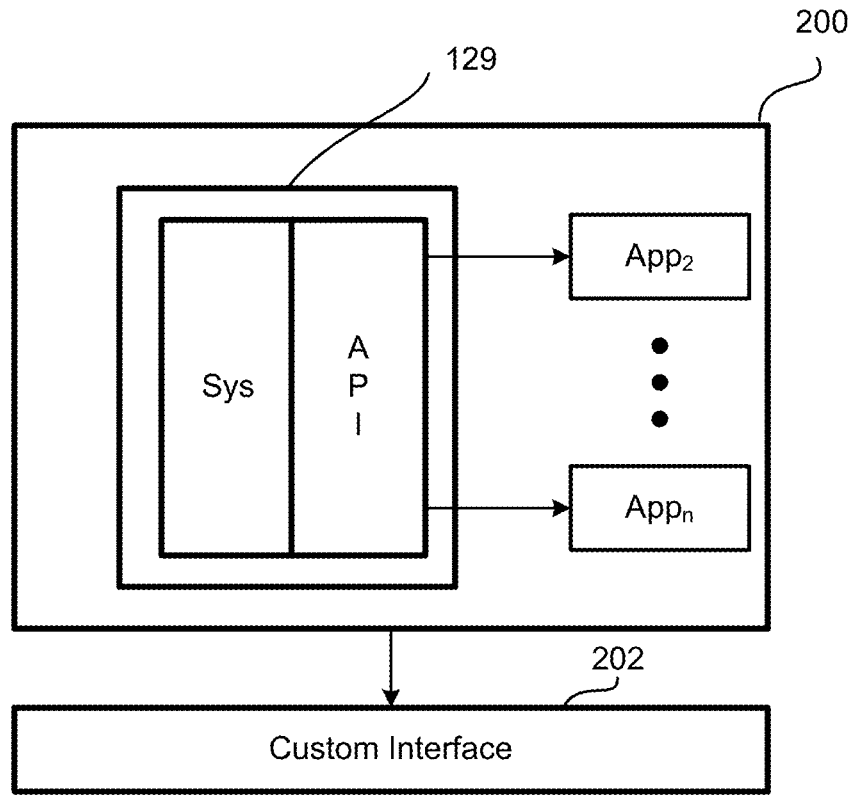
FIG. 3 illustrates an example where the system component, including the systems and control interfaces and associated API are linked or associated to a number of applications to define a custom configuration, for one embodiment.

FIG. 3 illustrates an example where the system component 129, including the systems and control interfaces and associated API are linked or associated to a number of applications to define a custom configuration 200. Custom configuration 200 was defined by allowing a user to select various applications that will be integrated with to provide supplemental content or functionality to the vehicle. In one embodiment, the applications can also replace application functionality provided by the systems in system component 129.

For example, an application can be selected by the user to provide a custom radio interface, which replaces the radio interface provided by the vehicle manufacturer. In still another example, an application can be provided to replace the temperature meters with custom temperature meters, and provide additional data on the display not provided by the standard vehicle manufacturer user interfaces.

In still another embodiment, the application selected by the user can define complementary functionality that will function in conjunction with the system components. In this example, the application functionalities that are paired with the system component 129 to define the custom configuration 200 will provide a hybrid user interface that is custom to the user. The customization is defined by the user, for example, by selecting specific applications, selecting different background colors, wallpapers, for the user interfaces, selecting different input interfaces, adjusting the location and positioning of application components displayed on a vehicle display, and programming the various application elements and functions to operates and provide feedback based on user-defined programming.

In still another embodiment, the custom configuration can be defined by the user to provide a different background color on different days of the week. The background color can be customized or replaced with pictures or photographs customized and selected or uploaded by the user. In this way, the user interface, system components, and applications installed on the vehicle will provide a customized look and feel that is defined by the user for the vehicle, and additional functionality will cooperate and function with the systems of the vehicle by providing the mapping to the API to each of the applications that are selected by the user.

In still another embodiment, the applications can function alongside system components without requiring the applications to interface directly with manufacturers systems the of the control interfaces. In this scenario, applications can function and be placed in the user interface of the custom configuration in the same locations set by the user.

Figure 4:
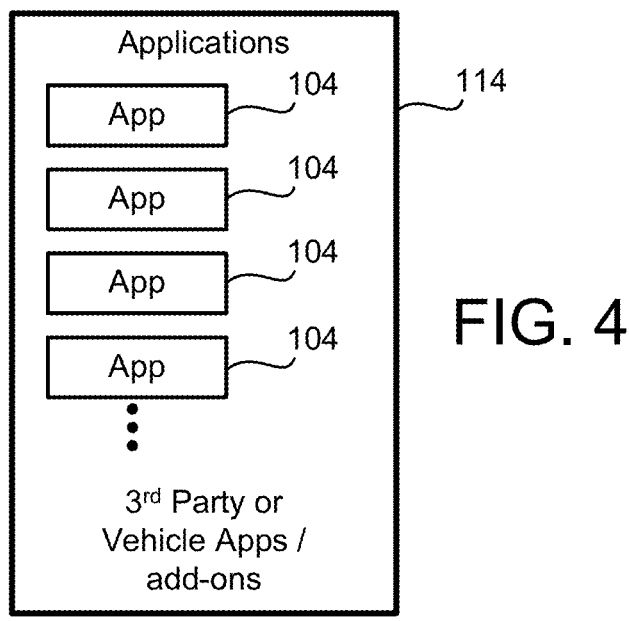
FIG. 4 illustrates an example of an array of applications that can be provided for use with the vehicle that a user is customizing to provide a customized configuration, for one embodiment.

FIG. 4 illustrates an example of an array of applications that can be provided for use with the vehicle that a user is customizing to provide a customized configuration. As illustrated, the applications 104 provided in a menu or listing 114 show particular applications that can be made accessible to the user for the selected vehicle that is being customized. In one embodiment, depending on the vehicle being customized, a different subset of applications will be provided to the user for selection. The subset of applications provided to the user will be those that are known to operate or interface with the selected system components of the selected vehicle.

In one embodiment, the custom configuration 200 will define a custom interface 202 that will be rendered on a display of a vehicle or on more than one display of vehicle. In one embodiment, the applications that are provided for selection in listing 114 may include third-party produced applications as well as applications produced by the vehicle manufacturer. Still further, the applications may be add-on applications that provide additional functionality to existing applications or existing system configurations. In still other embodiments, the applications can be defined as applets, plug-ins, widgets, code subsets, skins, code, or combinations of one or more thereof.

Figure 5:
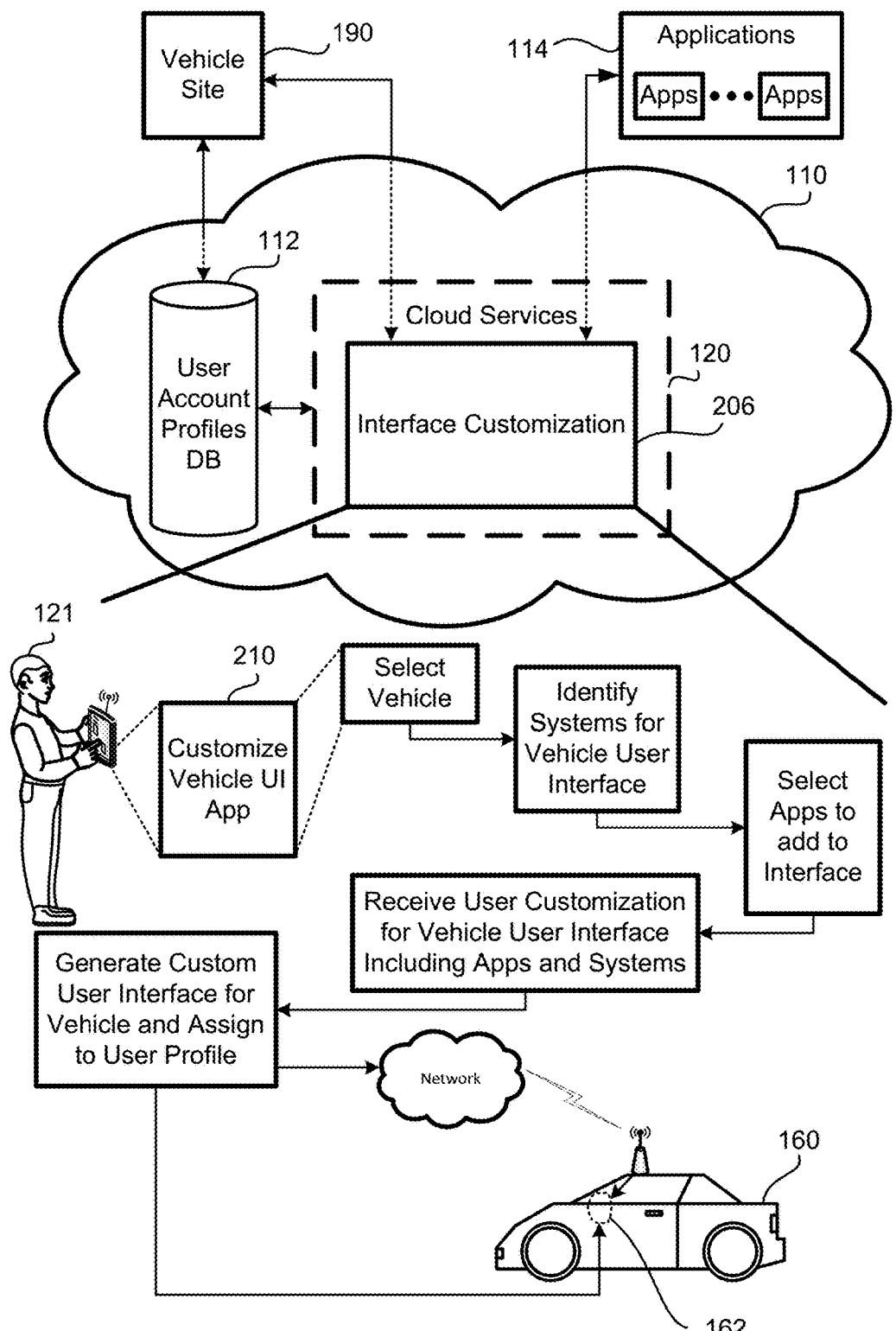
FIG. 5 illustrates a system and use diagram, of the configuration of the user interface, in accordance with one embodiments of the present invention.

FIG. 5 illustrates a system and use diagram, of the configuration of the user interface, in accordance with one embodiments of the present invention. As shown, applications 114 may be selected by a user that wishes to generate a custom configuration for a vehicle. In one embodiment, the user may go to a vehicle website 190 where the user may select a vehicle system component that matches the vehicle that the user wishes to customize. In one embodiment, the user would establish a user account in a cloud service of the vehicle manufacturer, or a third-party site that provides customization features for the vehicle manufacturer.

The cloud services 120 may provide interface customization 206 tools that will allow the user to select the application 114, select the system component for the vehicle, and arrange the selected applications, arrangement of the applications on the display screen, settings for the different applications, etc., to thus define a custom configuration for the user interface. The custom configuration will then be saved to a user profile database 112, which saves the custom configuration and provides access to the custom configuration for updates from time to time by the user, or for updates provided by the vehicle manufacturer.

In one specific example, a user 121 can visit a website, an app, or a portal to customize a vehicle display 210 using tools provided by a website that allows the customization. The tools can include pull-down menus, selection icons, text entries, radio buttons, arrangement and customization feature selectors, program settings, etc. The user can access the website using any user device. The user device can also include setting the custom configuration via a vehicle 160. In general, the configuration can be made using any device that has access to the Internet.

In operation 220, the user will select a vehicle using the tools provided by the website. Selecting the vehicle will allow the correct selection of the system component for that vehicle, and any other updates or parameters defined by the vehicle manufacturer. The systems for the vehicle user interface will then be identified in operation 222. A tool than be provided to allow selection of the apps to add to the interface in operation 224. As mentioned in this disclosure, the user can select any number of applications to add to the custom configuration. From time to time, the user can select additional applications to add to the custom configuration or removed from the custom configuration. In operation 226, the user customization for the user interface will be received including the defined applications and systems.

In operation 228, the custom configuration will then be generated and can be assigned to the user profile of a user account, in a database(s) of websites handling the cloud services 220. In some embodiments, the website may be hosted in a distributed manner, using virtualization and distributed data centers. The distributed data centers can then communicate data and process operation to the vehicle to execute the applications and system components, and provide resources from third-party applications and applications over the Internet.

The generated custom configuration can then be transferred to the vehicle 160 and operated using vehicle electronics 162. Vehicle electronics 162 can also include a display. As mentioned above, the display can be a single display or a plurality of displays. The displays are configured to generate images for various screens, selections, icons, buttons, controls, and received touch input and communicate text information and other data to users.

Figure 6:
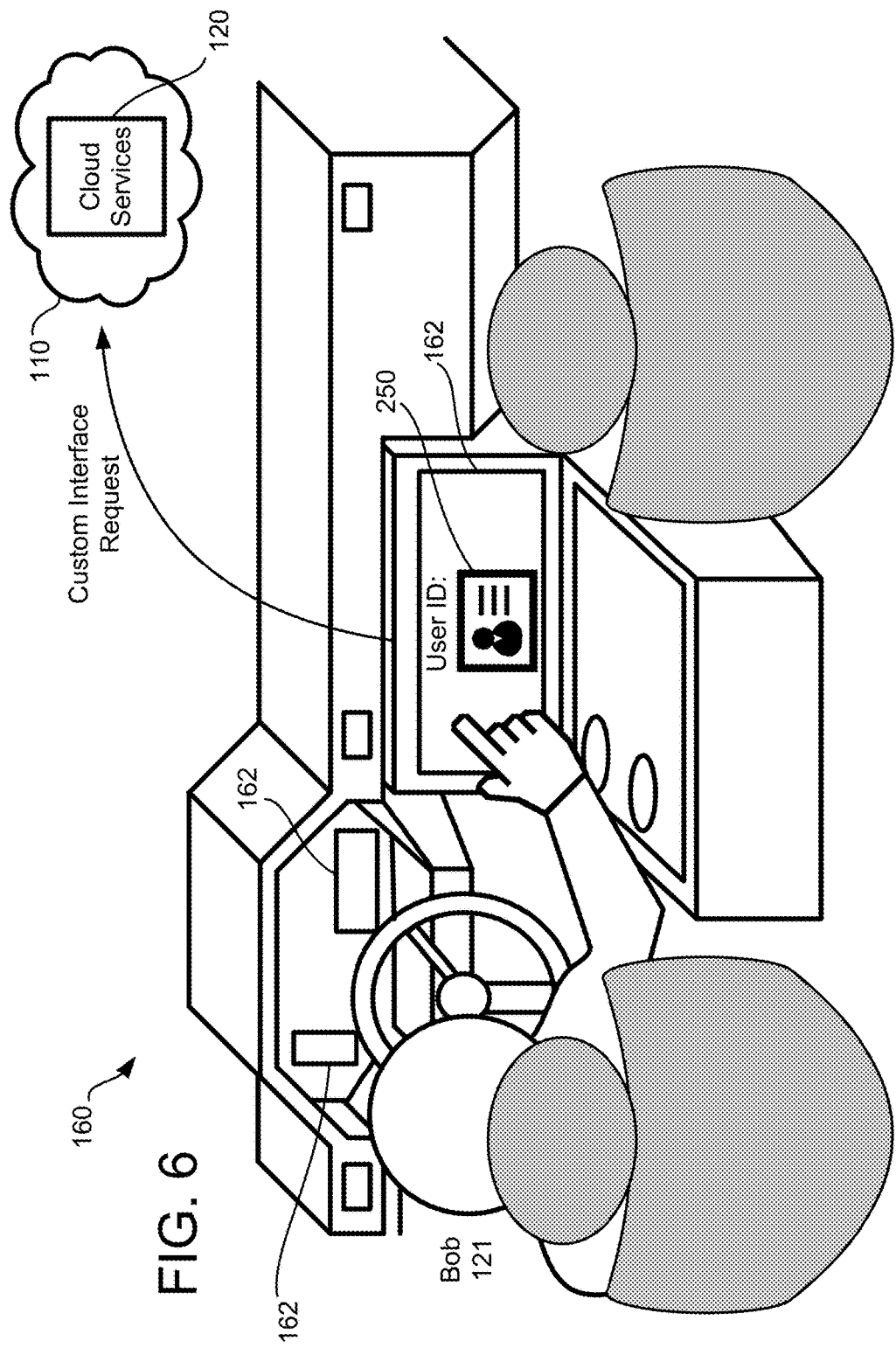
FIG. 6 illustrates an example of user interfacing with a display in the dashboard of vehicle, in one embodiment.

FIG. 6 illustrates an example of user 121 interfacing with a display 162 in the dashboard of vehicle 160. In this example, the display 162 will produce a user interface 250 that requests the user to input a user ID. The user ID can be any credentialing type input. The credentials can include usernames and passwords, keys, alphanumeric entries, biometric inputs, voice inputs, retina scan inputs, fingerprints, face recognition, etc. In FIG. 6, user 121 will enter the user ID which would then send a custom interface request to cloud services 120, over the Internet. As mentioned above, vehicle 160 is connected to the Internet, or is connected to the Internet at particular times. When the vehicle 160 is connected to the Internet, the request can be sent to cloud services 120, to request the custom configuration for the user.

A user having an account with cloud services 120 will have previously defined custom configurations that may be downloaded or accessed without download for the specific vehicle. The vehicle ID would be sent to the cloud services 120 by the vehicle upon sending the request for the custom configuration.

Figure 7:
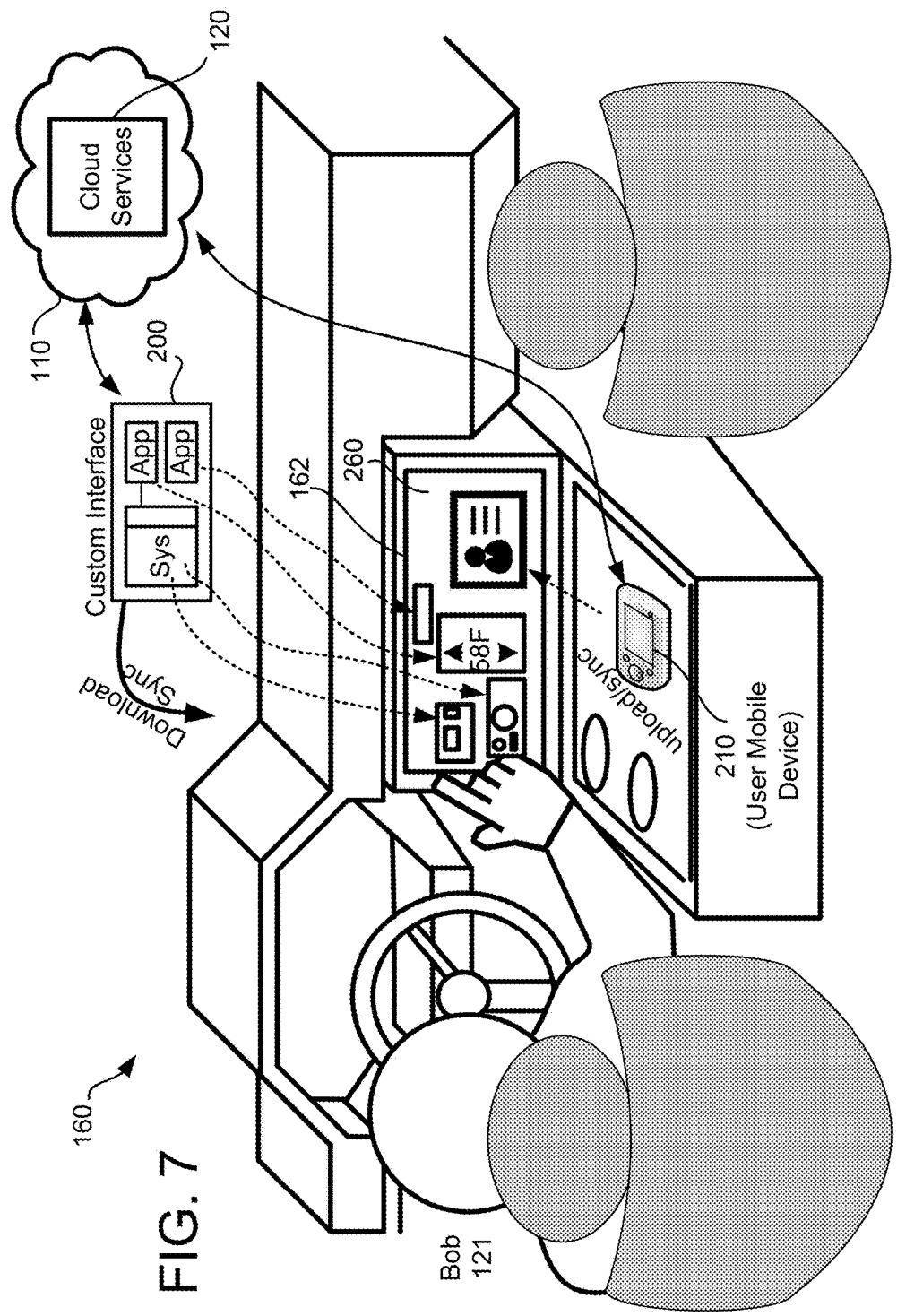
FIG. 7 illustrates how the custom configuration that provides the interface defined by the user is downloaded to the vehicle electronics and the display of the vehicle in one embodiment.

FIG. 7 illustrates how the custom configuration 200 that provides the interface defined by the user is downloaded to the vehicle electronics and the display 162 of the vehicle 160. The display 162, as noted above, is only an example display, and display can be of any size and can include multiple displays. For simplicity, a single display 162 is shown in FIG. 7.

In this example, the display 162 is populated with user interfaces for the system as well as the applications. As shown, app interfaces may be presented in specific locations in the user interface as well as system interfaces that are provided in other specific locations in the user interface. In one embodiment, the definition of where the specific user interfaces for the systems and the apps are to be defined is set by the user during the configuration process.

In other embodiments, the positioning and layout or arrangement of the specific components of the user interface, whether they are system interfaces or app interfaces, may be custom arranged by the system over time based on use patterns. The use patterns of the user can be learned by the system so as to arrange the various system components and app components in various locations of the display 162. In other embodiments, certain interfaces will be surfaced (e.g., shown or presented) on the display at certain times of day, certain times of the week, certain times of the month, certain times of the year, etc. Better placement of the app components and system components, and programming of data into the components can be optimized over time based on learning the input patterns provided by the user to user interface.

For example, if the user always views the weather in the mornings at 8 o'clock or 9 o'clock and a.m., then the weather icon or interface will automatically start to be surfaced (e.g., show or displayed, or illustrated (visually or audibly) on the display during those times. If the user plays rock 'n roll rock music on the weekends and classical music during the weekdays, this preference will also be learned. Learning of these preferences will act to custom define the layouts and placement of the icons and user interfaces on the display over time. In still other embodiments, the specific placement, location, and arrangement of the apps, system components, buttons, controls, etc., will be preset and fixed by the user based on predefined settings.

These predefined or learned settings can be saved to the database in cloud services and associated with the user account. Updates to the settings can then be made at any time by accessing cloud services over the Internet using any device, whether the devices are in the car, of the car, a portable device, a home computer, a work computer, a tablet, a smart phone, a smart watch computer, etc. Also shown in FIG. 7 is an embodiment where a user's smart phone or mobile device is synchronized with the user interface of the vehicle 160. In this embodiment, the user's portable device 210 can synchronize and upload content and UI controls from applications stored and running on the portable device 210. This provides for safer driving, as the controls shown on the vehicle display can be restricted based on driving or operation status.

In one embodiment, the user can custom configure to have content from applications running on the portable device 210 to be displayed in the vehicle displayed 162 in a specific location. This location on the display can then be synchronized or mirrored to that part of the display based on the configuration. In still other embodiments, the custom configuration can determine to synchronize an application running on the portal device to occupy the entire display 162. For example, if the user wishes to use his own telephone calling interface and contacts that are stored on the portable device 210, that information can be populated and mirrored to the display device 162, while still using other system components or other applications of the vehicle in the background or in a separate screen that is not currently active. In this example, the portable device 210 as well as the vehicle electronics can communicate with cloud services 120 at the same time, or when specific functions, data or communication is required.

Figure 8:
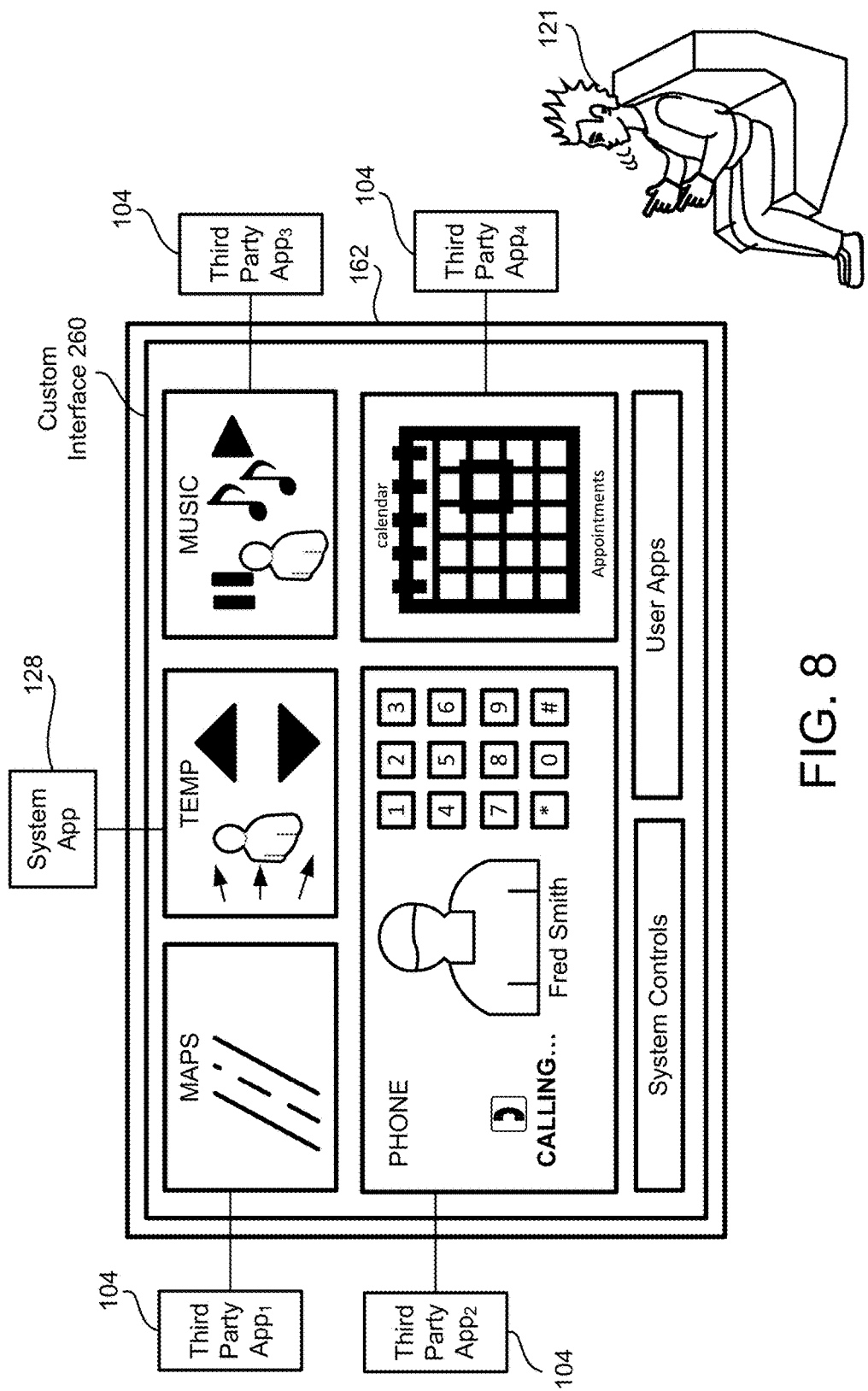
FIG. 8 illustrates an example where a display device of the vehicle will illustrate and render different applications or application components in user-defined locations, in one embodiment.

FIG. 8 illustrates an example where a display device 162 of the vehicle will illustrate and render different applications or application components in user-defined locations. In this example, different parts of the display contain different components or applications, which are custom designed or laid out by the user in the custom configuration. In one embodiment, the applications can be third-party applications, which are custom designed to operate with the system component of the vehicle. In this manner, the user can decide to get third-party apps 104 to replace certain applications provided by the system.

However, the user that defines the custom configuration can decide to maintain certain system component applications 128. The custom interface 260 may therefore include a hybrid of third-party applications and system applications, all designed to be laid out arranged and provide the look and feel/functionality desired by the user. In this illustration, a third-party app 104 is provided for a calendar. The calendar may be synchronized with a user's online calendar, which automatically populates the user's data to the vehicle user interface. The radio app may also be a third-party app, which may have radio stations that are a mix of land-based radio and Internet radio. Scores from time to time, the user can then arrange the location of the specific applications to different portions of the display.

Still further, certain applications can increase in size when being used or decrease in size to enable selection at a later time. For example, selecting the temperature system component may expand the system component to a larger space, thus temporarily removing other displayed components. The user can also select other buttons to access other system controls, other apps, or modify or add applications or system controls. When modifications are made, the modifications are saved to a user database and profile of the user, as managed by cloud services.

Cloud services will therefore allow any future modifications to be made to the custom configuration at any time and from any computer connected to the Internet. Still further, the custom configuration can be transferred to a second vehicle. If the custom configuration is transferred to a second vehicle, the system can select the system components for the second vehicle and attempted do a best match of applications available for the second vehicle that resemble or match the ones used in a first vehicle. Specific settings, arrangements and other features may also be transferred to a second vehicle, by simply transferring the custom configuration to a second vehicle.

Figure 9:
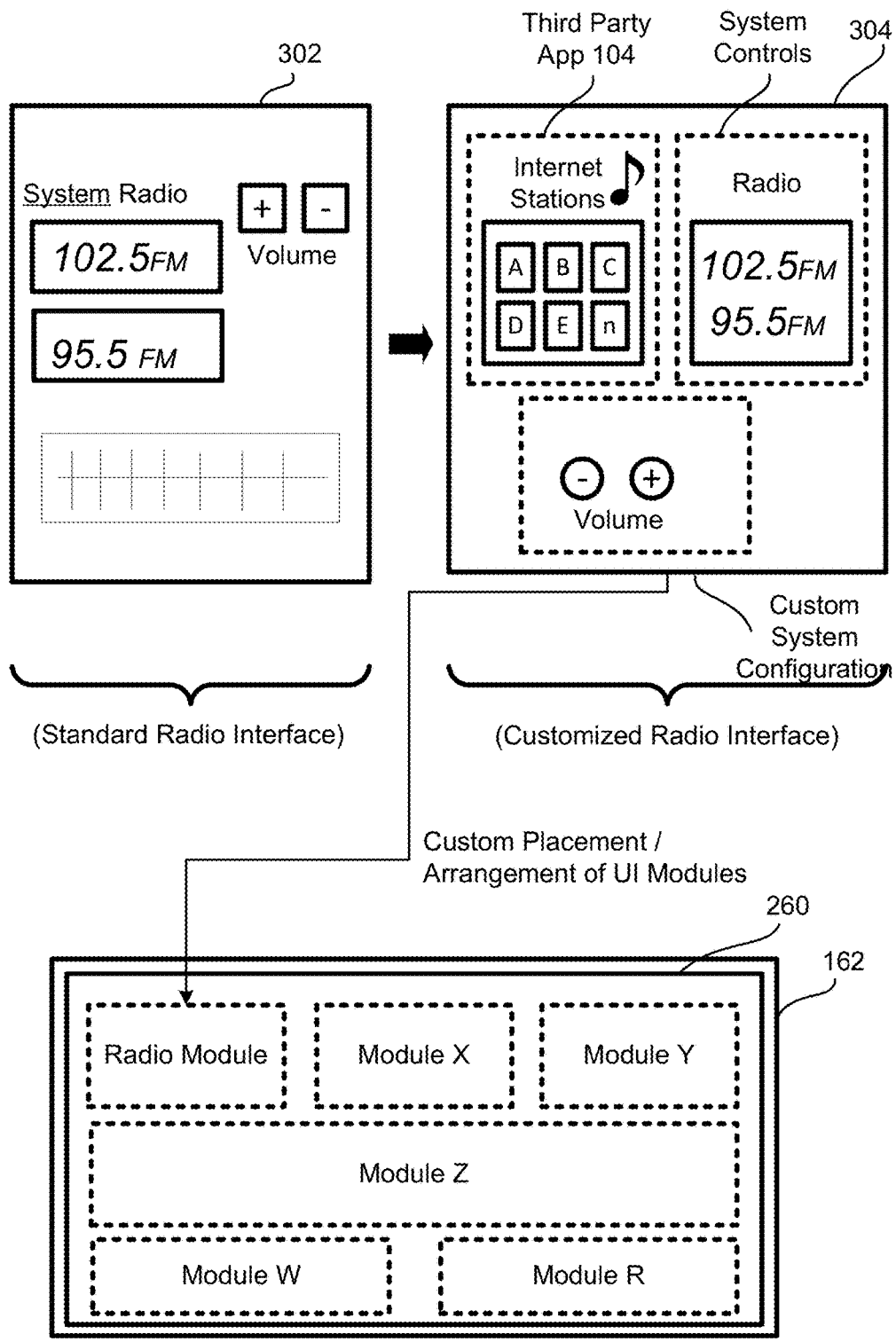
FIG. 9 illustrates an example of customization operations that can be performed, in accordance with one embodiment of the present invention.

FIG. 9 illustrates an example of customization operations that can be performed, in accordance with one embodiment of the present invention. In one example, a standard radio interface 302 is shown having standard radio functions, such as text controls icons and the like. If a user does not like the radio interface 302 provided by the manufacturer of the vehicle, the user may choose to replace the radio system 302 with a third-party application 104, that provides a customized radio interface. In one example, the application 104 can provide an interface 304, which has a number of sections or areas. These areas can be customized in one embodiment, or can be defined by the developer of the third-party application 104.

If the sections are customizable, the user can select certain portions of interface 304 to be provided by another third-party application 104. For example, interfaces can be used to customize the entire system component, such as the entire radio 302 interface, or the customize radio interface 304. The interface can be itself customized by adding sub applications or subcomponents of code that define smaller user interface sections for the custom system configuration of a radio.

Once specific modules have been customized, either by selecting pre-customized third-party applications, or by constructing a custom module, these modules can be arranged to define a custom placement or arrangement of user interface modules to be displayed on a vehicle display 162. The customized display 260 can therefore be defined by a plurality of modules, which may be provided or obtained by adding third-party applications to the custom interface design by the user, or by moving or arranging existing user interface components provided by the manufacturer to specific locations on a screen arrangement. Other customization features can include, adding custom backgrounds such as images, pictures, and other multimedia components to the display.

In one embodiment, the custom interface can include smaller icons/GUIs that identify specific applications that were added to the custom interface, that when selected expand to provide the functionality of the applications. The applications can be minimized or maximized on the screen. In one embodiment, the functions of the specific applications illustrated in the display 162 will be monitored and restricted depending on safety considerations while driving. For example, if the interfacing functionality requires more interactivity with the display, or requires a reading of text or inputting text, those functions will be disabled during operation of the vehicle. Once the vehicle comes to a stop, or is placed in Park, certain of these functions will be activated. In other embodiments, other safety considerations will allow for applications to shift from outputting text to outputting audio or voice. The input can also be changed from touchscreen, button touches, selections, and/or voice input. In still other embodiments, safety considerations can allow certain user interface components to move about the display to provide easier reading while driving or automatic conversion of text to audio.

For example, content being displayed in the center panel display of the vehicle, can be automatically shown in the dashboard display region of the vehicle, such as in front of the steering wheel. In still other embodiments, some content or display data can be moved from the center console or the display in front of the steering wheel to the windshield of the vehicle in a heads-up display area. Accordingly, algorithms executed by the applications and applications of the manufacturer, can cooperate to provide functionality to the application features and interfaces, while maintaining safety parameters defined by rules. The safety parameters will therefore allow content of the user interface to be shifted around to various displays of the vehicle, or translated to voice or audio at certain points in time.

Figure 10:
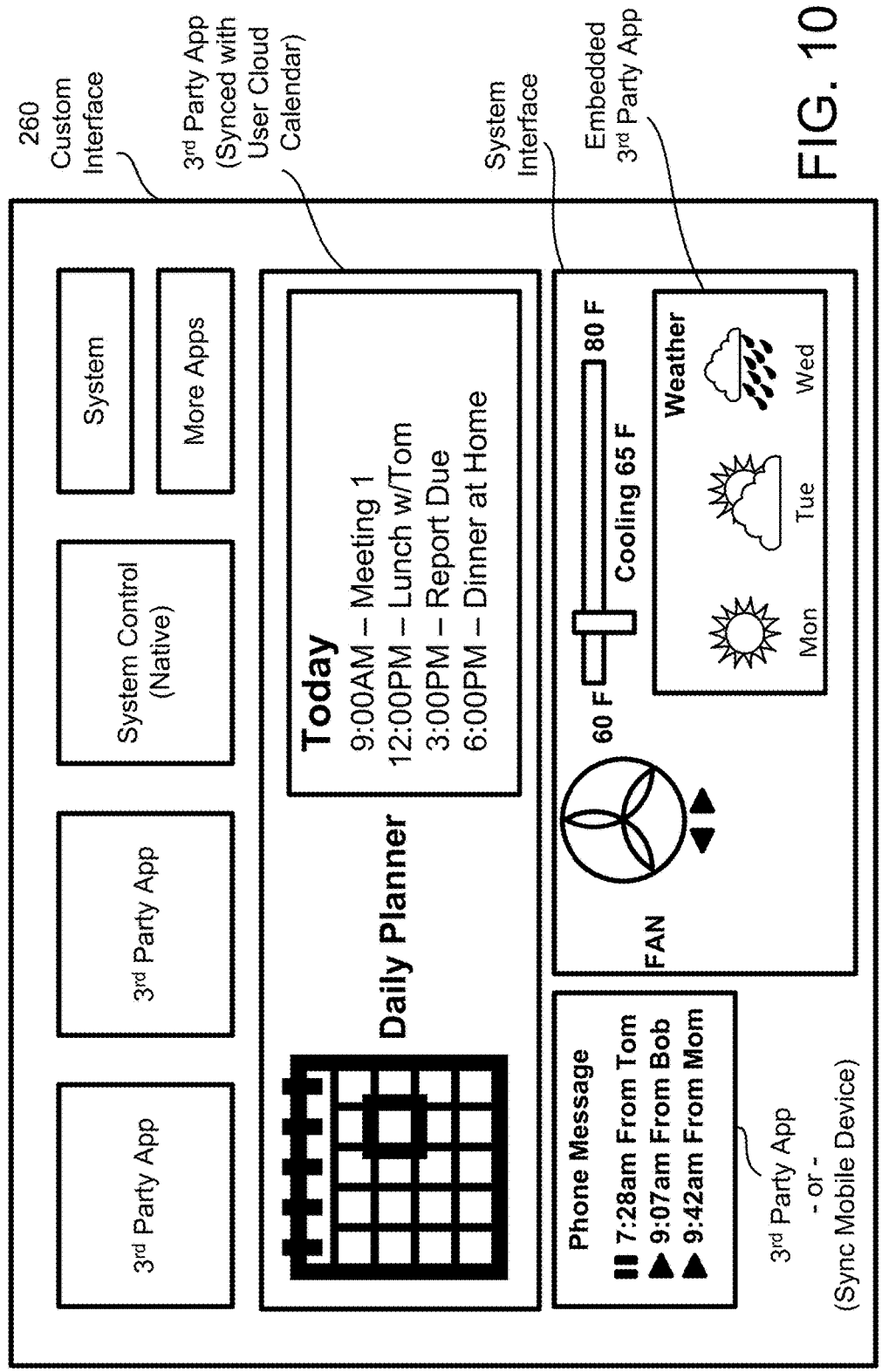
FIG. 10 illustrates an example of a custom interface, in accordance with one embodiment of the present invention.

FIG. 10 illustrates an example of a custom interface 260, in accordance with one embodiment of the present invention. As shown, the custom interface 260 includes various components or modules. The various components and modules can be arranged or defined by suggested arrangements during the customization by the user. As mentioned above, the customization by the user can be facilitated by allowing access to tools and website applications that allow selection, arrangement, dragging, color definition, size definition, positioning definition, and other custom controls. The custom controls can also be used to define settings for the various components. The settings can include programming and custom alarms, settings of when particular types of music should be played, radio station selection, pre-turn on of the vehicle at certain times to provide heat to the vehicle or cool the vehicle in advance, and other remote access, monitoring, image detection, security features, and associated settings.

These settings and customizations can be made through the web/cloud services and tools provided by the website of, for example the manufacturer of the vehicle. In one embodiment, the cloud services provided by the manufacturer can be provided by a partner of the manufacturer. The partners of the manufacturer can include software companies that develop, host, or manage certain functionality provided by the vehicle manufacturer. In other embodiments, the partner software companies can integrate tools or components with tools and components of the vehicle manufacturer. This provides for an integration with one or more cloud services, software services, Internet services, and services provided by systems of vehicles or systems of the vehicle manufacture. In either case, whether the software and logic is designed and constructed by one or more entities, the cloud services provided by the vehicle manufacturer or the website that provides the tools for customization will appear as a unified simple to use interface for the user. As mentioned above, the cloud services can provide databases for saving the user profile and data associated with the user account.

The user profile can include settings made by the user, customizations made by the user, identification of applications purchased or added to the vehicle customizations, etc. Still further, the user profile data can be part or be associated with the user account. In this manner, the user that customized a user interface can access the Internet at any time, whether through the vehicle or through any other computing device having access to the Internet and make changes, modifications, or access control features of the vehicle remotely. In one embodiment, the profile of the user can be accessed from any vehicle, such as rented vehicles or shared vehicles. Settings and profile data can then be shared for a period of time on any vehicle and use data on that vehicle can be stored.

Continuing with the example of FIG. 10, it is shown that several of the components of the custom interface 260 can include applications from 3rd parties, or applications and controls provided by the vehicle manufacturer. In one embodiment, an application provided by third-party, such as an online calendar, can be synchronized with the user's calendar managed by a 3rd party or stored by a 3rd party on a website. For example, if the user uses a cloud service to store his or her calendar, the calendar appointments can also be displayed on the vehicle interface, and are synchronized to the users global calendar settings that are accessible through any computing device. In one embodiment, the daily planner can include data or information for the user, such as reminders to purchase or get certain things. If while the user is driving around those certain things can be purchased or obtained from local merchants, the user can be provided with notifications of availability of those particular things or goods the user desires to purchase.

In still other embodiments, advertisers can provide data to the user that is relevant to the user, such as discounts for the goods or services the user wishes to purchase. In still another embodiment, an application can be provide for the vehicle that provides a user the ability to set and to find certain things, such as goods and services the user needs. As the user drives around, and algorithm determines whether certain goods or services are available in the proximity of the vehicle's driving actions. If the vehicle approaches or is near certain goods and services, and such goods and services are advertised to have a discount or availability, the user can be notified on the user display, or by audio output by the vehicle. This functionality can be enabled or disabled on demand, as programmed by the user in the application that's added to the user interface.

Still in FIG. 10, it is shown that other applications can be embedded into other applications. For example, the standard system interface for the temperature control and fan of the vehicle can be customized to add additional features. For example, in addition to the controls for the standard vehicle settings, the user can also be provided with controls to access or add additional applications. These additional applications can be embedded or overlaid on other applications. In one example, and embedded application can allow user to embed a weather application, which is synchronized to an Internet service. In other embodiments, other applications such as phone messages, notes and the like can be synchronized with an Internet application or with a local device.

The local device might be the user's mobile phone, the user's computer wristwatch, the user tablet computer, the user's laptop computer, or the mobile device of a person inside the vehicle. In one embodiment, data from the local devices can be synchronized locally to the display of the vehicle in selected regions. These selected regions of the display can be defined by the user during customization, or can be defined automatically by the system based on sizing areas on the display, relative to other applications or features displayed on the one or more displays of the vehicle.

Figure 11:
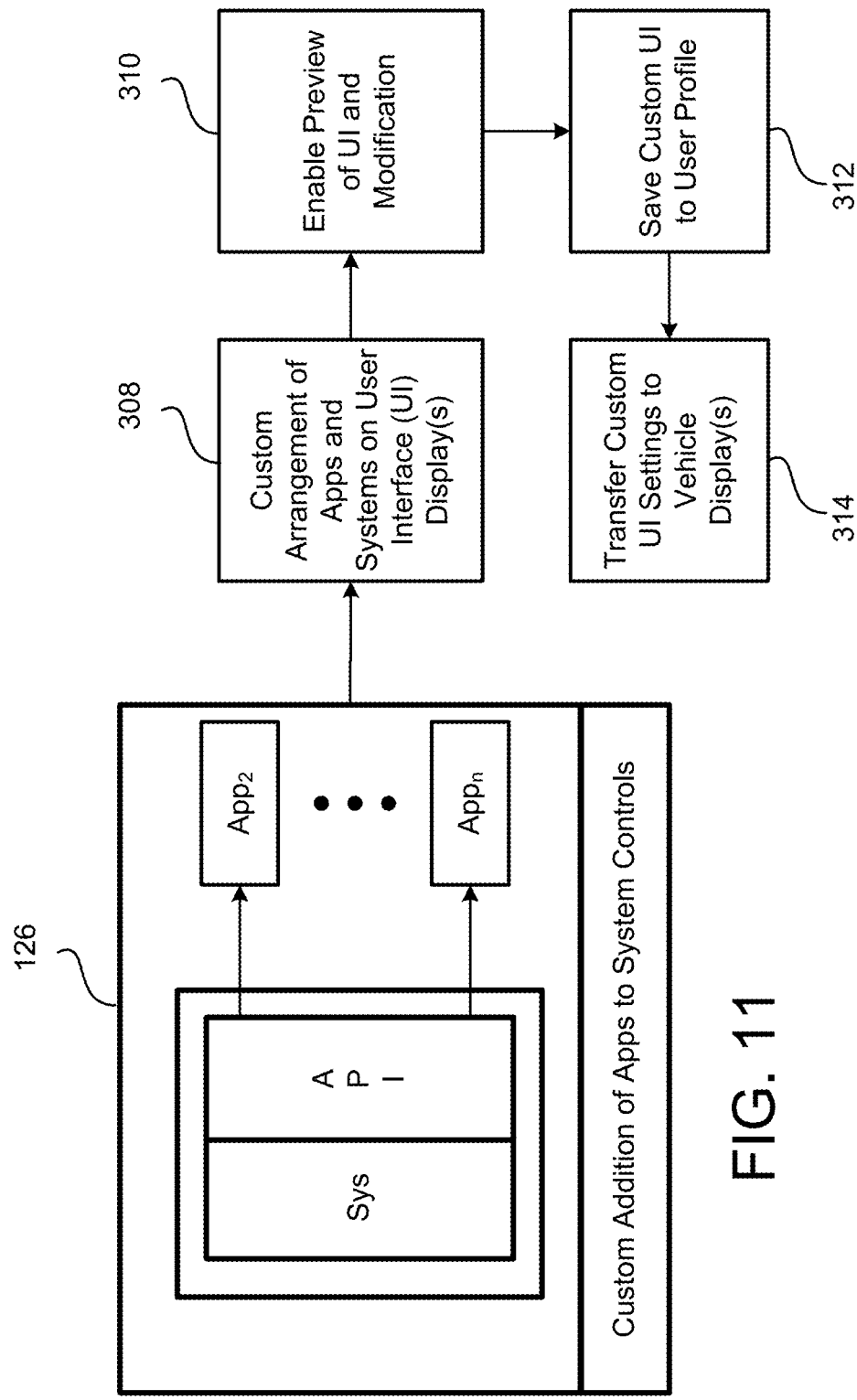
FIG. 11 illustrates an example of a system component with its APIs, and interface with a plurality of applications selected by the user, in accordance with one embodiment.

FIG. 11 illustrates an example of a system component with its APIs, and interface with a plurality of applications 126 selected by the user. The user can select add or delete applications from time to time to define custom addition of apps to the system or to replace system controls. Once the user has selected the certain applications, a custom arrangement of the apps and systems on the user interface display can be enabled. As mentioned above, the customer arrangement, definition, placement 308 of certain components or applications on a display can be customized by the user.

Also noted is that the system can automatically arrange or move certain applications or components on the display depending on size constraints, or other features that are synchronized with system settings. In operation 310, the user can be provided with tools to enable preview of the user interface and allow for modifications from time to time. The customization can then be saved to the user profile or user account in operation 312. In operation 314, the custom configuration can then be transferred to the UI settings of the vehicle to allow for display, in accordance with the arrangement configuration, selection of applications configuration, and rules enforced by the vehicle manufacturer to enable safety and use of the applications and features.

Figure 12:
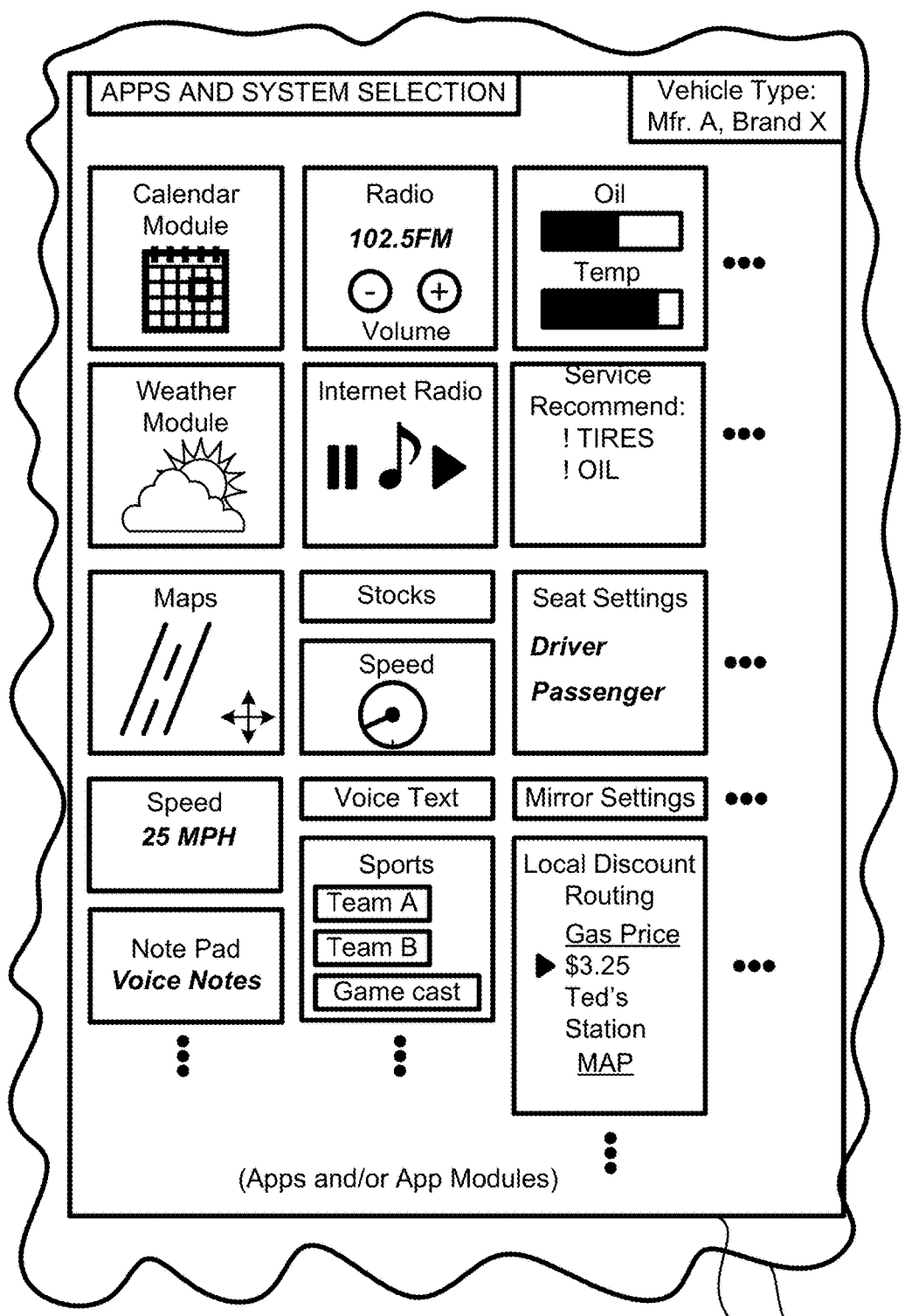
FIG. 12 illustrates an example of apps and system selections features, in accordance with one embodiment of the present invention.
Figure 13A:
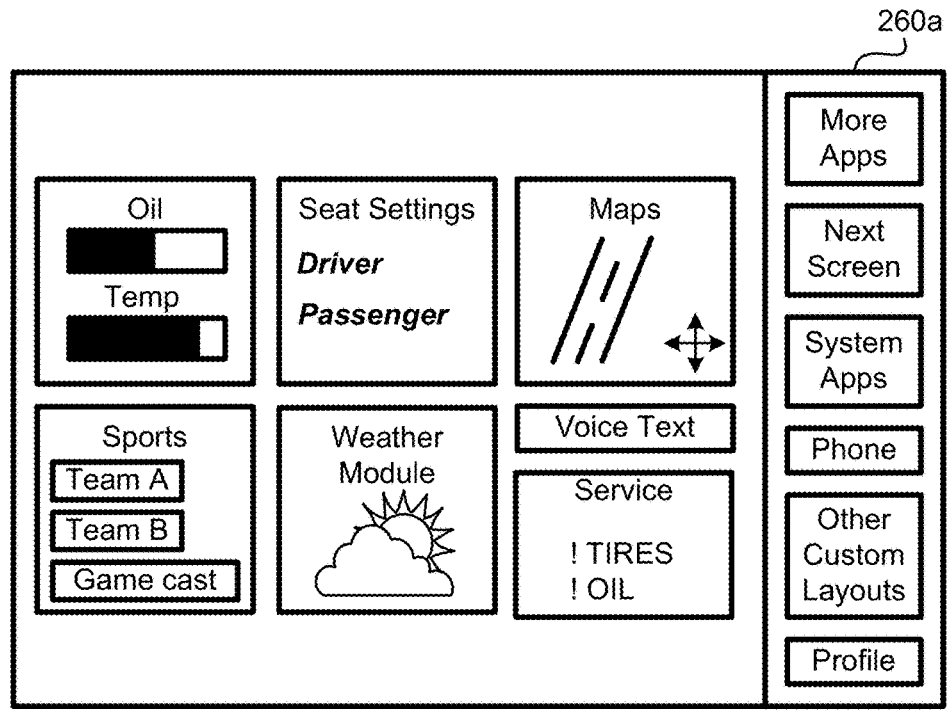
FIGS. 13A-13D illustrate examples of different user interfaces that can be defined by the user, in some embodiments.
Figure 13B:
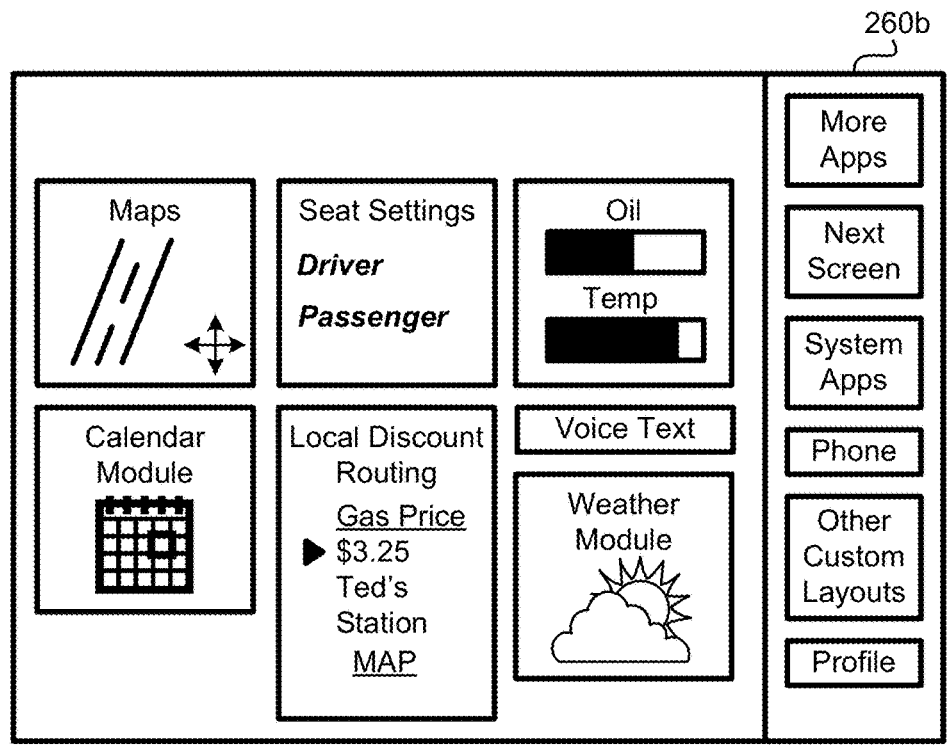
Figure 13C:
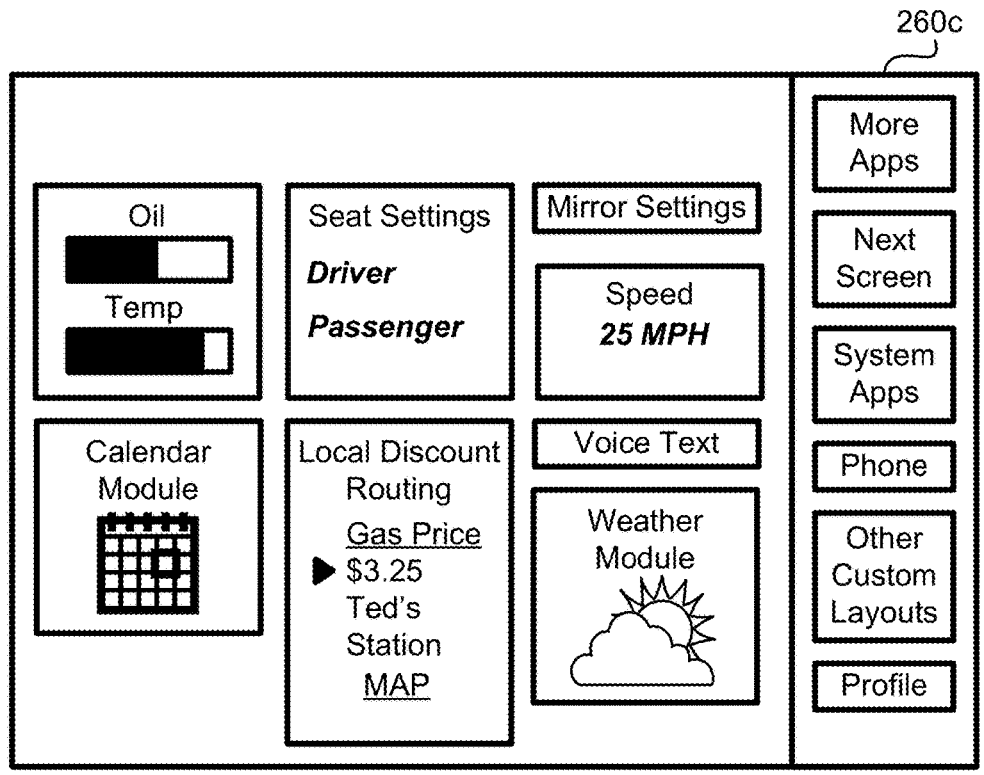
Figure 13D:
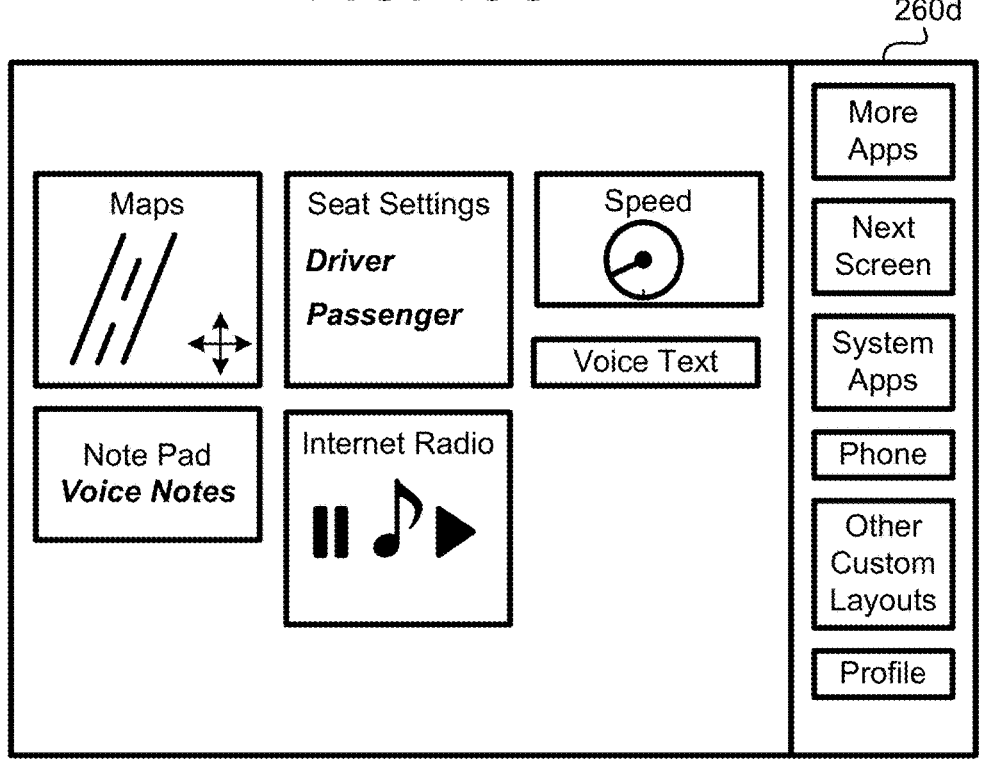

FIG. 12 illustrates an example of apps and system selections features 210, in accordance with one embodiment of the present invention. In one example, the user can be provided with a number of applications to select when accessing cloud services over the Internet 110, for addition to a custom configuration. In one embodiment, once the user has selected the vehicle type, manufacturer and brand of the vehicle, the user is provided with an automatic listing of certain applications that are available for that vehicle for customization. In this illustrative example, which is not exhaustive of all possible types of user interfaces and selection menus and presentation types, the user can be provided with icons that illustrate example user interface that can example apps that may be added to the vehicle or vehicle customization. As noted above, the customization can be provided with apps, as well as widgets, or code that can be added to the display. The apps and code can be provided by 3rd parties or the manufacturer of the vehicle, or both.

FIGS. 13A-13D illustrate examples of different user interfaces that can be defined by the user. Again, these different configurations and arrangements are provided simply as an example. Additionally, although only one displays being shown, the configuration can be made for multiple displays in a single vehicle. Most commonly, the display is one that can be located in the center console of a vehicle. However, often the display can also be incorporated as the main display in the dashboard, which shows and illustrates common dashboard system readings and data. These can include, for example, the speed of the vehicle, the RPMs of the vehicle, the fuel level of the vehicle, the temperature of the vehicle, the battery life of the vehicle, the battery and range of an electric vehicle (EV), and related data. Thus, the customization can be for any display in the vehicle, including displays in passenger areas of vehicle.

As shown in FIGS. 13A-D, various ones of applications can be located in different locations of a display screen. Although the display and features of the display are described as being applications, the icons can represent access to the applications and the icons can expand to encompass the entire screen or part of the screen at various times of use. In one embodiment, the user can customize the display directly from the display, by selecting more apps, can view different screens by selecting a next screen, can access system applications, can access the phone, can provide for other customizations and layouts, can update the profile. As noted earlier, the custom configuration can be set for a particular user.

When the user is not using the vehicle, the custom configuration can be turned off or locked out for another session. Once the user wants to start a new session, the user can log back in and the custom configuration returns. In other embodiments, the custom configuration will automatically turn off when the user is not driving the vehicle or has not logged into the vehicle. In other embodiments, the custom configuration can be automatically turned on when the user is detected. The user can be detected using biometrics, login credentials, image detection of the face, fingerprint detection, retina scans, etc. Still further, the custom configuration can be transferred to other vehicles.

If the user wishes to use his or her custom configuration in another vehicle, the user can login to the custom configuration or user account from another vehicle. If the other vehicle does not have all the system components needed to define the custom configuration, the custom configuration can be supplemented with other similar components automatically. In other embodiments, the custom configuration can be transferred from one vehicle to another, or when the user buys a new vehicle. In another embodiment, the custom configuration can be adjusted based on the driver. The custom configuration can also be preset remotely from the Internet, using the cloud services. The custom configuration can also be configured to provide limited use of certain systems or the vehicle, such as when a guest is driving the vehicle. In other embodiments, restrictions can be placed on the vehicle speed, location of driving, and automatic notifications for the user or the master user of the vehicle. The master user of the vehicle can have a master account with administrator credentials.

In still another embodiment, the vehicle can be loaned to a child of driving age (under 21/18 years of age), and the child can be provided with restricted use of the vehicle. When the child exceeds or does not follow the restrictions of the vehicle, automatic notifications can be provided to the user that is the administrator of the vehicle. The notifications can be by cell phone, smartphone, tablet computer, mobile device, text messages, phone calls, commendations of phone calls and text, audio messages, audible sounds, vibrations, and commendations thereof. History use of the vehicle can also be maintained in cloud services. The history use can provide the user with information as to where the vehicle has been, the speed or events, violations that occurred when use of the vehicle etc. The configuration can also provide messages to the driver warning the driver of when the vehicle has exceeded a restriction, or is approaching a restriction in use, driving area, speed, etc.

Figure 14:
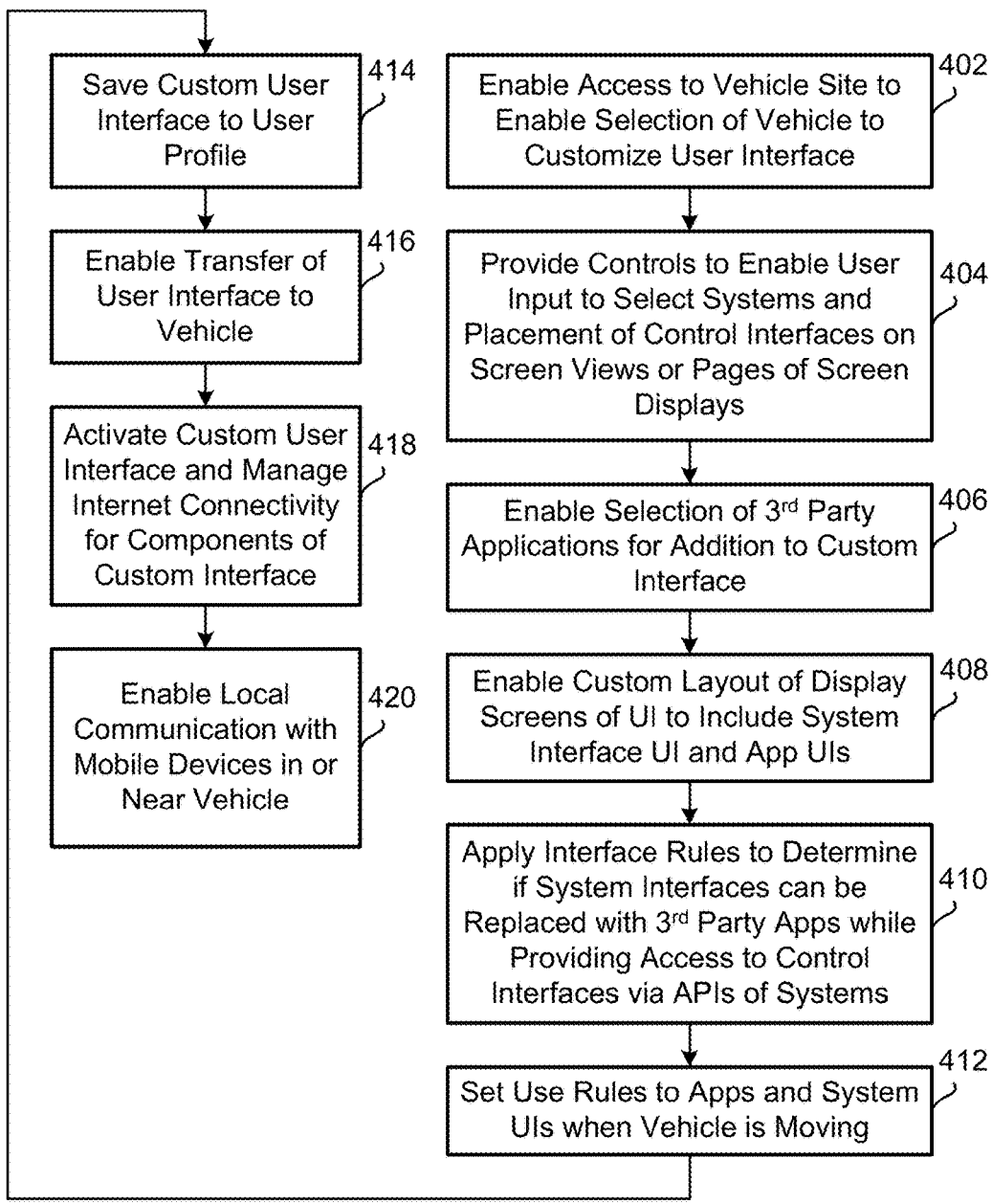
FIG. 14 illustrates example flowchart, of operations performed to generate a customized user interface for vehicle, in accordance with one embodiment of the present invention.

FIG. 14 illustrates example flowchart, of operations performed to generate a customized user interface for vehicle, in accordance with one embodiment of the present invention. In one embodiment, the method begins by enabling access 402 to a vehicle site to enable selection of vehicles to customize for user interface. The access to the vehicle site, may be granted by supplying credentials for accessing a user account, or establishing a new user account. The vehicle sites may, in one embodiment, include cloud processing to enable access to features provided by the website including features provided by other services and software accessible over the Internet.

In operation 404, the method provides controls to enable user input to select systems and placement of control interfaces on-screen views or pages of screen displays. The screen displays can have various configurations, placements, sizes, number of pages, tabs, etc., and the user can provide controls for some or all of the interfaces and controls in certain locations. In operation 406, selection can be enabled for third-party applications. The third-party applications can be selected from the vehicle site, or by providing links to third-party sites. The third-party applications can be pre-identified by the site and displayed to the user if they are compatible with the particular vehicle selected. In another embodiment, the third-party applications can all be shown to the user whether or not they are compatible with the vehicle. Upon binding/pairing or attempting to find application for the vehicle, compliance as to whether the applications operate or comply with the particular vehicle can be made.

As mentioned in this disclosure, certain third-party applications can be reviewed by the vehicle site administrators before they are made available to users for selection. In other embodiments, the third-party applications can be approved or disapproved. In still other embodiments, the third-party applications can be augmented with restrictions made by the vehicle manufacturer, or dictated by law. The restrictions can be applied, based on the anticipated interfacing with the vehicle interfaces, to ensure safety during driving. For instance, if a particular application requires entry of text, navigation of controls, or other activities that would distract the driver during operation of the vehicle, such vehicle controls or application controls for application interfaces can be temporarily disabled. In some embodiments, when the vehicle has come to a stop or is place to park, certain controls or interfaces can be re-enabled. In operation 408, the tools provided by the vehicle site or third-party site can provide for customization of the layout of the display screens of the user interface.

The customization can include organizing or laying out system interfaces as well as application interfaces, such as those interfaces provided by 3rd parties. In operation 410, interface rules are applied to determine if the system interfaces can be replaced with third-party application interfaces, while providing access to the control interfaces via the APIs of the systems. For example, if the user wants to provide a custom speed indicator, the speed indicator should be compliant (via APIs and/or mapping) with the system interfaces so that the speed readings can be populated to the third-party application. In operation 412, rules can be integrated with or applied to the applications and system user interfaces for when the vehicle is moving. As mentioned above, such rules can limit interactivity with certain user interfaces while the vehicle is moving to prevent unsafe driving. In operation 414, the custom user interface is saved to the user profile.

The user profile may contain settings, such as selections of the user interface components associated with the system of the vehicle, as well as user interface is provided by third-party applications. In addition, the user profile can contain and store settings provided by the user. The settings provided by the user, as mentioned is this disclosure can also be learned settings based on use. The settings can further include remote access settings, as well as settings allow the user to control vehicle components from a remote location or a remote computer. The setting can also include providing access to the user account to view historical driving patterns, recent driving activities, the performance of the vehicle during specific driving sessions, the performance of specific vehicle components, etc.

In operation 416, the custom user interface configuration can then be transferred to the vehicle. The custom configuration, as mentioned above is stored in the database of the vehicle manufacturer, or a database held by a 3rd party that cooperates with the vehicle manufacturer to provide cloud services. The database, in one embodiment, is a network accessible storage which allows access to the user to program and modify the user interface using any computer or device having access to the Internet, including the vehicle itself or a third-party vehicle. The method then proceeds to operation 418 where the custom user interface can be activated in managed for Internet connectivity for components of the custom interface. For example, the vehicle's Internet access protocols can be set, or registered with an Internet provider or service provider for the cloud services. The service provider for the cloud services can be the vehicle manufacturer, a company cooperating with the vehicle manufacturer, a third-party company, or combinations thereof.

In operation 420, the method can also enable local communication with mobile devices that may be in the vehicle. The enablement may be provided by allowing synchronization with the computing system of the vehicle, or with the computing communications of the portable device. For example, the local communication can be paired automatically, based on a preset pairing process where pairing keys are entered. This provides for automatic settings and synchronization when the user enters the vehicle with the portal device. As mentioned above, user interfaces associated with applications loaded on the user's portal device can also synchronize to the display screens of the vehicle, as predefined by the user.

Figure 15:
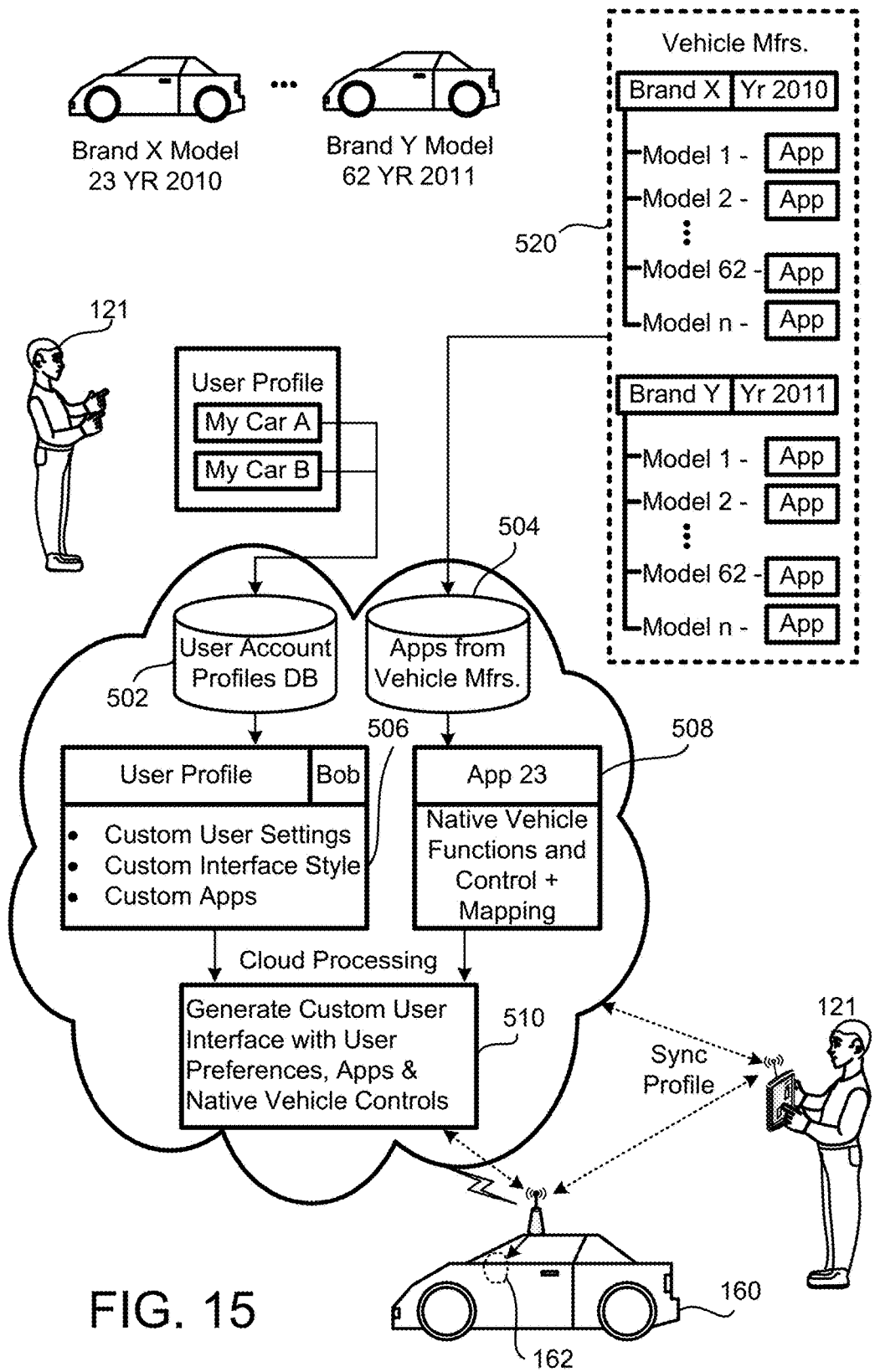
FIG. 15 illustrates another example, where a user uses a portable device to access the user profile, for one embodiment.

FIG. 15 illustrates another example, where a user 121 uses a portable device to access the user profile. The user profile, as mentioned above, can be managed by the cloud processing 120. The cloud processing may include a user profile database 502 (and other databases not shown) that allows the user to synchronize settings for various profiles, such as for "my car A", and "my car B", or the like. In one embodiment, the custom configuration can be transferred from vehicle to vehicle and for a period of time. The period of time can be a driving session. The driving session can be for a trip, a day, a week, a rental period, a lease period, etc. If the new vehicle receiving the profile has different system components, a re-mapping of system components to applications can be made. In some embodiments, alternate applications can be plugged in for the new vehicle which provides functionality similar to the application in the earlier vehicle.

Accordingly, the disclosed methods may allow users to add various vehicles to the user profile, including cars from different brands 520, such as Brand X and brand Y. In the illustrated example, the user profile for the user 121 may include custom user settings, custom interface styles, custom applications, and other custom settings and learned settings as described in this disclosure.

The users also able to select various applications from an application database 504, which may provide a plurality of applications from vehicle manufacturers, and the user can select applications for the vehicle types selected. In one embodiment, certain applications can include native vehicle functions as well as control and mapping protocols to allow the applications to interface with native system controls through appropriate map APIs. In operation 510, the custom user interface can be generated using cloud processing with the preferences set by the user, the applications, the native vehicle controls, and the customer arrangements. The profile that was generated can then be synchronized to the vehicle, such as car A.

The synchronization may include downloading of the customized interface from cloud services to the vehicle. In other embodiments, part or all of the customization created on the portable device or other computer can be transferred to the vehicle directly, without requiring transfer from cloud processing. In other embodiments, the synchronization or transfers can include operations performed by portable devices local to the vehicle, computing devices on the vehicle, computing devices of cloud processing, or combinations thereof.

Figure 16:
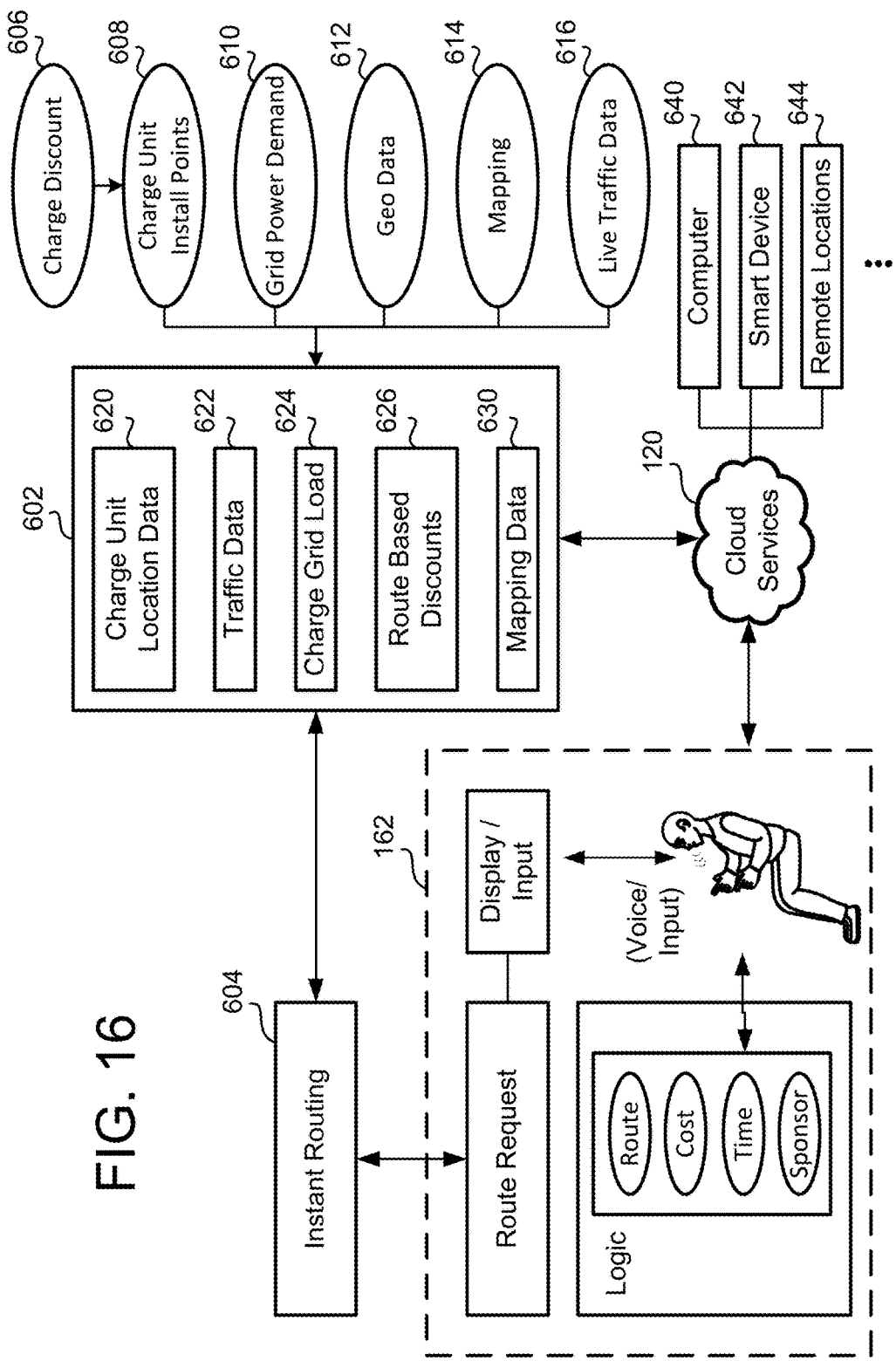
FIG. 16 illustrates an example of synchronizing other applications to a vehicle display, which may be customized by the user, for one embodiment.

FIG. 16 illustrates an example of synchronizing other applications to a vehicle display, which may be customized by the user. As shown, 602 shows a number of data collection and data interface modules, that can interface with third-party applications or applications executed on the Internet by cloud services or third-party cloud services. As shown, in the case of an electric vehicle, data associated with charge unit location data 620 can be collected from charge unit install points 608. The charger unit install points can also be providing charging discounts 606, which can then be transferred to data manager 602. Traffic data 222 can also be collected, whether the vehicle is electric or nonelectric.

Charge grid load 624 data can also be collected, for example for electric vehicle data. Charge grid load 624 can obtain data from a grid power demand source 610, which can include power company's local utilities and the like. Route based discounts 626 can also be provided to the user, by collecting mapping data 614 as well as discounts provided by goods and services providers in the marketplace. Mapping data 630 can also be managed, to monitor the location of the vehicle in relation to goods and services that may be provided when the vehicle is in proximity. In some embodiments, discount data, advertisements, sales, goods and services offers, etc., can be provided to the user automatically based on the vehicle's location.

In other embodiments, the user can provide settings in the user interface that identifies which type of offers or discounts or information the user wishes to receive. In some embodiments, alerts regarding offers and discounts can be provided to the user in an audio manner, to avoid driving distractions. Live traffic data 616 can also be provided to the data manager 602, as well as geo-data 612. The data manager 602 is in communication with cloud services 120, to provide these services to computer 640, smart devices 642, remote location 644, and a display of the vehicle 162.

The display the vehicle can be interfaced with logic that runs on vehicle electronics. The vehicle of products can include memory and processors that execute instructions, operating systems, API processing, application management, telecommunications, network accessing, local communication with wireless devices, and general communication with the Internet. Route request can also be provided at the demand of the user via the display 162, and instant routing 604 can provide routes to the user based on data collected and managed by data manager 602.

Figure 17:
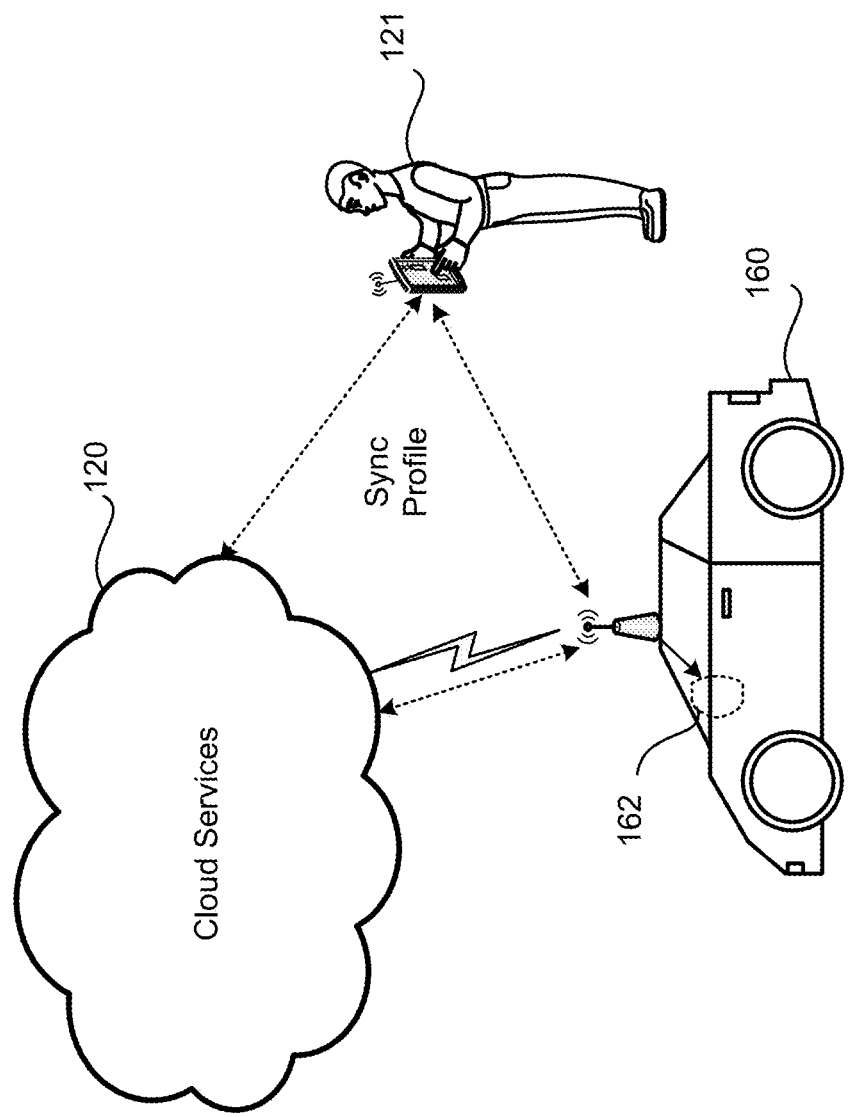
FIG. 17 illustrates example where the user holding a portable device can synchronize data from the portable device directly with the display of the vehicle, in one embodiment.

FIG. 17 illustrates example where the user 121 holding a portable device can synchronize data from the portable device directly with the display 162 of the vehicle. The display the vehicle can be a display on the dash of the vehicle, or any other location as mentioned in this disclosure. As mentioned herein, the vehicle electronics will be provided with communication with cloud services 120 provide access to the customize displays, customize settings, and customized services provided to the user as a vehicle drives.

Figure 18:
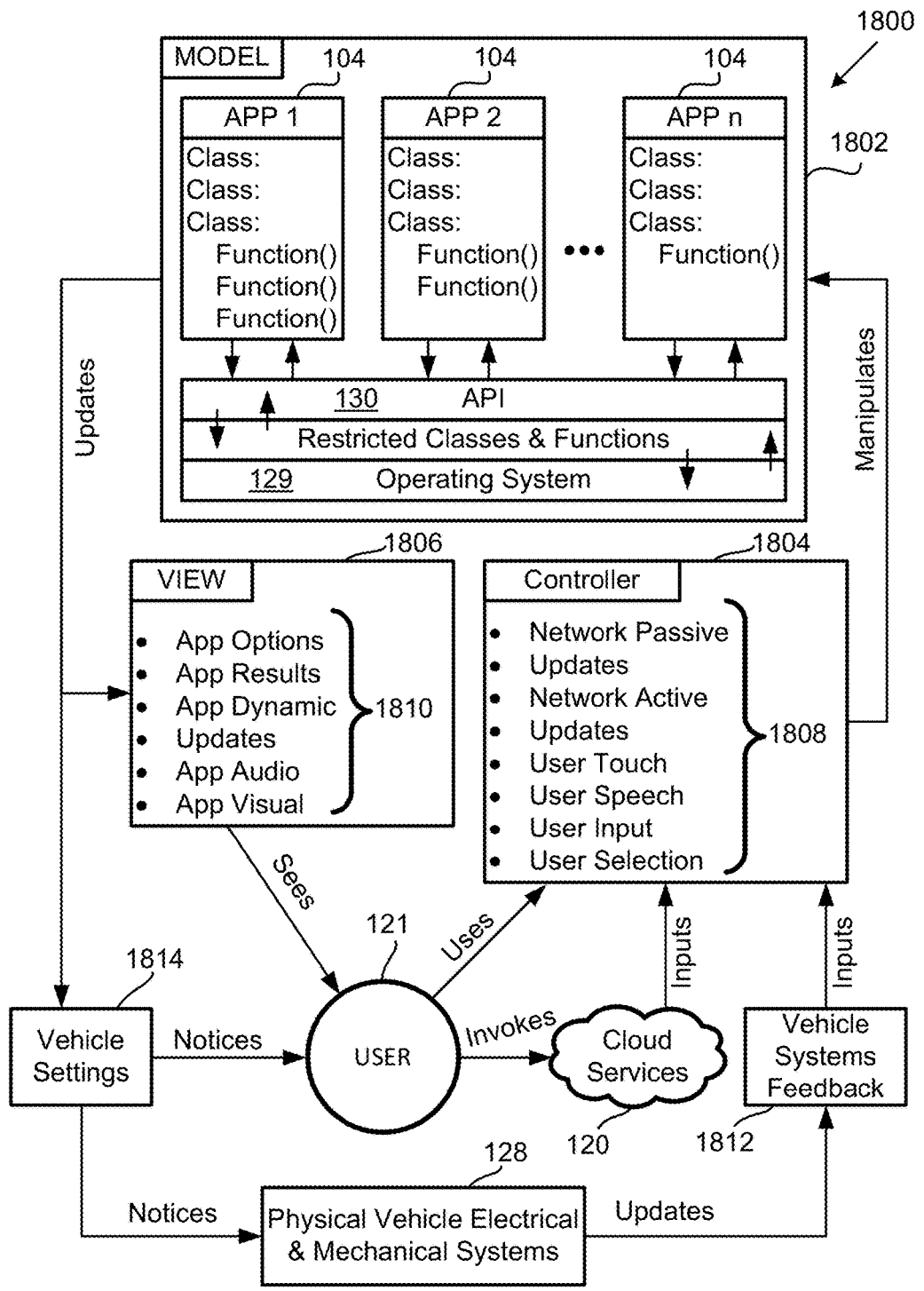
FIG. 18 describes a system in which a user interacts with a model view controller software environment useful for processing APPS using APIs on vehicles with vehicle operating systems capable of processing computer code, in accordance with one embodiment.

FIG. 18 describes a system in which a user interacts with a model view controller software environment 1800 useful for processing APPS using APIs 130 on vehicles with vehicle operating systems 129 capable of processing computer code. The model view controller paradigm 1800 shows basic interaction, control, processing, and updating of data useful for manipulating and viewing resulting actions by to vehicle running an APP in such a system. Such a system useful for running APPS on vehicle operating systems will accept inputs by a user 121, cloud services 120 via data streams, vehicle systems feedback and data streams 1812 used by a controller 1804 that may constantly poll electrical, capacitive and physical sensors, and input streams to detect if interactions 1808 such as network passive updates, network active updates, user touch, user speech, user input, user selection among others has been triggered.

Each input 1804 will then trigger manipulation of the system's model 1802 portion of the APP software paradigm thus invoking stored routines within APPS 104 which then in turn interact with the vehicle's API system 130 built upon the vehicle's operating system 129. Depending on the app presented to the user 121, the input may trigger stored routines or functions on APP software or operating system level restricted stored routines or functions.

After the processing of stored procedure code is manipulated with arguments provided by the controller 1804 inputs, visual and or sensory results are presented to the user in the view 1806 portion of the model view controller paradigm. These sensory outputs, data streams, electrical signals may all be translated as additional options, results, dynamic updating, and audio or visual graphical user interface changes 1810 on any of the user's connected display devices. The user will notice these results visually or audibly but may also feel or detect changes in the vehicle's mechanical systems. Updates from the model 1802 may also be used to toggle vehicle settings 1814 which in turn may invoke changes in the vehicle's physical, mechanical and electrical systems 128.

Then, the system controller 1804 may receive additional updates from the vehicle systems affected or additional user 121; cloud services 120, vehicle systems feedback inputs 1812 to re-engage the user in a cyclical fashion. If no inputs are sensed, the system's controller will continue to poll its electrical and data I/O systems for input on a continuous basis.

The model view controller paradigm 1800 described is one example of the software input output lifecycle that may be used to invoke, manipulate, process, update portions of computer readable code such as APPS 104 using an intermediary API 130 to communicate with the vehicle's operating system 130. However, APPS 104 may be run on physically wired, wirelessly connected or remote devices having processing abilities to translate the computer readable code in APPS into actionable invocations on one or more vehicles in order to facilitate or utilize the vehicle's electrical and mechanical systems in prescribed or customizable fashions.

Figure 19A:
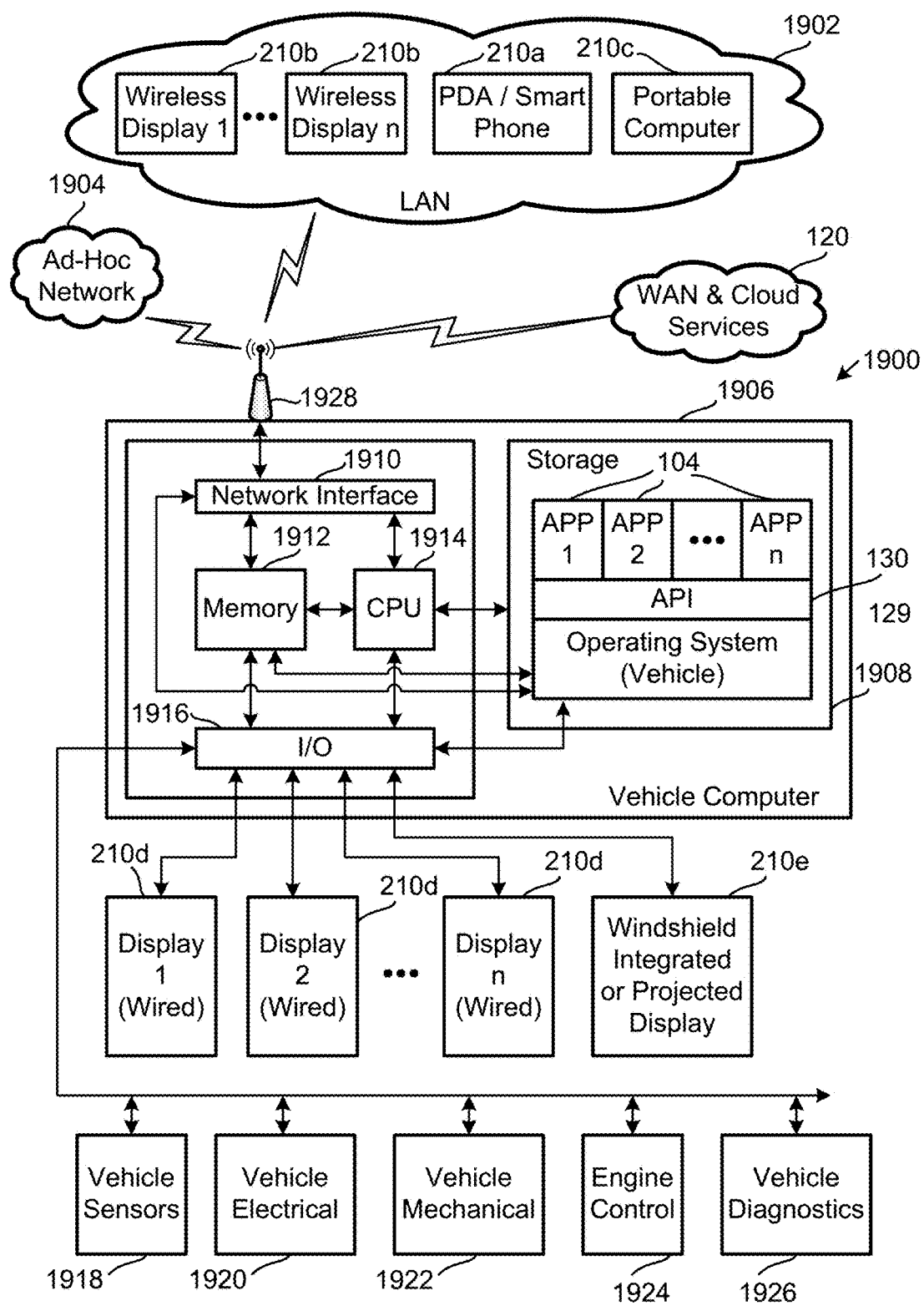
FIG. 19A describes how vehicle on board computer with input out put system useful for accepting input, processing input and displaying results in conjunction with stored computer readable programs or functions in the forms of APPs may be structured, in accordance with one embodiment.

FIG. 19A describes how vehicle on board computer with input out put system 1900 useful for accepting input, processing input and displaying results in conjunction with stored computer readable programs or functions in the forms of APPs 104 may be structured. Although system 1900 describes one way to provide vehicle on board computing power to run APPs 104, the arrangement of the vehicle computer 1906 may be altered or arranged in differing fashions with differing connection routing in order to achieve the same. In this example, vehicle on board computer 1906 may be comprised of components such as the network interface 1910, memory 1912, a central processing unit 1914, an input output buffer useful for streaming data 1916, storage 1908 having the ability to store computer data in long term or short term fashion useful for stored computer code procedures in the form of an operating system 129, intermediary stored procedure code in the form of APIs 130, stored subsets of computer code procedures APPs 104 interacting with API 130 as an intermediary to the operating system 129.

In this example, the vehicle computer 1906 has the ability to transmit, receive and process information using wired or wireless connections. One such wireless connection is provided by a wireless data sending and receiving antenna 1928 connected to a network interface 1910 useful for pairing with and communicating data with portable or stationary wireless devices which may or may not be part of a network 1902. Such wireless devices include but are not limited to wireless displays 210b, portable smart phones 210a, portable computers, 210c and even stationary objects, structures, buildings, toll bridges, other vehicles etc. The vehicle's network interface 1910 through antenna 1928 may also communicate with cloud services 120 to receive instructions from a remote location that invokes stored programs such as APPs 104 on the vehicle's computer.

The vehicle may also send and receive data wirelessly in order to establish a connection with a peer-to-peer ad-hoc network. Invocations may result in output data streams interpreted by wireless devices 210b, 210a, 210c as well as wired devices such as wired displays 210d or vehicle integrated display devices such as windshield heads up projected display or integrated glass displays 210e. All data streams generated by APPs 104 stored on the vehicle's computer may also be triggered by wired devices such as vehicle sensors 1918, vehicle electrical systems 1920, vehicle electrical systems 1922, engine control systems 1924, vehicle diagnostics systems 1926, user input as well as environmental input.

A user and or vehicle may find system 1900 useful in one example, where the user drives the vehicle past an electronic toll bridge where a fee is required to pass the toll bridge. The vehicle's computer will communicate wirelessly as it passes the stationary structure transmitting and receiving information with it as it drives by. The user's vehicle may have an APP 104 installed on the vehicle computer 1906 that can process the input using the computer's wireless antenna 1928, network interface 1910, input output system, 1916 automatically responding to the toll bridge with payment information. Once the payment is received and processed, the APP 104 receives information from the stationary wireless toll taking device which is then stored either locally on the vehicle's storage 1908 or remotely using cloud services 120. The results of the transaction are then sent via data stream from the compute code running on the APP 104 to a display device(s) where the user can visually confirm that the toll was paid, accepted and show the user's remaining balance all through the GUI displayed for APP 104.

FIG. 19B describes one example of how stored data and function declarations may be compiled to provide intermediary access to a vehicle's computer controlling vehicle systems 1950. Such routines, data and functions may be arranged in such a way that limited access is given to third party code on APPs 104 to manipulate certain unrestricted operating system functions and vehicle systems. Such a method of providing the intermediary allowed stored function set to third party code can be referred to as an API 130.

In this example of an API 130, computer readable code is arranged in such a fashion that the type of API is described and in this case, an API that allows third party control of the vehicle's HAVC system is declared. A declaration may be useful for reserving the vehicle's computer long term and short-term memory in order to run stored procedures. The shown declaration 1954 describes an example set of data that may reference memory locations and their contents. The contents of this memory location may be modified by stored procedures 1956 or functions.

This HVAC API 130 has the ability to store data relating to the vehicle's temperature, status, target temperature, split zone temperate, data from electrical and mechanical sensors, calendar dates, error information among others. Invocable functions 1956 are the methods by which a third party APP 104 may manipulate data 1954 on board a computer. Free access is not given to the restricted data on a vehicle's computer, thus a structured method or methods are described for user by third party APP developers. These functions 1956 that may or may not take arguments in order to execute may include functions in the example HVAC API that update temperatures for both the left and right or given zones of the vehicle, toggle are conditioning, allow visual skins on the APP GUI, manipulate schedules and displays etc. The HVAC API 130 described is one example of how one API can control one vehicle system. There may be variations of the APIs for multiple vehicle systems or one superset API that allows access to all of the vehicle's systems through stored procedures or methods.

FIG. 19C describes a set of computer readable and executable code 1970 that can be compiled together by a third party APP 104 developer in the form of an APP. The APP 104 uses structured programming languages to execute stored functions allowed by the vehicle's system API 130. In this example, the APP is a third party HVAC app that allows a GUI to be displayed to a user giving them the option to adjust the temperature on the left or right side of the vehicle up or down. In this case, the APP's GUI has provided a data stream to the APP letting it know that the user has selected to set the temperature on the left side of the vehicle to 80 degrees and the right side of the vehicle to 76 degrees. The APP 104 will then use functions available from the vehicle's API 130 to manipulate the data on the vehicle's storage system which in turn will be electrically polled by sensors, data streams etc. to manipulate the vehicle's electrical and mechanical HVAC systems. The user will notice the result visually by the data provided by the APP to the GUI as well as environmentally as the temperature is changed in the vehicle.

Figure 20:
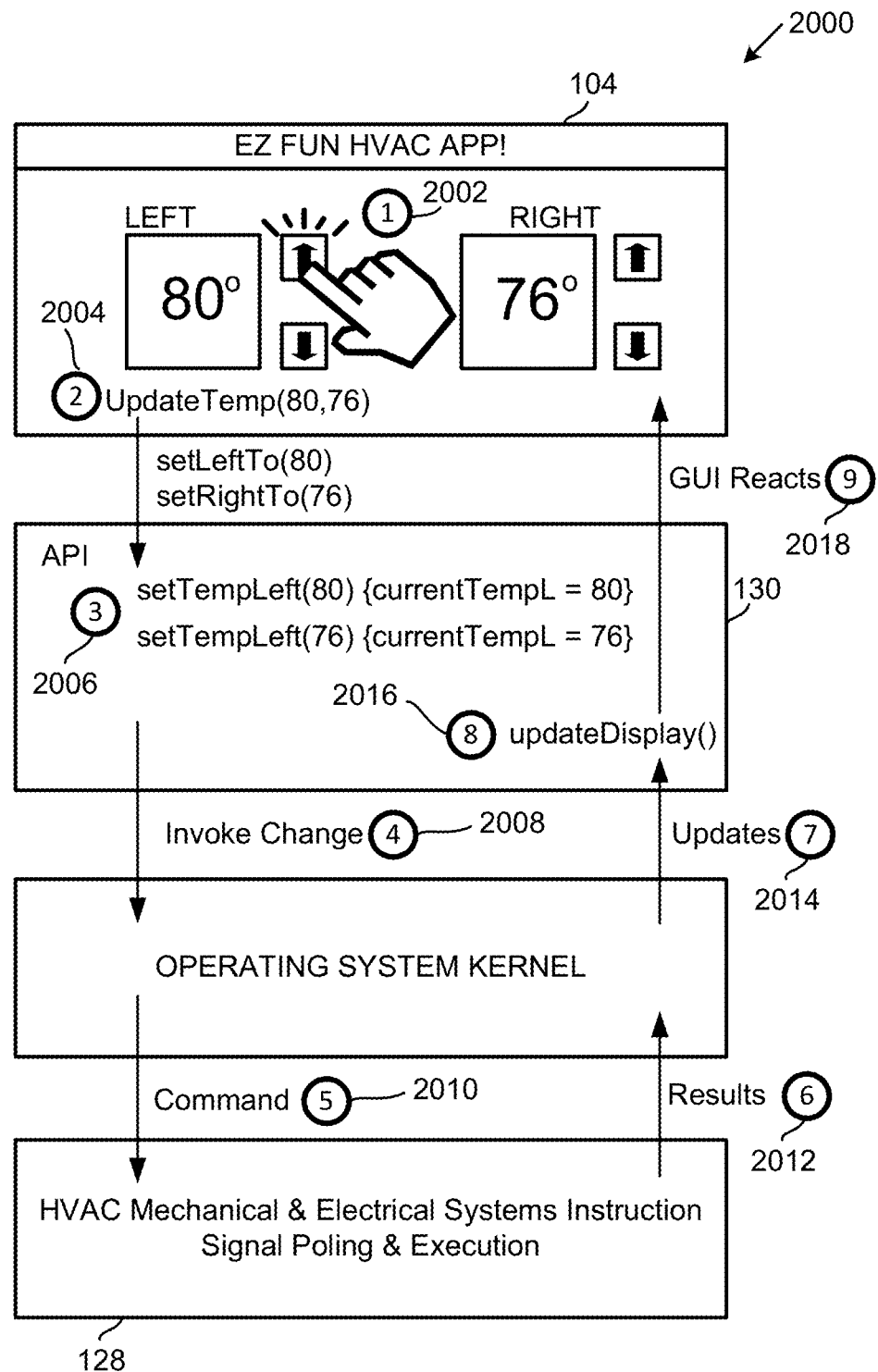
FIG. 20 describes the stepped flow of events as a user interacts with an APP, in this case, an HVAC APP, in accordance with one embodiment.

FIG. 20 describes the stepped flow of events 2000 as a user interacts with an APP 104, in this case, an HVAC APP 104. The GUI shown for APP 104 describes the first step 2002 where a user physically interacts with a sensor, screen, voice system etc. polling to see if an input has been received. The user's input in 2002 has been interpreted by the app to raise the temperature on the left hand side of the vehicle to 80 degrees and maintain the temperature on the right hand side of the vehicle at 76 degrees. This input invokes step 2004, which calls a stored function on the APP 104 that is API 130 allowable with arguments.

The stored function may invoke other helper or associate functions within the API 130 in step 2006, which all in tern invokes restricted computer readable code at the operating system and or kernel level in step 2008. These invocations will then in turn command mechanical and or electrical systems in step 2005 in order to achieve the requested response in step 2002. The results of the commands on the vehicles systems are based back to the vehicle's operating system or kernel level in step 2012 which then updates data on the API 130 in step 2014 that the APP 104 is polling, such as updating the display to show the resulting temperature in step 2016. The results of a function that is invoked at the API 130 level updating the display produces a data stream translatable and displayable by the vehicle's screen showing the APP 104's GUI in 2018.

Figure 21:
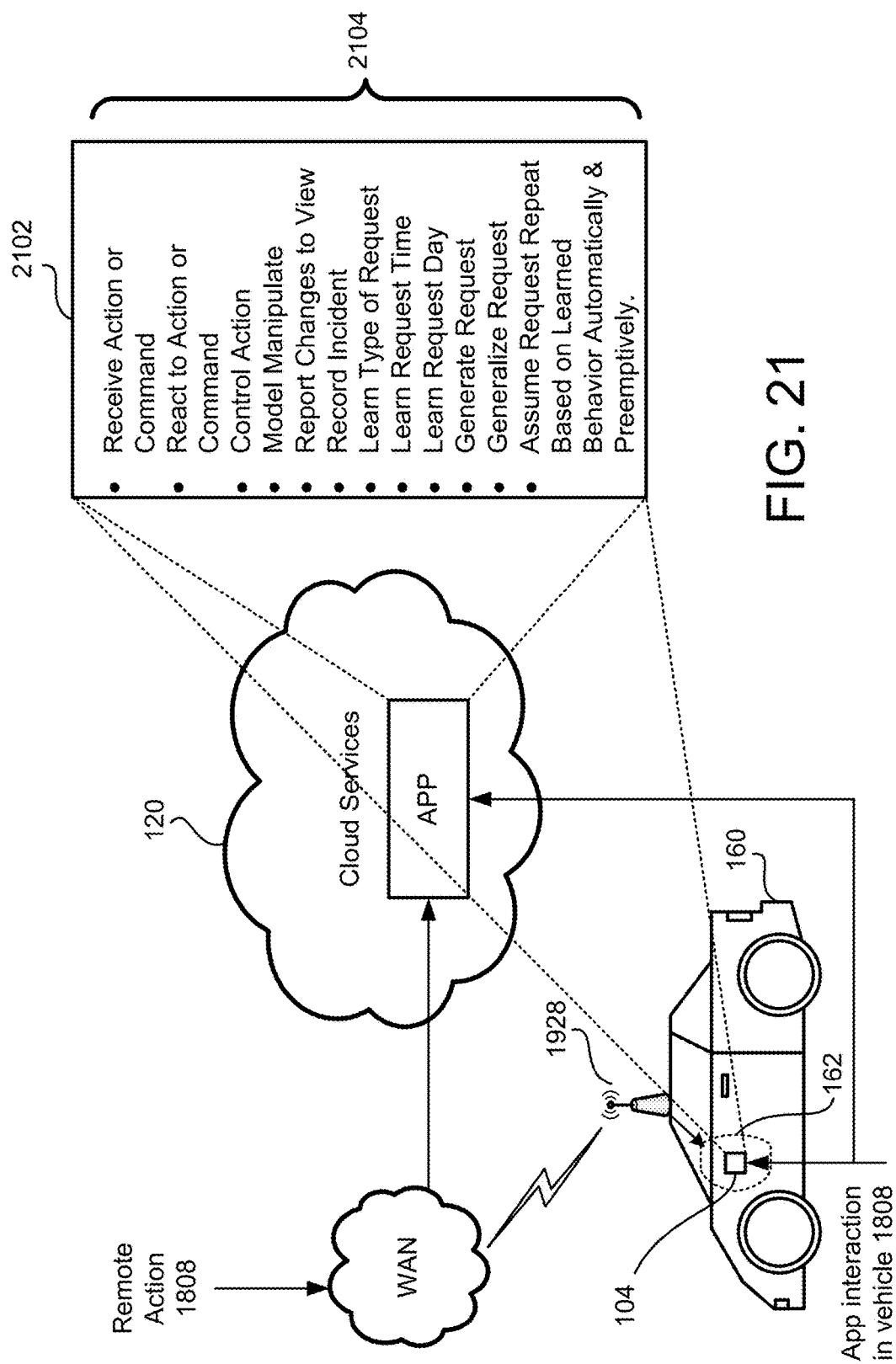
FIG. 21 Describes further ways an APP may take, process and produce results, in accordance with one embodiment.

FIG. 21 describes further example ways an APP 104 may take, process and produce results 2100. FIG. 20 shows a way to interact with an APP 104 locally but a vehicle computer system may relay data, inputs and information to the APP while connected to a wide area network, local area network, cloud process 120 or private cloud. A remote action to invoke change on an APP 1808 may be initiated via a network and pass to the APP running on the vehicle 160 using the vehicle's antenna 1928 or wired interface. An APP 104 running virtually on a network or cloud services 120 may also take input remotely and process the results accordingly.

Some of the inputs and results 2102 that an APP can take and produce locally or remotely include but are note limited to the set 2104 that can receive an action, react to an action, control an action, manipulate data models, report changes to a view or GUI, record events or incidents, learn the types of requests being submitted, learn the times of request being submitted over time, learn the days of the year the requests are being submitted over time, generalize and interpret requests, assume user intent in order to automatically invoke changes, automatically and pre-emptively act on behalf of a user, fine tune learned user behavior etc.

The learned behavior (e.g., learned settings that provide for automatic programming) can be assigned to particular applications, particular sub-features of applications, to particular native system features of the vehicle, or combination of one or more thereof. The learned settings can also be managed via an interface, which shows to the user settings that have been learned and provides the user with options to modify learned settings. The modifications of the learned settings can be made via the vehicle display or any other device having access to cloud services. The learned settings can also be communicated to the user via notifications. Such as, "We noticed you like your truck temperature at 3 pm to be 60 degrees? Please confirm," or "We noticed you like your car temperature at 8 am to be 75 degrees, this will be preset for you automatically," or "We have detected your favorite settings, please login to your account to see settings we have programmed for you or make updates," or other similar notifications via the vehicle or to any connected device over the Internet.

In other cases, notifications may not be sent. In some cases, the settings will just occur automatically. In some cases, the settings can be manually adjusted by the user way from the auto settings. In such cases, the manual setting can be learned and can be provided more weighting since the user took the time to correct an auto setting. Thus, various levels of weighting or importance can be given to learn settings.

Figure 22A:
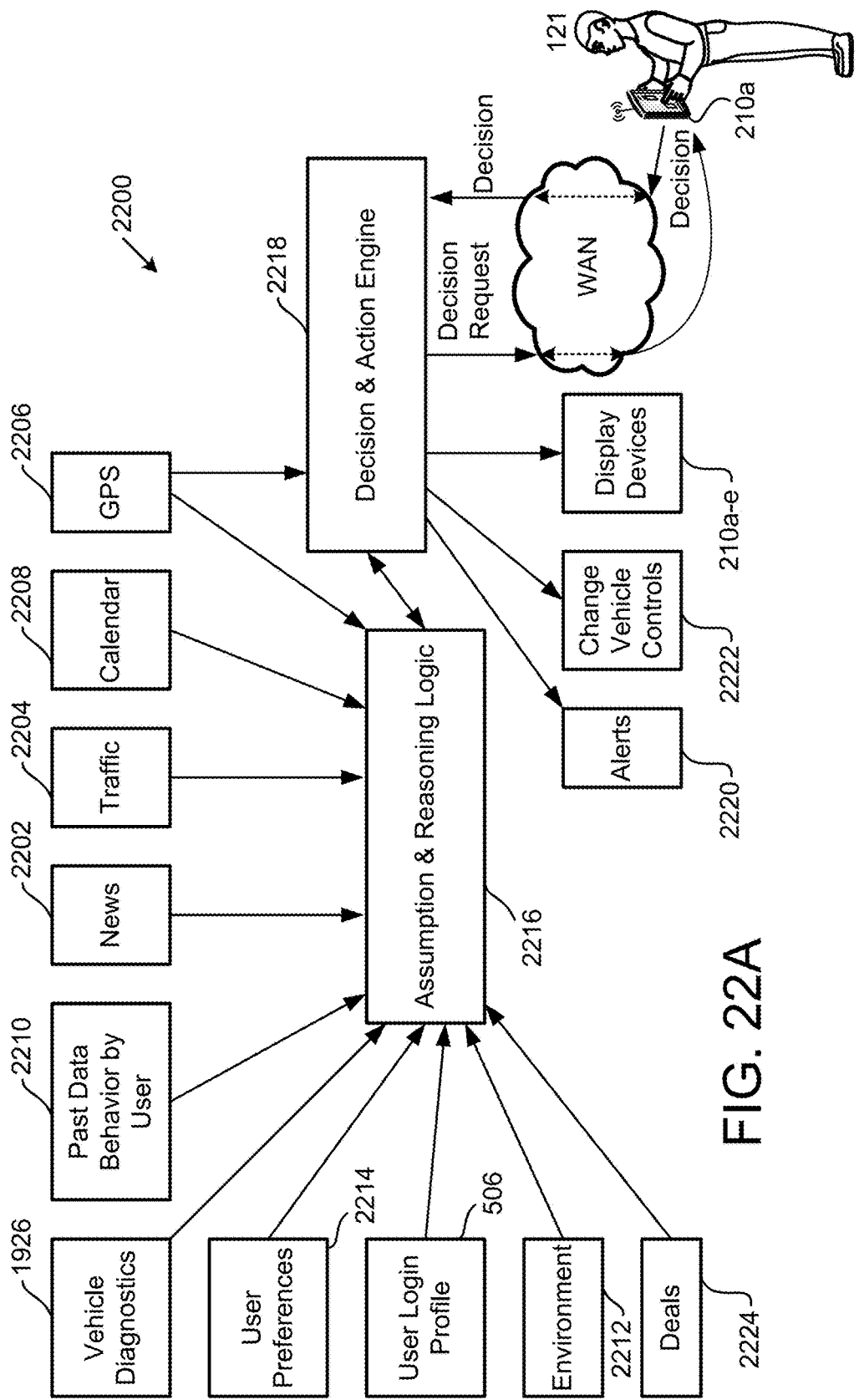
FIG. 22A describes an ecosystem where an APP in conjunction with a vehicle API may work together to make assumptions, make decisions and take actions, in accordance with one embodiment.

FIG. 22A describes an ecosystem where an APP 104 in conjunction with a vehicle API 130 may work together to make assumptions, make decisions and take actions 2200. API and APP code together can be arranged in such a fashion that creates an assumption and reasoning logic module 2216. This Assumption and reasoning logic module can take inputs from various systems and data streams including but not limited to GPS 2206, calendars 2208, traffic conditions 2204, local news 2202, past data of user behavior and interaction 2210, vehicle diagnostics 1926, user preferences 2214, user login profiles 506, environmental interpretations by sensors 2212, marketing deals 2224 among others. These inputs can be local and physical or remote and abstract via a network. The assumption and reasoning logic module 2216 compiles data from these sources to invoke decisions and actions on a decision and action engine 2218.

This decision and action engine 2218 has the ability to execute on what the assumption and reasoning logic module has determined needs to be done. The decision and action engine has the ability to produce alerts, both local, on screen, audibly, visually or remotely on a remote display device 210a-e using a data network. The decision and action engine 2218 also has the ability to change vehicle controls automatically on behalf of a user without user action based on assumptions made by the assumption and reasoning logic module 2216. Additionally, the decision and action engine has the ability to request a decision from the user preemptively in order to change vehicle controls.

This may be achieved locally or remotely requiring input from a user to proceed. For instance, the assumption and reasoning logic engine has determined that the user may want to have his or her car automatically started at 7:55 am because the user typically starts the car at 8 am. Starting the car at five minutes early will allow the system to heat the vehicle to the user's typical liking. However, the assumption and reasoning logic may have only reached a level of confidence of 75% where 80% confidence is required to act without user input. Thus, the system, being only 75% sure that the car should be turned on will automatically send the user an alert requesting a decision on whether or not to turn the vehicle on. Once the user 121 provides a decision remotely on their remote device 210a, the decision engine 2218 updates the assumption module 2216 so that it can augment it's assumptions for an updated level of confidence on the next action trigger. These actions by the user automatically and continually update the assumption and reasoning logic module 2216 in order to fine tune the level of confidence on acting without user input and learn the user's behavior for future decisions.

FIG. 22B describes how one of many types of inputs into an assumption and reasoning logic module 2216 can be compiled over time. Although inputs can come from many sources, this particular example focuses on input into the assumption and reasoning logic module 2216 from past data originating and triggered by user behavior in order for module 2216 to learn. Past actions 2210 are logged into a database either locally on the vehicle computer or remotely which are fed into to module 2216. In this example, data about when the user's actions are stored, along with unique identifiers that will allow assumptions to be made in the future. These identifiers include times, dates, rates, capacities, temperatures, frequency, degrees, distance, etc. In this example, the system has been keeping track of when the user has been starting his or her engine in the morning on weekday sand weekends. The system harvests all data points associated with given events. These data points 2210 are purely mined data points and no assumptions or reasoning occurs at this point. This data will be used by the assumption and reasoning logic 2216 to determine future actions.

FIG. 22C describes one example of what an assumption and reasoning logic module 2216 may produce using the data points collected on an ongoing basis in FIG. 22B. Over time, using inputs that are continually harvested by a user's action, assumptions are made and refined to aid in making decisions for a user in advance or behalf. Module 2216 has taken the inputs provided by 2210 past data and behavior to determine that before a decision can be made, the user's local or network-stored calendar should be polled to determine how the user's schedule might impact the system's pending actions. For instance, if the system had determined that the user typically starts his vehicle at 8 am but the user's calendar shows a meeting at 730 am located at a location that does not match the current location, the vehicle may assume that the car should be started at 725. They system will determine its level of confidence of the decision and may poll the user for a decision.

The system, by using prior data points has stored assumptions based on conditions, the day it is, the temperature of the environment and historical events, that the user will most likely start the vehicle's engine between 803 am and 805 am, and if the temperature is in the 30s inside the vehicle, the user will most likely set the interior temperature to between 70 and 80 degrees, it is not likely that the user will use the are conditioning unit, if there is ice on the windshield, the user will most likely defrost the windshield for 7 minutes before departure, the user usually drives between 15 and 18 miles at this time of day, the user typically starts the vehicle again in the afternoon between 505 pm and 510 pm, if the temperature is in the mid 70s, the user usually activates the AC and sets the temperature to 65 degrees, typical weekend behavior, the user typically makes frequents stops, does not have a set time the vehicle is started, uses certain APPs at certain times and has a history of certain destinations as recorded by GPS.

FIG. 22D describes an example list of decision the decision and action engine 2218 may take based on information provided by the assumption and reasoning logic module 2216 and sets of assumptions created. The decision and action engine 2218 will attempt, using a degree of confidence to anticipate what the user will want to do in terms of engine start and stop, location destinations, preferences of temperature, driving habits and poll vehicle capacities to ensure the intended path the user usually takes is attainable. For example, the user usually drives a distance in the morning at a certain time, however, the vehicle's fuel supply will not allow for that distance to be traveled. Thus, the decision and action engine polls the user as a reminder that the user should begin their intended travel sooner than usual to allow for refueling time.

Figure 23:
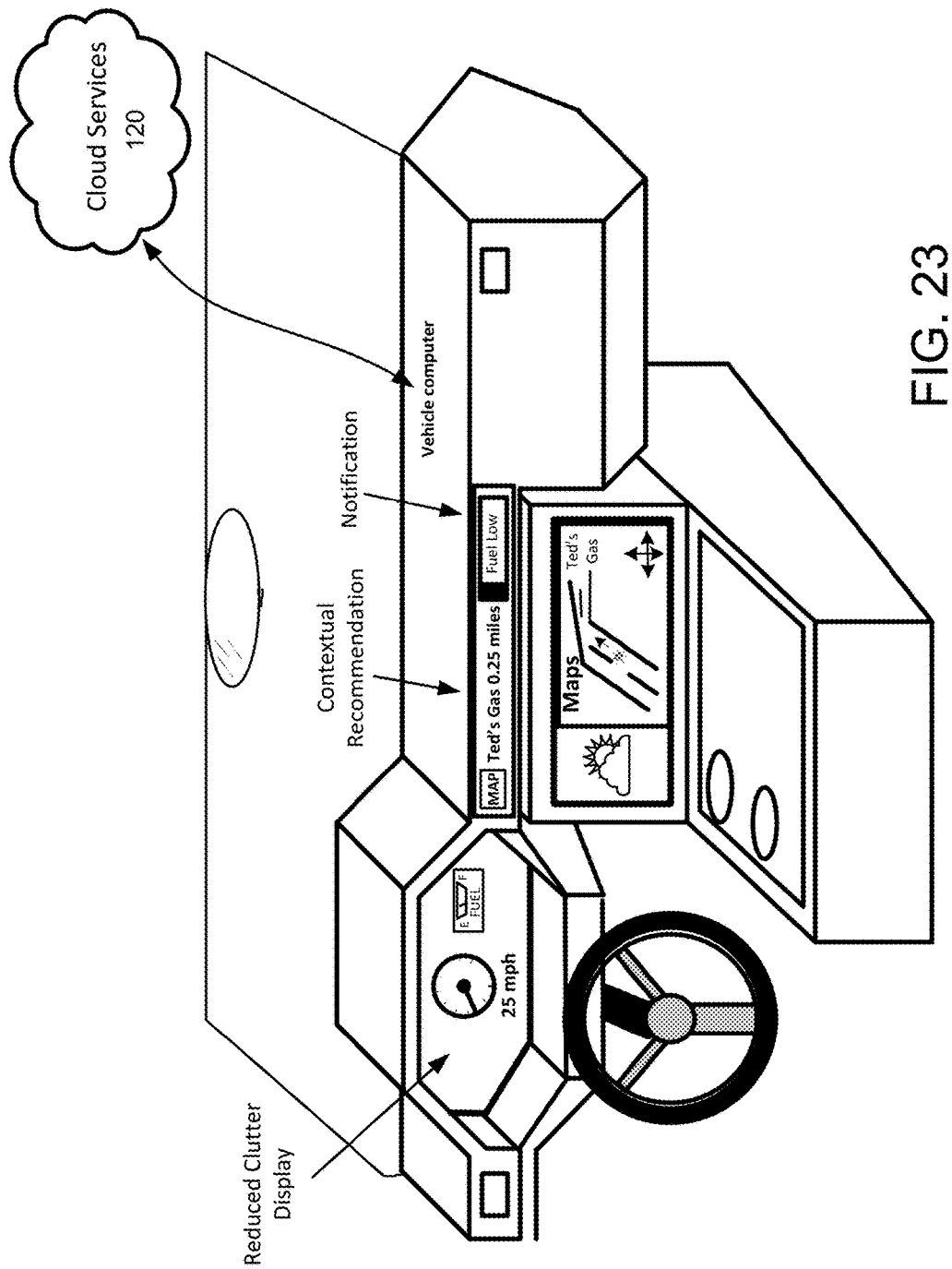
FIG. 23 illustrates an example of a vehicle dashboard having a reduced clutter display, contextual recommendations and notifications provided to the vehicle computer from cloud services, in accordance with one embodiment.

FIG. 23 illustrates an example of user interfaces and interaction modes provided on or for various displays of a vehicle, in accordance with one embodiment of the present invention. In this example, the vehicle is shown communicating with cloud services 120, utilizing the vehicle computer. As described above, the vehicle computer can include communication circuitry to enable wireless communication with the Internet and servers that can provide cloud services 120. In this illustration, the user interfaces or displays of the vehicle are shown with graphically rendered gauges, information, and data that may be relevant to the user of the vehicle.

In one embodiment, the user the vehicle may log into the vehicle or be paired to the vehicle automatically so that a user account of the user provides the preferences of the user for displaying select information and communicating with cloud services 120. Cloud services 120 can communicate with other Internet data sources, and cloud applications of the user, such as calendars, appointment books, reservations, websites, merchants, mapping applications, discount providing applications, charge location services, payment services, parking services, vehicle avoidance services, etc.

Continuing with the example of FIG. 23, the user interface provided in the main dashboard in front of the steering wheel has been rendered for the user account of the user in accordance with the user's interaction mode selection. As will be described below, the interaction mode selection will allow the user to either custom configure or select from custom configurations the type of information that would be rendered on the displays of the vehicle or provided via audio output of the vehicle. In this example, the interaction mode for the user account is one that has been selected to reduce the amount of clutter provided in the main dashboard interface.

As used herein, dashboard clutter or display clutter refers to when too many gauges, icons, information, GUIs, meters, text, pop-ups, colors, designs, animations, etc., are rendered on the displays, and which may cause distraction while the user is driving. Reducing the amount of clutter is a feature for vehicles that provide interactive displays that can populate so much information that a driver may become distracted. In one implementation, the level of information that may cause distraction will vary, as this is a subjective metric that is personal to each user/driver. In some embodiments, the amount of information provided to the displays can be dynamically changed based on the condition of the driving or non-driving of the vehicle. For instance, if the vehicle is not being driven, more information can be rendered on the displays for the user.

If the vehicle is parked or at a stop sign or stop light, more information may be rendered on the displays. When the vehicle is operationally moving, less information would be rendered on the displays so that clutter can be reduced. In one embodiment, more or less information or icons or gauges may be displayed or shown on the displays in a fade in and fade out fashion, so that the instant appearance of gauges will not be distracting sight for the driver. In one embodiment, when reduce clutter displays are provided, basic gauges for operating the vehicle or required by law will be required to stay viewable in the displays while the vehicle is being driven or is in operation. For example, a speedometer gauge is required or is vital to the driving of the vehicle, and therefore such gauges would not be removed or not shown when reduce clutter displays are selected. It should be understood that reduced clutter is subjective, and the interaction modes provide for different types of modes and modes that can be customized or customized over time, such that the level of information is not distracting to the particular user, from a personal and subjective view point.

In one embodiment, the information that is provided on the displays can be dynamically set based on the context of the vehicle's state, the user's calendars, the weather, and other factors. In one example, the fuel gauge shown in the main dashboard display of the vehicle in FIG. 23 is shown to include a fuel gauge. The fuel gauge in this example is shown to have appeared on the dashboard display because the vehicle's state is that the fuel is low and requires refueling. In one embodiment, the vehicle computer can be communicating with cloud services 120, which will automatically identify information regarding available fueling stations nearby.

For example, one of the displays of the vehicle shown in FIG. 23 illustrates that contextual information can be provided as a recommendation, which identifies that a gas station is within 0.25 miles of the current location of the vehicle. In addition, a mapping service or map program of the vehicle can be automatically displayed on one of the displays of the vehicle showing the location of the gas station (e.g., Ted's Gas). Accordingly, the information being displayed on the vehicle is contextually related to the state of the vehicle, the location of the vehicle, and applications are automatically loaded and provided for generating information relevant to the vehicle and its state.

Figure 24A:
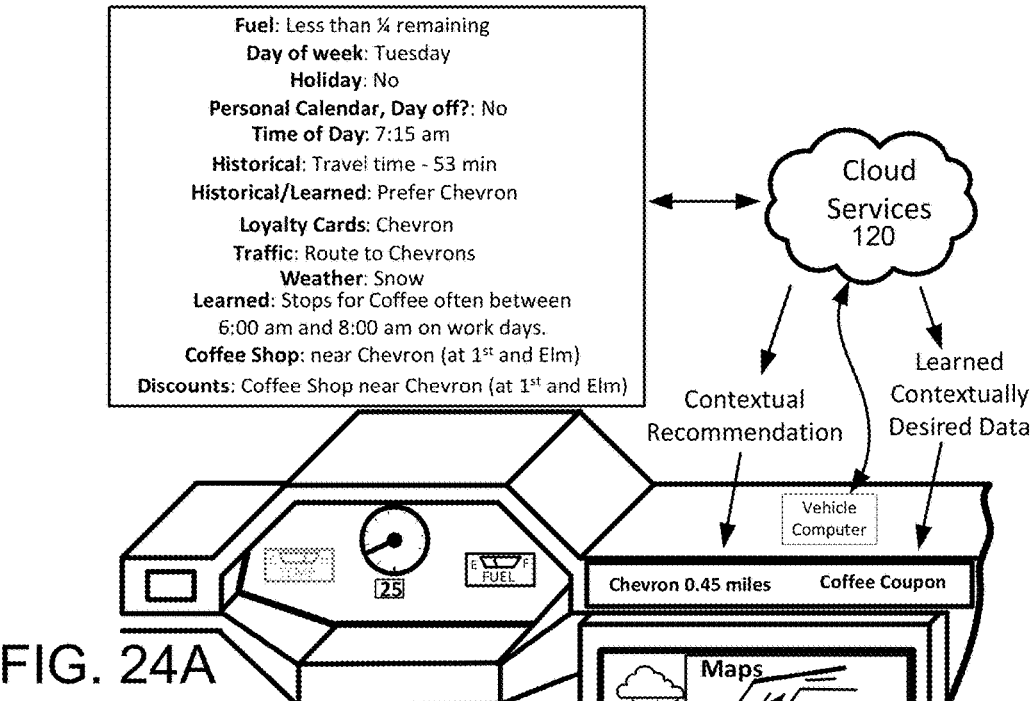
FIGS. 24A-25 illustrate examples of contextual information analysis for information that concerns operational states of the vehicle, personal information associated with the user, learned patterns or behaviors of the user, the time of day, geo-location, and other dynamically changing parameters that are synthesized to identify contextual recommendations that are displayed to the user's interfaces and automatic launching of applications and content in applications based on information that is believed to be needed at the time and at the location and for the user and based on other factors, in accordance with one embodiment.

FIG. 24A of displays of a vehicle, which are cost to interactively show display items based on the context of the vehicle and the context of the user and preferences of the user. In one embodiment, the preferences of the user can be learned over time by examining use patterns of the user, which are signals indicating actual preferences by the user. In other embodiments, the patterns of use, interaction, preferences, inputs, memberships in loyalty programs, shopping history, prior use of discounts, and other information can be used to identify what type of contextually related information should be displayed to the user aced on the current state of the vehicle and the current state of the user and the geo-location of the vehicle.

In this example, the type of information that is surfaced to displays of the vehicle can depend on the context of information associated with the user, who is logged into the vehicle by way of a user account that is connectable to cloud services 120. In this example, certain information can be examined to determine what type of contextual recommendation can be provided to the user, and what type of contextual information can be provided based on learned behavior of the user, which provides a prediction or likelihood of the type of information that may be most relevant to the user in the particular context. In one embodiment, a server may determine what data to send to the vehicle, and when sent, the data can be presented on a screen or audio output of the vehicle.

In one implementation, the data sent can include a time threshold that identifies (e.g., identifier or tag or data) when the data can be presented or when the data may no longer be presented. The time threshold can be in the form of data, a tag, a marker, an identifier, flag, or the like, which identifies when the data should no longer be presented (e.g., data may become of context and thus no longer contextually relevant). For example, the data may be relevant for a particular time, window of time, or period of time. If the period of time has passed, the data can be considered stale, such that the data is no longer allowed to be shown, even if the vehicle received the data. For example, the data may be sent to the vehicle when the user is actively using some display or input, and the use of the display or input may prevent the sent data from being presented. In this example, the data is held (in memory) until the user has completed the input (or use of the vehicle, or personal device that may be active (e.g., phone, tablet, directions device, etc.)) to avoid interruption.

Once the interaction has been completed, vehicle software and/or electronics can determine that the data received is no longer valid, stale or no longer relevant to the current geo-location, personal preferences, vehicle condition, or some other factor. In one implementation, therefore, data that is sent to the vehicle for presentation or surfacing may not be presented, if other local conditions, user conditions, and/or geographical conditions determine that the data is stale or no longer useful. Thus, gating the data from presentation, even after receipt by the vehicle, enables for presentation of possibly un-needed data to the user, thus reducing distractions.

In another example, contextual information that may be viewed may include them on a fuel that remains in the vehicle at the particular time (which is a state of the vehicle, among many different types of states of the vehicle), the day of the week, whether the day of the week of the holiday, information from the personal calendar, historical travel times during the time of day, the time of day, loyalty cards that the user may hold or like, traffic information associated to the current geo-location of the vehicle, the current weather, learned past behavior (when the user likes to stop for coffee), nearby coffee shops (coffee shops being a learned type of good liked by the user), discounts located nearby, discounts located nearby other services that are needed at a particular point in time, and other factors.

These contextual types of information associated with the user, the vehicle, the number of passengers in the vehicle at the time, the user's calendar, the users likes, the users past interactions, the predictions of what the user wishes to see or may want, etc. are only but a few examples, and are shown without limitation.

Continuing with the example of FIG. 24A, based on the contextual information obtained by the vehicle computer from cloud services 120 and from information stored in the vehicle computer or obtained from a computing device of the user, determinations can be made as to the type of contextual recommendation that may be surfaced to a display screen of the vehicle.

It should be understood that surfacing too much information can cause distraction while driving, so therefore contextually relevant information that is predicted to be needed or wanted at a particular point in time should be displayed as a contextual recommendation. It is believed that the information that is automatically being contextually provided to the user on the displays is information that would have been searched for by the driver.

Thus, by providing the intelligence surfacing of contextual information to displays and or audio outputs of the vehicle, less distraction will occur because the driver will not need to interact with user interfaces, but instead the information will be provided to the driver just as the driver will need the information. For example, the drivers being provided with information to the closest Chevron station which is 0.45 miles away from the current location, a map to the Chevron station is shown, and a coffee coupon is also shown on the display.

The coffee coupon is provided to the user because the coffee shop is located near the Chevron, and the user typically purchases coffee during this particular point in time and the coffee shop is next to the Chevron where the user will likely wish to purchase gas based on his ownership of loyalty cards for Chevron. As such, this information has been provided to the user at time when the user would want or need the information, which cuts down in screen clutter and also reduces distracted driving.

Figure 24B:
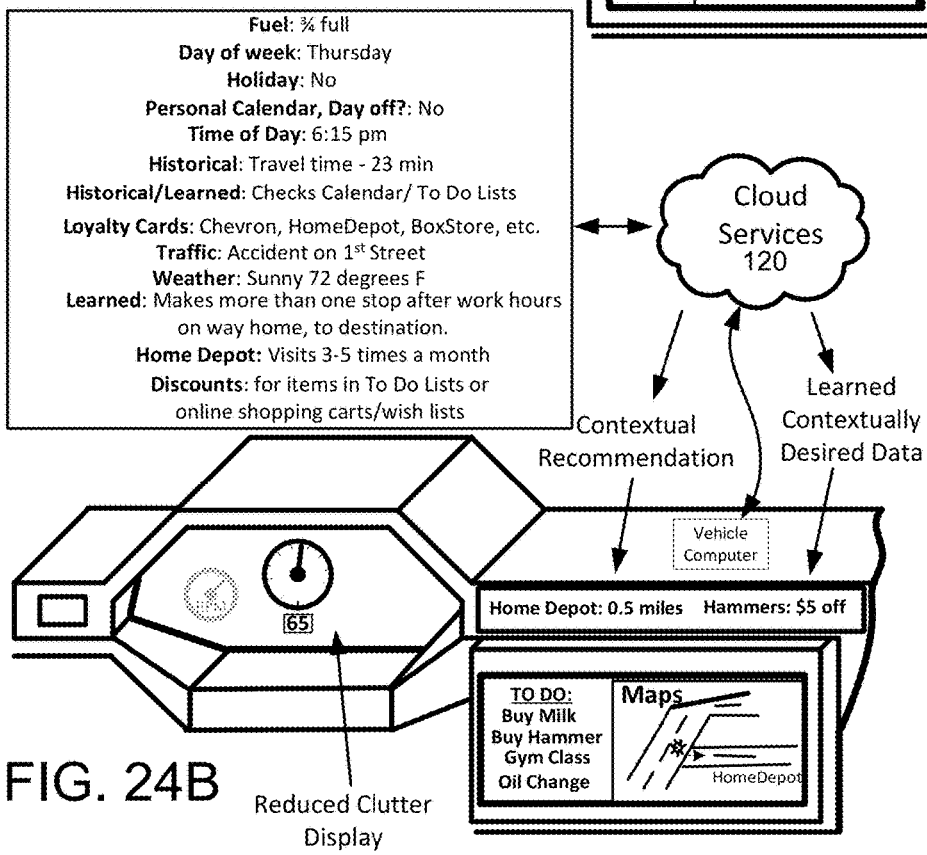

FIG. 24B illustrates yet another embodiment of contextual surfacing of information to one or more display screens of a vehicle or surfacing of audio to the vehicle. In one embodiment, the user prefers to have a low clutter screen, wherein the display panel in the dash has few items, such as vital gauges needed for driving the vehicle. In one example, at a minimum, a speed gauge is provided. As the driver drives around, from time to time, depending on the context or state of the vehicle, certain gauges may be surfaced to a display.

As shown, an RPM (revolutions per minute) gauge may surface gradually on the main dashboard display when it is determined that the vehicle's RPMs are too high. The gradual surfacing, in one embodiment, allows for reduced distraction of the driver. This is because fast surfacing of gauges or icons on the display screen may distract the driver to look down and away from the road. However, when the gauges are surfaced in a fade in from light gray to full color or contrast, the driver will notice the newly surfaced information gauge when the driver next looks down at the gauge.

In the example of FIG. 24B, it is also shown that the contextual information regarding the user, the vehicle, the geo-location of the vehicle, the time of day, the day of the week, and information found in the user's online calendars and to-do lists can be mined to provide contextual recommendations. As shown, as the vehicle is communicating with cloud services 120, contextual information can be provided to the vehicle display(s). The contextual information, at the particular time of day and when the user is driving or activating the vehicle, is provided when the user is likely going to need the information.

For instance, the current to-do list shows that the user needs a hammer (and other things), and because the user is near a store that sells hammers, that information can be provided to the user. The information is provided or surfaced to the user by presenting it on a display, after cloud processing determines that other contextual parameters suggest that the user would be interested in a particular good or service, e.g., in this example a hammer, at that particular time of day and day and particular geo-location. In addition, learning systems also can determine that the user usually likes discounts, so special discounts can be automatically searched for from various online and off-line retailers, and the discount or coupon can be surfaced to the vehicle display at the time the contextual information is provided to the user.

As shown, in addition to presenting the distance to the user, providing a map to the store location, the discount is presented on the display. The discount can be provided for use by the user in various ways. In some examples, the discount can be automatically sent to user's device (e.g., smartphone, tablet, watch, etc.). The discount can be in the form of a digital coupon, a code, a link, or some other identifiable form. In still another example, the coupon can be provided to the user when the user selects it on one of the displays of the vehicle. The coupon can then be transferred to the user's device, or can be sent to the retailer (with the user's account info), so when the user arrives at the store the coupon is automatically credited, or can be sent from the server directly to the user's device.

Figure 25:
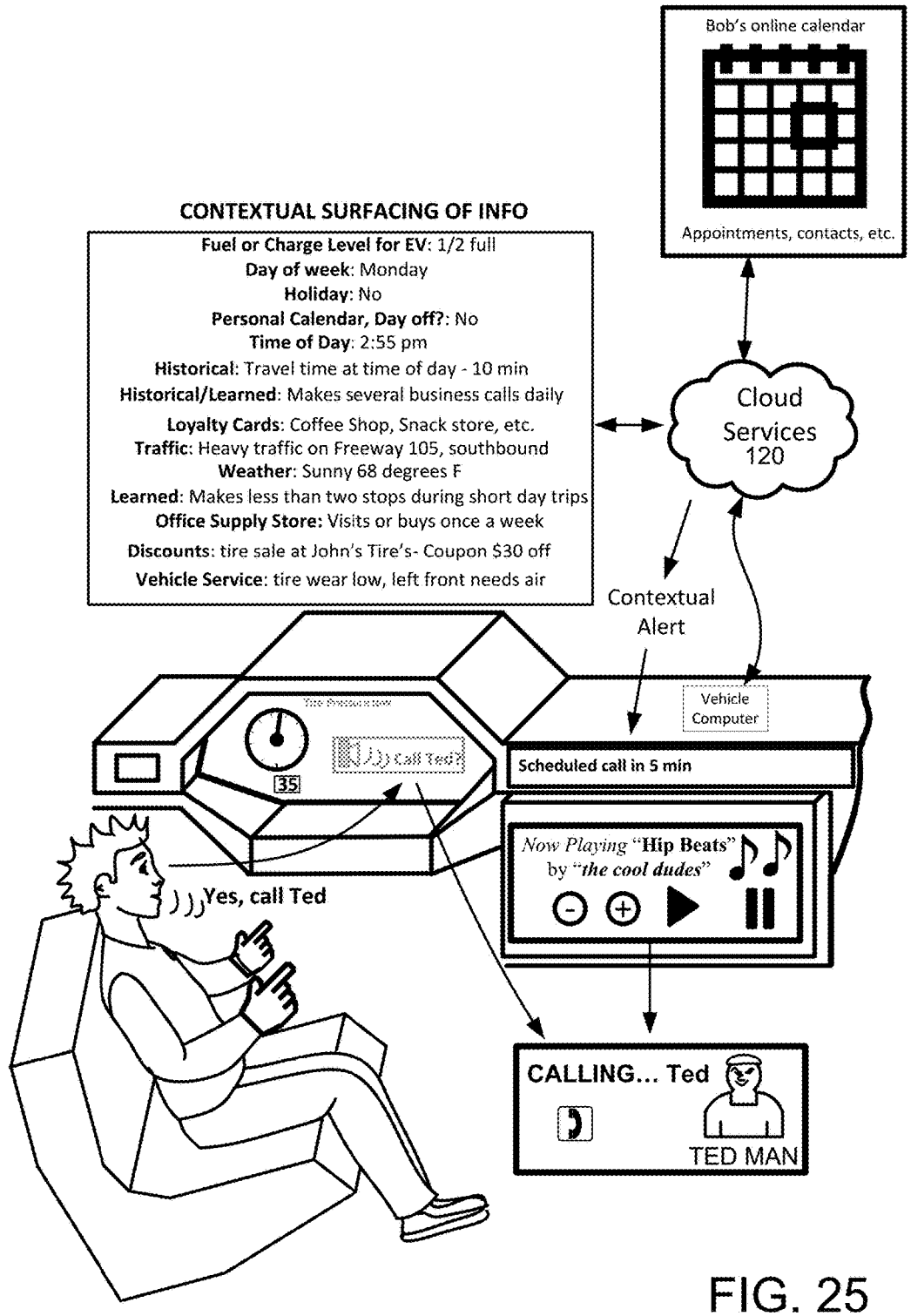

FIG. 25 shows another example of intelligent gathering of contextual information for the user and surfacing just the information that is determined to be useful to the user, in accordance with one embodiment. In this example, the vehicle is an electric vehicle (EV) that requires charging from time to time. The system is also configured to connect with the user's accounts (e.g., for a user that is registered, has a user account and is actively using his or her account when occupying or driving the vehicle). As in other examples, the main dash of the vehicle has a screen that is configured to render icons, gauges, displays, data, and other vehicle information. In one interface mode, low clutter is selected.

The low clutter selection (e.g., selectable as an interaction mode) is configured to present very few icons or gauges, such as those that may be required for vehicle operation. In the illustrated drawing, the main gauge that is shown is the speed gauge and an optional digital read out of the speed. As the user drives around or uses the vehicle, it turns out that the user's calendar determines that an appointment call needs to be made. This determination can be made by reference to the user's online calendar or calendar on a device that is shared with the vehicle. The appointment to call is, for example, "Call Ted."

At the time the appointment time arrived, the user was listening to music, but if the vehicle computer/server determines that the call should be suggested, the vehicle display can change to show "Calling . . . Ted." Also or alternatively, the main dash of the vehicle can show an icon that is surfaced gradually to the display, which may be an indicator of an audio-interface. The audio interface can, for example, as the user if he wishes to call Ted, and the user can simply answer by voice input. The voice input can then trigger the activation of the call for the user. Still further, other parameters, in addition to the calendar can be analyzed to determine that the context is appropriate for surfacing the question to the user.

The analysis can include, for instance, processing the information associated with the current context of the user, the vehicle, the current time of day/week, historical data, weather, discounts, service data, etc. Over time, based on the selections, choices of interfacing, what was selected and when, what was selected when the vehicle was particular geo-locations, what was selected and how many people were in the vehicle with the user, selections or preferences made by passengers of the vehicle, and other data. This data is mined to find overlapping intersections in data and to apply rules and assumptions that form learned data and patterns. This learned data and patterns are used to build a learning database that can grow to include richer data over time, and can assist in providing intelligent contextual data for display on the displays of the vehicle or for audio output to the vehicle.

It is believed that by providing users with information they need, they will spend less time making raw user interface selections (e.g., requiring one or more inputs, taps, touches, swipes, navigations, launching of apps, selection menus, inputs, etc.), which may increase distraction. In one specific example, data from a user's online data sources can be mined to provide information the user needs and contextually when needed.

For instance, if the user's email shows that the user has booked airline tickets and the time of departure is within 2 hours, the user may be provided with a map to the airport, may be provided with online checking interfaces for voice entry, may provide rental car check-in or return information, etc. Thus, based on the context of what the user is doing, what the user has planned, when the user has done in the past (e.g., learning), certain information can be surfaced for consumption by the user. The result is less distracted driving, and efficient usage of the user's time.

In one embodiment, information/data that is sent to the vehicle, from a server, has a higher likelihood of being consumed or used when it is examined for context. As used herein, the information is likely to be accessed, consumed, viewed, read, listened to, and otherwise used, when the information is sent upon confirming context of one or more dimensions (e.g., geo-location, vehicle state, user history, learned preferences, current interaction, etc.). In one embodiment, data that is sent, but not yet presented, may lose context, and that data may be come stale. In such cases, data may not be presented by the vehicle, even after safe receipt by the vehicle electronics. Thus, context can be checked at the vehicle as well, and/or the data can be received with identifier data that identifies or tags when such data sent is or may no longer be valid. Thus, in one embodiment, the vehicle may simply filter or cull out information (e.g., supplemental content) that may no longer be valid, based on the received identifier or tag, e.g., such as the time frame of when the data was valid has passed, or the vehicle is no longer close to a particular merchant, or the like.

Figure 26A:
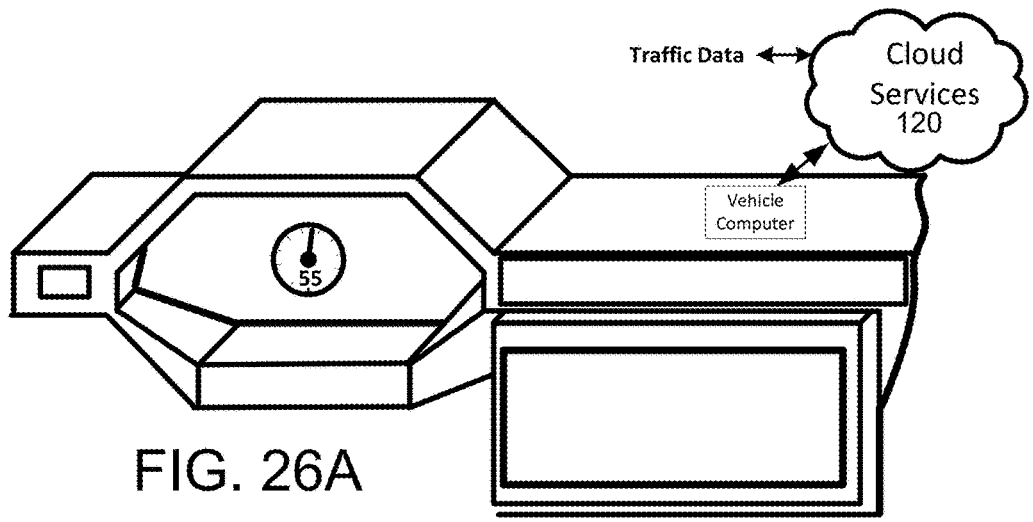
FIGS. 26A-26C illustrate examples of interaction modes selected for the vehicle, and the manner in which content items are displayed on the one or more displays, the manner in which information is surfaced or provided to the driver or occupants, and the dynamic automatic presentation of content on the displays which are contextually related to factors that include the geo-location, content in a user's calendar, learned preferences or behaviors, the time of day, and other parameters in accordance with one embodiment.
Figure 26B:
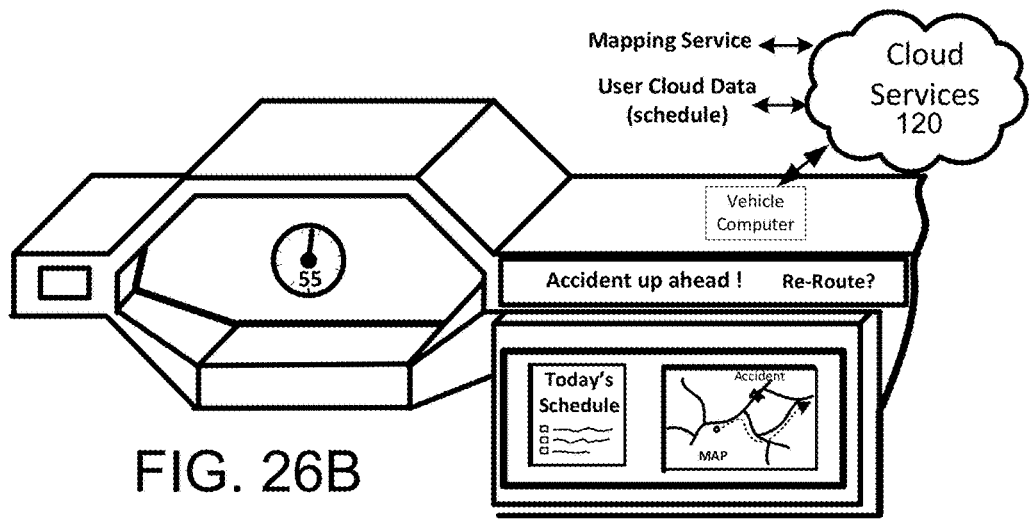
Figure 26C:
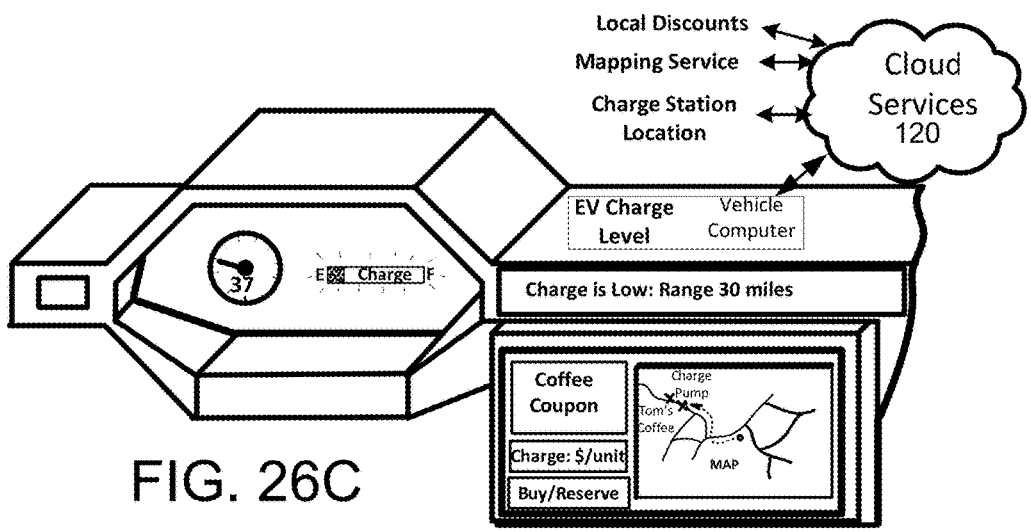

FIG. 26A-26C illustrate several embodiments, where a user has selected an interaction mode that reduces clutter. The reduced clutter display is shown in FIG. 26A, where nearly all display items are clean or not shown. The display can be provided with wallpaper or skins that reduce distraction or can be turned black or a different color that allows for the screens to blend-in to the look and feel of the dashboard. For example, if the surround parts of the screen appear to be leather or steel, the image on the screen can simulate an extension of the physical nature of the dash or vehicle parts. In this case, the cloud services 120 may still be monitoring information to determine what to surface to the display screens.

In one embodiment, traffic data is obtained when the system determines that the user would likely be checking traffic information. This may be triggered when, for example, the user appears to be taking longer to drive home after work than normal, or the driver is driving slower than a current speed limit of a road, or a traffic accident is identified ahead, or based on learned use (e.g., the user typically checks traffic at 5 pm on a workday, etc.).

In FIG. 26B, the displays are shown to be populated with information obtained by cloud services (or obtained by the vehicle, or obtained by a device of the user in the vehicle, or combinations of two or more thereof). The system may alert the user that an accident is up ahead. The user, based on account information (e.g., history of user, propensity, or likelihood), may usually select to re-route, so the system automatically provides a re-route in the map on the display. In one embodiment, data for information associated with the geo-location is sent to the vehicle when the profile of the user identifies likelihood for consumption of the information associated with the geo-location. An example may be, without limitation, a user drives by a Chevron gas station, but the user prefers Teds Gas, so the user will not stop, even though the vehicle needs gas and the user is proximate to Chevron. The user would be viewed to not have a likelihood to consume information regarding the nearby Chevron.

If the user's shows that the user does not have appointments or does not urgently need to arrive at the destination, the system may not provide a re-route option if the extra distance is more than the user likes to drive. Other contextual information can be mined, including a learned profile of the user, which shows what the user likes, does, prefers, has done over time as a pattern, etc.

FIG. 26C illustrates example where the user's EV is running low on charge. The system may surface this information the main dash display (e.g., either gradually, instantly or in a gray-tone or some special identifying color. The speedometer may also be slowly shifted (or slide) to the left, as the more relevant information that is surfaced is placed near the center of the main dash display. In one embodiment, the center dash is considered one of the least distracting locations for driver to view.

Alternatively, the information can be displayed in a heads-up display on the windshield of the vehicle (e.g., as overlaid or non-overlaid text or icons or graphics, videos, or combinations), which reduce distraction of the driver. Continuing with FIG. 26C, other displays also show contextually relevant information, such as the range remaining for the EV, coupons for coffee near the charge locations, the price of charge, the option to buy ahead of arriving, buying to reserve the EV charging spot, etc. As noted above, the contextual information is processed by parsing data obtained over the internet, data obtained from the user's history profile, data obtained from learned preferences or habits. In some embodiments, the history profile can itself include learned preferences of the user, by way of the user's account.

Figure 27:
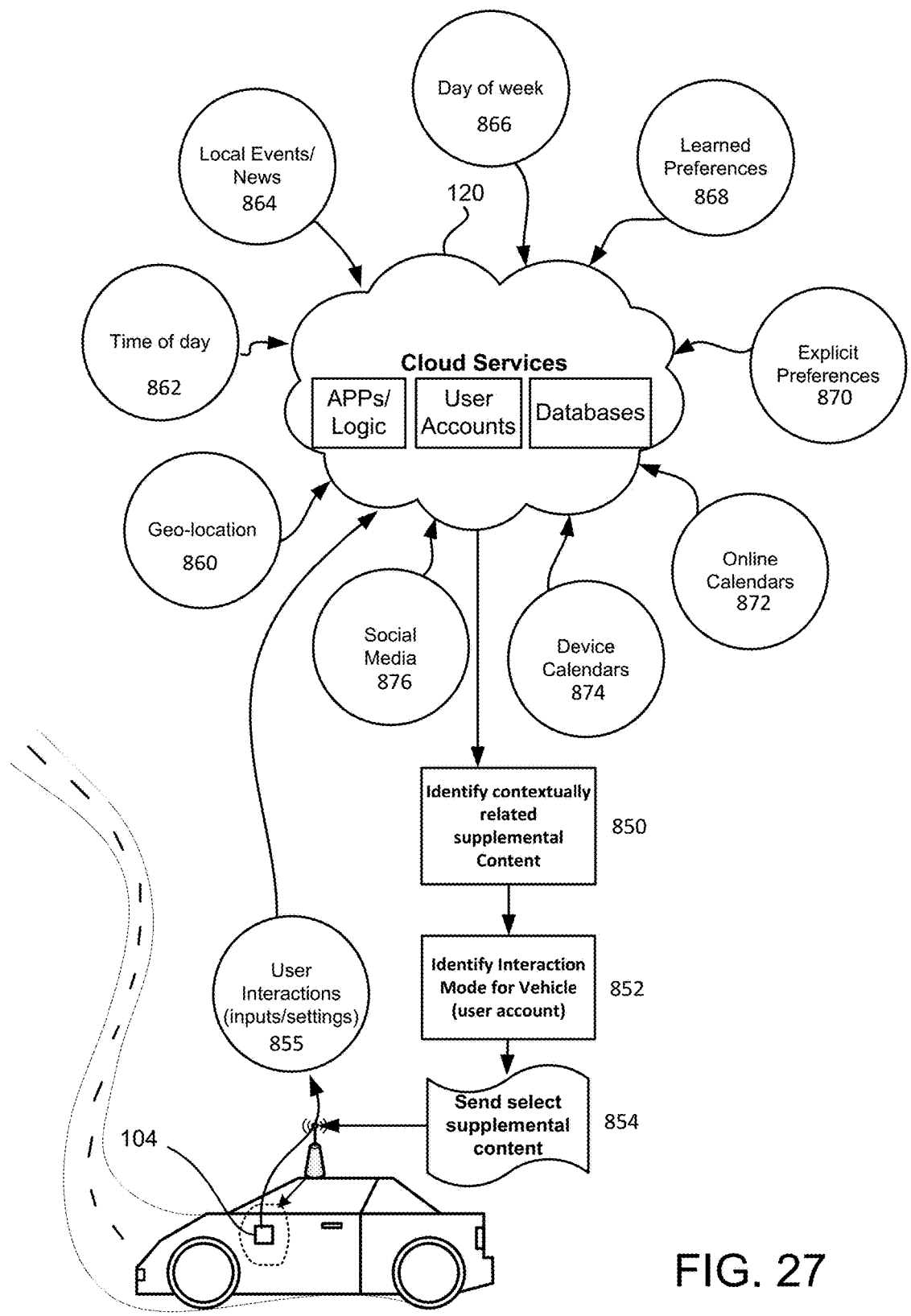
FIG. 27 illustrates an example of cloud services being able to interact with multiple Internet services, cloud data structures, cloud databases, third-party websites, information services, user vehicles, and other information and data that can be accessed for intelligently communicating supplemental content to the user account for display on one or more displays of a vehicle, and for the dynamic receipt of user interactions over time from the connected vehicle, in accordance with several embodiments.

FIG. 27 illustrates one example of cloud services 120, which may be collecting or interfacing with a plurality of data providers, data sources, data processors, third-party applications, third-party services, other applications, Internet data, or combinations thereof. In one embodiment, the vehicle is a connected vehicle which has access to cloud services 120. Over time, the vehicle will traverse different geo-locations, which will then be communicated to cloud services 120 periodically, continuously, or on some schedule.

In addition, user interactions and input settings 855 can also be communicated to cloud services 120. This information is communicated regarding user interactions, such as inputs or settings is also tied to the geo-location of the vehicle, the time at which the settings were made, the circumstances of when the changes were made, the contextual relationship of circumstances to when settings are made or inputs are made, and the like. As shown, cloud services can include applications and logic and other components which are described above.

Additionally, cloud service can include user accounts and databases. In some implementations, cloud services can be operated by specific service provider, or multiple service providers, a vehicle cloud service, an internet company, vehicle manufacturers, vehicle service providers, third party service providers, or combinations thereof. Example communications by cloud services 120 are shown, without limitation. The example communications can be to geo-location 860, time of day data 862, local events and news 864, day of the week calendar data 866, learn the preferences 868, explicit preferences 870, online calendars 872, device calendars 874, social media data 876, etc.

In one implementation, at least one aspect of one of the preferences is data obtained from an internet service. The internet service can be a private cloud, a public cloud, website data available via open APIs, or combinations thereof. The internet service may also be one of a website, or a calendar, or social network website, or a news site, or a dictionary site, or mapping service, or a to-do list, or a phone list, or a merchant website, or a shopping website, or a coupon site, or a discount site, or gasoline price site, or an electric vehicle (EV) charge locator service, or an EV charge reservation service, or an e-payments site, or an energy pricing site, or a route mapping service, or a traffic service or site, or a movie site, or a music site, or travel site, or a vehicle site, or vehicle manufacturer site, or a rental car site, or an airline reservation site, or a restaurant finding site, or a review site, or a weather site, or a loyalty rewards site, or a database, or a historical driving database, or a vehicle-to-vehicle database, or a holiday calendar, or the internet, or combinations thereof.

This list of exemplary data and services should not be viewed as limited to the set of data but simply as an example of data can be accessed and process to identify contextual related supplemental content 850. In operation 852, the interaction mode for the vehicle can be identified. The interaction mode can be the mode that's already selected for the vehicle, and therefore the data that that vehicle is expecting will be in accordance with the interaction mode and it settings.

In operation 854, select supplemental content can be sent to the displays of the vehicle or output via the audio system. As noted above, the type of information, such as the select supplemental content is tailored for the interaction mode selected for the vehicle, as well as based on user interactions 855 and the contextual relationship of those inputs to the time, the geo-location, learned preferences, and the like.

With the above features in mind, it should be understood that the any of the features, implementations and/or components or system may be combined to define specific implementations. Such implementations may extend to features obtained from any of the figures disclosed herein or incorporated by reference. For additional discussion regarding connected objects, the following FIGS. 28-34 are provided, with the understanding that such embodiments are simply just examples, without limitation to specific configurations or combinations.

Figure 28:
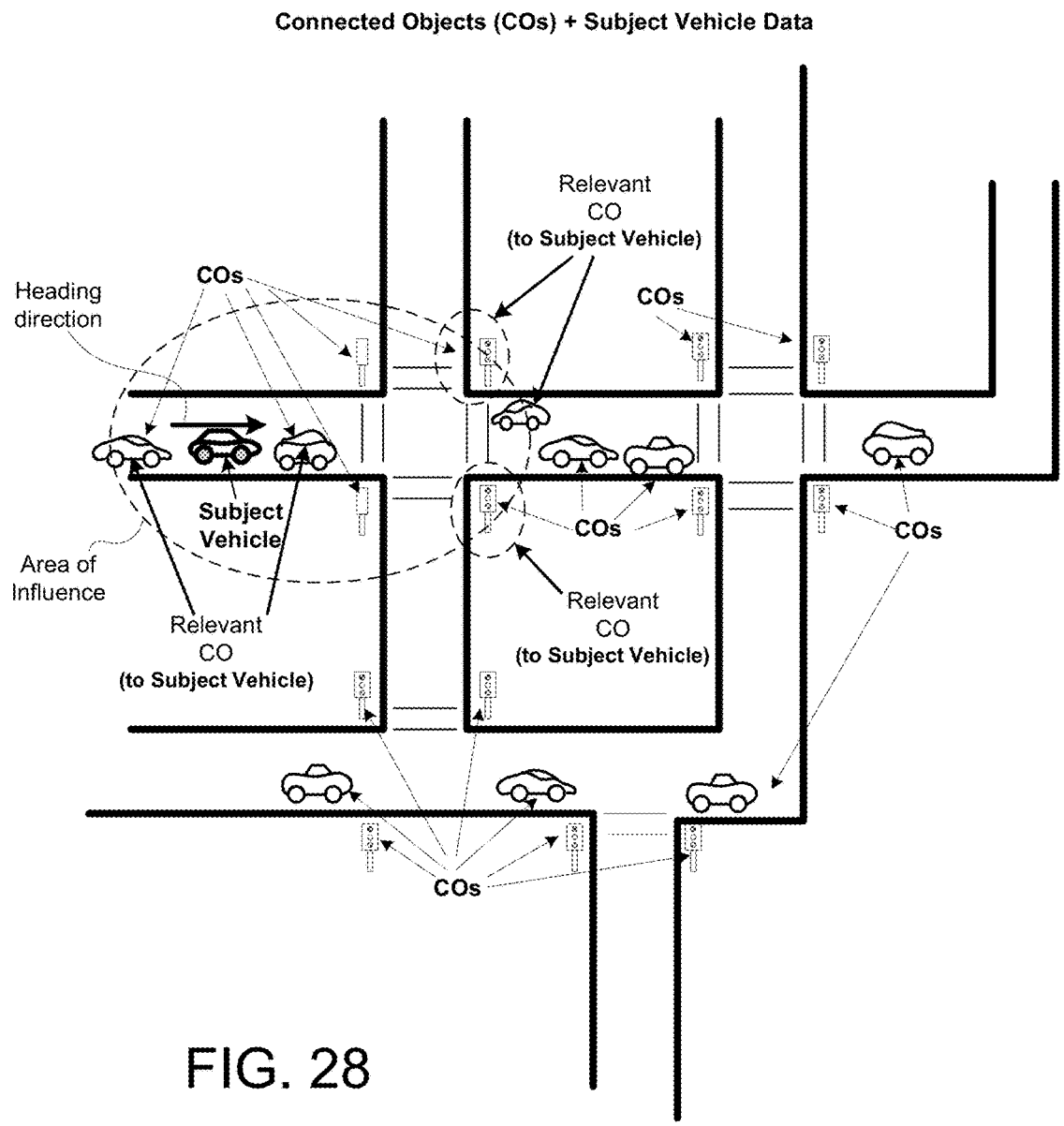
FIG. 28 illustrates an example of a plurality of connected objects (COs), in the context of a street map, road, parking lot, street, garage, parking structure, or building, where vehicles are traversing and interacting with one another and other connected objects, in accordance with several embodiments.
Figure 29:
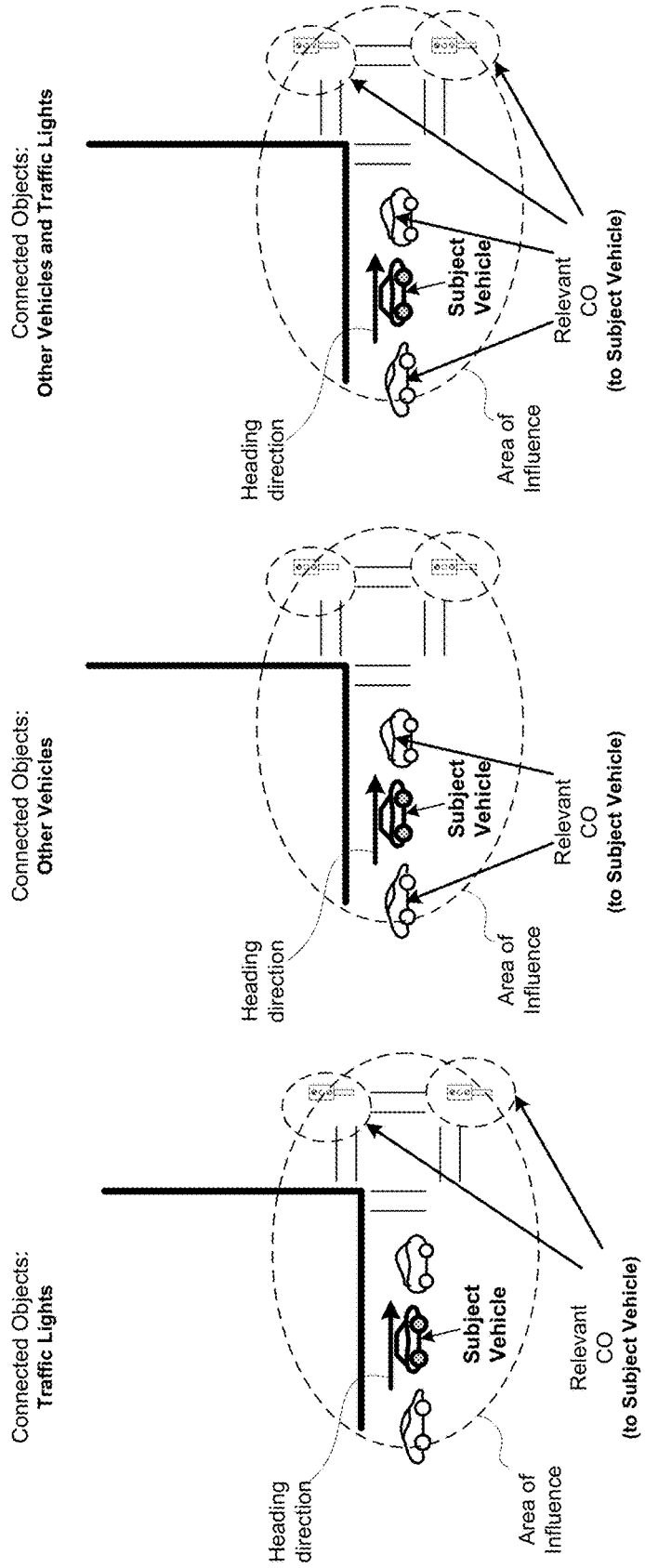
FIG. 29A illustrates an example of the subject vehicle having a heading direction that is toward the intersection in accordance with several embodiments.
FIG. 29B illustrates an example where only other vehicles are relevant connected objects to the subject vehicle in accordance with several embodiments.
FIG. 29C illustrates an example where connected objects within the area of influence of the subject vehicle are utilized to provide information to the subject vehicle in accordance with several embodiments.

FIG. 28 illustrates an example of a plurality of connected objects (COs), in the context of a street map, road, parking lot, street, garage, parking structure, or building, where vehicles are traversing and interacting with one another and other connected objects. Broadly speaking, a connected object is an object, thing, system, vehicle, electronic device, device, apparatus, or thing that is capable of exchanging communication data with another object (or the internet) and is able to communicate over a network, e.g., the internet. In the provided examples, the connected objects can include, without limitations, vehicles, traffic lights, drones, pedestrians, charts, buses, trains, airplanes, bikes, motorcycles, etc. In the example of traffic lights, such traffic lights may be distributed in various geographic locations, such as street intersections, parking lots, roads, parking structures, etc. In some examples, intersections may have more than one traffic lights (e.g., facing the same or different directions).

In some examples, some traffic lights are oriented toward a particular direction of travel, such that vehicles that wish to proceed down certain directions can be provided with status indicators, such as the color of a light (e.g., red, green, yellow, green arrow, red arrow, green text, red text, yellow text, sound outputs, flashing colors, and/or combinations thereof). In some embodiments, traffic lights may be connected to the electronics that are local to a particular area, zone, intersection, or substation. Certain lights can communicate with logic or software that is controlled by the particular local zones, which may be associated with particular intersections. In some embodiments, each zone at particular intersections can communicate with the substation or internet connection hotspot or hub, or router, or computer. The substation can include a larger geographic control zone that communicates with multiple intersections. The substation can then communicate timing patterns to regulate the flow of traffic during particular times of day or for special events.

In some embodiments, local electronics at an intersection can be provided with wireless communication. The wireless communication can provide a signal that can be transmitted to other connected objects that may be near the particular intersections. In one embodiment, control signals can be shared between multiple traffic lights so that the traffic lights can be synchronously or asynchronously communicating with each other. The instructions can be populated to one traffic light based on one or more incidences that may have occurred in the traffic that is proximate to that intersection.

For instance, if an accident occurred near the intersection, the traffic lights may be turned to flash in red. In other embodiments, each traffic light can include its own communication logic, such that each traffic light can communicate independently with the substation of the intersection. In still other embodiments, each traffic light can operate as an independent connected object which can communicate over the Internet to a substation. In yet another embodiment, each traffic light can communicate with other connected objects in a particular area, such as the area proximate to the intersection in which the traffic light is positioned.

In particular implementations, traffic lights, being connected objects (COs), can communicate with systems and/or software of vehicles that may enter an area of the intersection where the traffic light or lights sit. In this configuration, the vehicle is also a connected object. In still another embodiment, a user device in a vehicle entering the area of the intersection may be detected as well. The communication between, for instance, a vehicle (CO) and a traffic light (CO), may depend on which traffic light will correspond to the vehicle.

In one embodiment, the direction of travel of particular vehicles can be monitored. The direction of travel can be, in one embodiment, monitored using global positioning system (GPS) data. For example, GPS data can be communicated by the vehicle or device in the vehicle to a server over a wireless connection, such as the Internet. In the same manner, each of the traffic lights can communicate over a wired or wireless connection to the Internet. The traffic lights, as mentioned above, may communicate locally with electronics, software, control panels, subsystems, or devices that are proximate to one or more of the traffic lights in an intersection.

Communication can therefore be processed from the traffic lights to the Internet by any one of the mentioned systems that are local to the traffic light or lights. In this manner, the state of particular traffic lights (and changes in state) at intersections can be monitored and a determination can be made as to which vehicles may have entered or are entering or are leaving a particular intersection. The identification of vehicles can be done utilizing an anonymous communication signals and exchange data (e.g., temporarily tag data). For example, identification of vehicles can be made such that the vehicles are identified as moving tagged objects that may be traversing a particular intersection, yet identification of the actual vehicle, users, ownership of the vehicle, may be omitted. In other embodiments, vehicles may be identified using license plates of the vehicles or by identification of a unique signal/ID of the vehicle.

In other embodiments, any identification data of the vehicle entering an intersection may be deleted from the system and only used temporally for the period of time when a vehicle enters an intersection. In this manner, the system will not store information that may be sensitive to drivers and users in particular locations, and will only be stored for a temporal period of time in order to utilize information to provide data regarding state changes of particular traffic lights two particular vehicles that may be entering or leaving specific intersections.

Thus, privacy concerns are reduced as the information is not permanently stored regarding the entering and leaving of vehicles of particular intersections. In other embodiments, data collected regarding vehicles entering or leaving particular intersections are automatically purged from memory and not saved to permanent memory associated with any device (local or Internet storage). Thus, the data is utilized just-in-time, and processed for providing state change data (e.g., the color of traffic lights) to specific vehicles entering or leaving intersections, and then removed from the system completely to avoid distribution of potentially sensitive or privacy related travel of specific vehicles.

In the illustrated example, a plurality of vehicles are shown traversing various streets having various intersections with traffic lights. As mentioned above, some or all of the traffic lights and vehicles may be connected objects. Each of the connected objects can have direct or indirect communication with the Internet (or a network of servers or computers), and servers that process cloud services. The cloud services, in one embodiment, provide information to particular vehicles regarding the state of particular traffic lights. Providing information regarding the state of traffic lights can improve traffic flow, safety of vehicles traversing particular intersections, and avoid collisions. In one embodiment, information regarding particular traffic lights and the state of each traffic light that may pertain to a particular vehicles is communicated to those particular vehicles, based on their geo-location relative to specific intersections, directions of travel (e.g. heading direction), speed, relationship between other vehicles, and their changing geolocation data (based on their moving or non-moving condition). As further shown in this example, a subject vehicle is identified with a heading direction, and the subject vehicle is entering a particular intersection.

Cloud services may be monitoring the location of the subject vehicle using GPS data, or other tracking information, or combinations of methods. The subject vehicle is known to be entering a particular intersection and the subject vehicle will have an associated area of influence. The area is influence of a subject vehicle may be a sphere or zone that is configurable to a particular dimension, based on the size of the vehicle, the speed of the vehicle, the direction of travel, and its proximity to particular intersections. In this illustrated example, the subject vehicle is traveling toward the intersection and therefore the area of influence is larger toward the front of the vehicle instead of the rear of the vehicle. However, the area of influence behind the vehicle may be sufficiently large to identify other vehicles that may be close enough to potentially affect the subject vehicle. Because the subject vehicle is entering an intersection and the intersection includes a plurality of traffic lights, the cloud processing system must determine which of the traffic lights correspond to the subject vehicle's direction of travel. In this illustration, the relevant connected objects, in relation to the subject vehicle are identified. As noted above, the actual size of the area of influence or zone or distance around or from a connected vehicle may vary, depending on the context of the vehicle and/or other vehicles and/or travel circumstances and/or intersection conditions.

The relevant connected objects may include the vehicle behind the subject vehicle, the vehicle in front of the subject vehicle (e.g., and beside the vehicle), and to traffic lights that are on opposing sides of the intersection. In one embodiment, it is determined that the subject vehicle is intending to proceed forward across the intersection, instead of making a right-hand turn or a left-hand turn. This determination or prediction can be made by monitoring systems of the subject vehicle. The systems can include, whether the vehicle is steering to the right or steering to the left, starting to turn to the lab starting to turn to the right, braking while turning to the right, whether the vehicle has a turn signal on or off (i.e., left-hand turn right hand turn), the vehicle is traversing along a mapped path, using GPS guidance, and other motions or changes in direction of the vehicle.

Continuing with the example shown in FIG. 28, it is determined that the subject vehicle will be proceeding forward across the intersection and therefore the two front facing traffic lights on the opposite side of the street will be identified as the relevant connected objects for the subject vehicle. If the vehicle starts to turn right or makes a right-hand turn signal, cloud services may update the prediction that the user is turning right and then associate as the relevant connected objects to the subject vehicle. In still another embodiment, a camera of the subject vehicle may detect that a vehicle in front has its turn signal on, and is blinking for a left hand turn. And, if the subject vehicle is stopped at or near an intersection, and is stopped behind a vehicle that has its left turn signals on, image detection can be used to detect the intension of the vehicle in front to turn left and cloud services may deduct or predict that the subject vehicle is also intending to turn left. Still further, the shown area of influence may have a shape that corresponds to the direction of travel. For instance, because the subject vehicle is traveling forward, the area of influence takes on a semi-oval shape. In other embodiments, the area of influence may not take on specific shapes, but may simply include objects or exclude objects. In other embodiments, objects can be included or excluded based on their distance from the subject vehicle. Distances can be calculated based on geo-location separation between connected objects, which can be updated from time to time as one or more moving objects (connected objects) traverse particular areas.

FIG. 29A illustrates an example of the subject vehicle having a heading direction that is toward the intersection. In this example, the relevant connected objects can include only the traffic lights that may be relevant to the subject vehicle. In one embodiment, when the vehicle is approaching a intersection more connected objects can be identified as relevant to the subject vehicle. As the vehicle continues to enter or approach the intersection, or is stopped at an intersection waiting for a light, certain connected objects can be filtered down to identify only those that really matter or are relevant to the particular subject vehicle. In this example, only the two front facing traffic lights are relevant to the connected object, i.e., the subject vehicle.

FIG. 29B illustrates an example where only other vehicles are relevant connected objects to the subject vehicle. In this one example, the heading direction of the vehicle in front and the vehicle behind the subject vehicle can be tracked and monitored using the cloud services system. In some embodiments, data from other connected objects that are also communicating with cloud services can be managed so as to determine relative positioning of the various vehicles. In some embodiments, communication can occur vehicle to vehicle, such that the separation, speed, relative positioning, and changes in the relative positioning of the vehicles can be monitored by one or more of the vehicles which may be in contact with cloud services.

In some embodiments, this information is communicated to cloud services so as to provide alerts or information or notifications to one or more of the vehicles to assist in avoiding accidents. In still other embodiments, in addition to notifications or data regarding other connected objects, control information can be transferred to one or more of the vehicles so as to enable accident avoidance. For instance, tactile feedback can be provided to various vehicles so as to alert drivers when potential exists for a collision between one or more of the vehicle's or stationary objects.

FIG. 29C illustrates an example where connected objects within the area of influence of the subject vehicle are utilized to provide information to the subject vehicle. Information regarding other vehicles proximate to the subject vehicle can be communicated to the subject vehicle via the Internet or by way of the vehicle to vehicle communication. Information regarding the state of the traffic lights can also be communicated to the subject vehicle, provided that the traffic lights are within the area of influence of the subject vehicle. As mentioned above, the select traffic lights that will be relevant to the direction of travel or predicted direction of travel will be provided to the subject vehicle. In some embodiments, as the prediction becomes more refined when a vehicle enters or gets more proximate to an intersection, the information will assist in refining the prediction so as to provide more relevant data regarding traffic lights state and state changes.

In some embodiments, vehicles may approach an intersection, yet not stop at the intersection when the light is green. This may be the case often, as drivers progress around from intersection to intersection. Accordingly, if the light is green and/or the vehicle does not stop at the intersection (likely because the light is green), the color indicator and/or text or notification of the state of the light may not be surfaced or shown on a display of the vehicle or device to reduce clutter. Thus, logic processed by the vehicle and/or the cloud processing can determine to show or not show (e.g., surface or not surface) the state information to the screen of the vehicle or a device in the vehicle. This feature therefore provides an automatic throttle, to avoid presentation or refrain from presenting status indicators when conditions indicate that the status information is not useful or likely to be needed. The same can be said for other types of environmental alerts and/or notifications. If conditions indicate that the information is not useful based on the context of driving or the context of driving in particular environments and/or conditions, the information is not surface or presented on a screen of the vehicle and/or a device of the user in the vehicle. Similar filtering of information and/or instructions to system of the vehicle can be processed or avoid to reduce clutter, distraction and improve driving safety.

Figure 30:
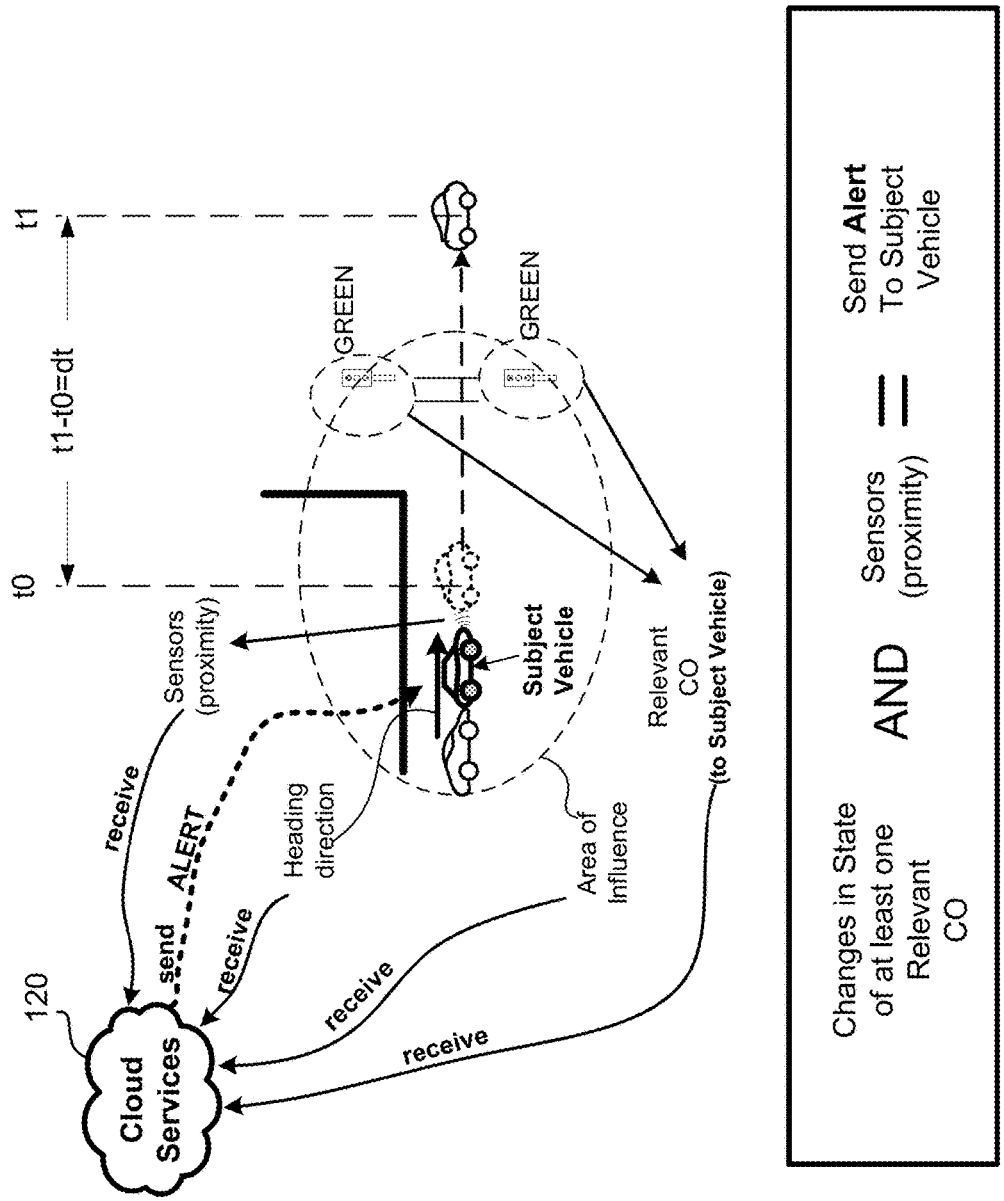
FIG. 30 illustrates an example where changes in state of at least one relevant connected object and sensors of one or more vehicles can be used to identify proximity to other vehicles or objects, and alerts can be sent to vehicles regarding the combined information in accordance with several embodiments.

FIG. 30 illustrates an example where changes in state of at least one relevant connected object and sensors of one or more vehicles can be used to identify proximity to other vehicles or objects, and alerts can be sent to vehicles regarding the combined information. For purposes of showing communication with cloud services 120, certain information is communicated to the subject vehicle wirelessly and some information is received by the subject vehicle wirelessly. In this example, the subject vehicle may include a plurality of sensors that are designed to identify proximity to other vehicles. The sensors can identify the closeness of one vehicle to another, the closeness of the vehicle to stationary objects, and the potential for collision with other vehicles or connected objects. The sensors can include camera sensors, ultrasonic sensors, radar sensors, infrared (IR) sensors, motion sensors, inertial sensors, and combinations thereof.

The sensors can include sensors directed in various locations in the vehicle, including the top of the vehicle, sides of the vehicle, front of the vehicle, rear of the vehicle, inside the vehicle, etc. Sensor information, such as proximity to another vehicle may be communicated to cloud services by the subject vehicles computers. The location of the subject vehicle and the heading direction can also be communicated to cloud services 120 by the vehicle or determined by cloud services based on the location of the vehicle. Based on the location of the vehicle, certain connected objects within the area of influence can be identified. In this example, traffic lights have been identified, and their state has also been identified at a particular time. The state in this example is green.

For discussion purposes, green means that the traffic light will allow the driver to proceed across the direction of travel for which the traffic light is associated or directed for. In one example, the vehicle in front of the subject vehicle may have begun to move forward after the state change of the traffic light, e.g. the light turns green. At time 0 the vehicle in front of the subject vehicle starts and moves to a direction and placement beyond the traffic lights at time 1. If during this period of time (e.g., delta time lapse or duration), the subject vehicle fails to move forward, a signal can be communicated to the subject vehicle by cloud services to alert the subject vehicle that the light is green and the car in front has moved forward. This period of time may vary, but generally it may be if 12, or 10, or 8, or 6, or 4 or 2 seconds passes after the front vehicle has moved. In some cases, the sensitivity of when to send alerts will be context and location specific. For instance, in some cities, users are in a hurry and the trigger may be if the user sits for more than 2 seconds. In other areas, such as in the country or low traffic zones, the trigger may be closer to 12 seconds.

By providing this information, a vehicle behind the subject vehicle will not become annoyed that the driver has not proceed to move when the light has turned green. In one embodiment, if the driver becomes distracted while the light is red, the driver may fail to look up and notice that the light has turned green.

In this manner, providing an alert by cloud services to the subject vehicle, the subject vehicle's driver may continue his driving activities and discontinued his distracted state. As will be described below, there are situations where the driver of the subject vehicle may be operating a mobile device while at the intersection. If the light turns green, the driver of the subject vehicle may not notice the light turning green (i.e. state change), and the driver behind the subject vehicle may become annoyed. If the period of time has passed when the state change has occurred and the driver of the subject vehicle has not moved, and the vehicle in front has already moved, then the subject vehicle may receive an alert. The alert may be in the form of an audio alert, a mechanical alert, tactile feedback, notifications, and messages. In one embodiment, the notifications and messages may be communicated to the mobile device or electronics of the vehicle that the user was interfacing with while at the stop sign or stop light. For example, if the user is utilizing a smart phone while at the stop light, certain parts or portions or applications of the smart phone or device may deactivate automatically when the light turns green. In another embodiment, only certain applications that are not allowed during vehicle driving may be turned off or deactivated (such as navigational applications on a computer and a vehicle display).

In some embodiments, the portable device being utilized within the vehicle, is detected to be in the proximity of the driver's zone, will be inactivated when the light turned green. Inactivation of the user device can occur in numerous ways. The user device can be put to sleep, can be deactivated for certain applications, and the user may receive notifications of the state of the light on the user device or the vehicle display. For instance, if the user is utilizing a texting function on a mobile device, and the light turns green, the green light may be rendered in some icon or region of the display screen, which indicates of the user that the light turned green. By doing this, the state of the light for which the user was waiting to turn from red to green is actually reproduced on the mobile device screen or the screen of the vehicle. In this manner, if the user is focusing on the screen of their device or the vehicle device, the user will instantly see that the light has turned green and discontinued use.

In some embodiments, in addition to showing the color of the light and the state change, certain functions, applications, features, and or the entire device will become the deactivated for a period of time while the vehicle is being driven or is identified to be in drive mode.

Figure 31:
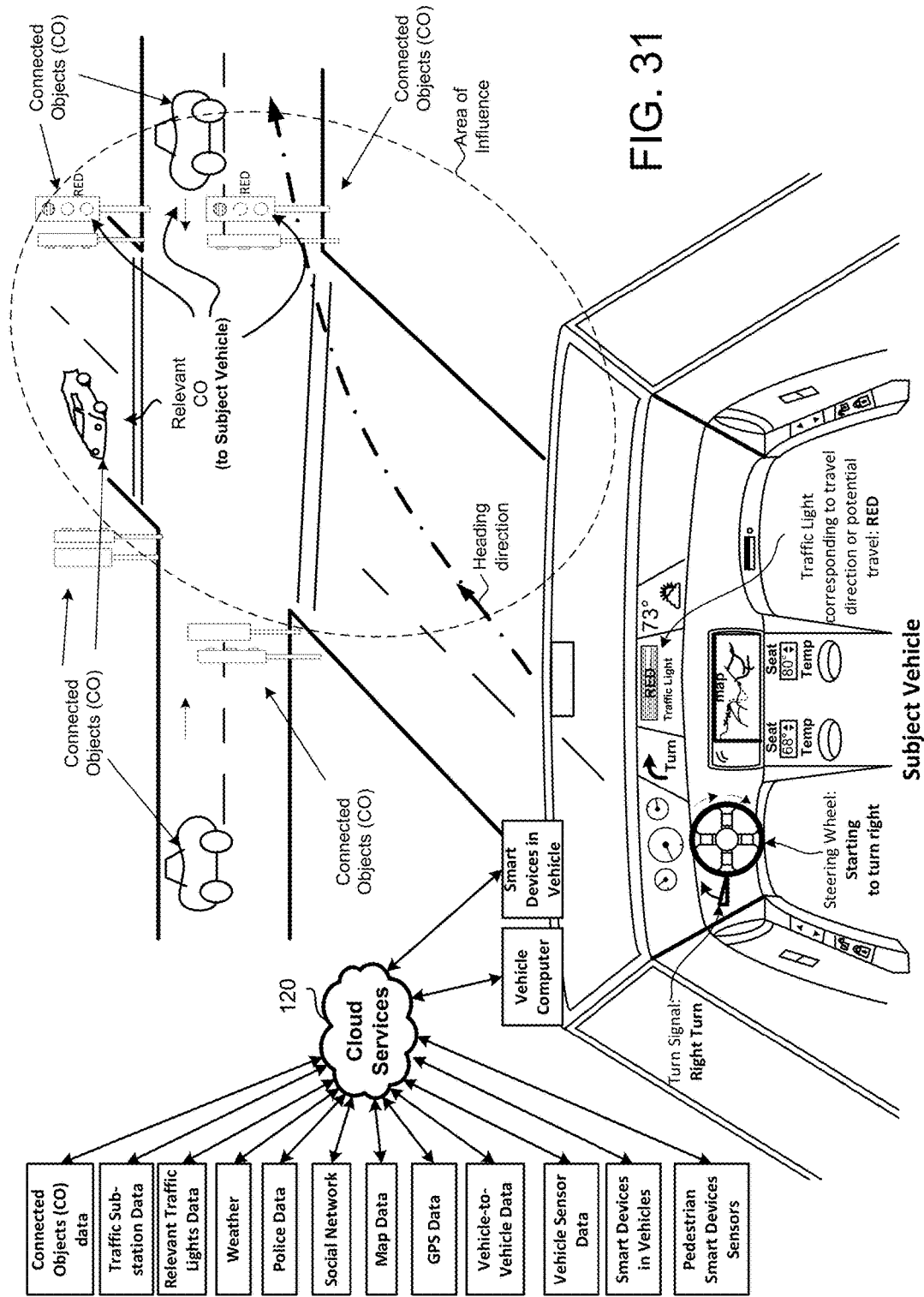
FIG. 31 illustrates an example of a vehicle cockpit, proceeding along a street and approaching an intersection. In this example, cloud services 120 is shown in communication with the vehicle computer and smart devices in the vehicle in accordance with several embodiments.

FIG. 31 illustrates an example of a vehicle cockpit, proceeding along a street and approaching an intersection. In this example, cloud services 120 is shown in communication with the vehicle computer and smart devices in the vehicle. It should be understood that cloud services 120 can communicate solely to the vehicle computer or solely to the smart devices in the vehicle or both. For purposes of providing context to one example, cloud services 120 is shown connected the various components and/or systems.

The following are only examples, and other systems having connection to the Internet may also provide data which may be useful for cloud services 120 in rendering information to connected vehicles. In this example, cloud services 120 may be in communication with connected objects data, traffic substation data, relevant traffic lights and data, weather applications and systems, police data and relevant accident information, social networks including identification of friends nearby, map data identifying current locations and proximate businesses and/or services and/or traffic lights and or activity, GPS data for one or more vehicles, vehicle to vehicle data management vehicle sensor data of one or more vehicles, smart devices in vehicles, pedestrian smart devices and sensors that may be located in an area of influence, etc. As shown, the vehicle may be in the process of turning right, and the heading direction is shown with an arrow. In addition, the turn signal may be turned for a right turn. At this point in time, the corresponding traffic lights that would relate to the right turn may be identified as having a condition or state of RED. The vehicle state and changing state and movement direction can also be monitored as the vehicle approaches the intersection in the heading direction.

For instance, if the user is moving the steering wheel slightly to the right and continues to move to the right hand lane to potentially make a right-hand turn this information is used along with the fact that the right turn signal is active. In another embodiment, the user may be traversing a mapped path and following term by turn information using a navigation system. This information can be utilized to identify where the vehicle will go after it reaches the intersection, which in this example the vehicle would turn right.

One of the displays in the vehicle can also illustrate the corresponding color of the traffic light that may apply to the direction of travel of the vehicle. For example, the color RED may appear on one or more displays of the vehicle, signaling to the user that the traffic light is red for the intended traversing direction. In some embodiments, advertising data may also be provided to the user devices or the vehicle displays, depending on the geo-location of the vehicle. For example, the user (e.g., displays of the vehicle or devices of the user or occupants) may be provided with advertising related to business or merchants that are nearby. In further embodiments, serving of advertising may be filtered based on user preferences, so that advertisements that are not of interest to the user are omitted, or not of interest based on predicted likes or dislikes based on historical interaction. Other ways of filtering ads or finding ads or serving ads to the user may also be used, as described in this document or in incorporated by reference materials.

In addition, other relevant connected objects in the intersection may also be identified relative to the subject vehicle.

For instance, other vehicles that may be entering or leaving an intersection may also be identified. In certain circumstances, some connected objects may be approaching an intersection at high speeds and may not be prepared to stop at the intersection. This information can be communicated to other connected objects approaching the intersection. This information, for example can be communicated to a vehicle that has the right away yet another vehicle is about to enter the same intersection and breach the right away.

This information can be useful to avoid collisions that may occur at intersections when in fact drivers feel that they have the right away based on the color of the lights. In other embodiments, emergency vehicles entering certain intersections may cause cloud services to communicate with traffic signals to place all traffic lights or certain traffic lights in red or flashing red. This information can be used to clear a path along intersections for emergency vehicles. In other embodiment, emergency vehicles may cause certain traffic lights to turn their state to green to allow the emergency vehicles to progress, while changing opposing traffic lights to red. This may be done in advance of the emergency vehicle reaching an intersection.

For example, if the emergency vehicle is headed in a particular direction which may include a number of intersections that are mapped along a path, those traffic signals along that path may automatically change to green for the direction of the emergency vehicle, while at the same time placing other opposing traffic lights in red, to clear a safer password traversing vehicles. In a similar manner, if emergency vehicles are traversing a particular path that takes them through various intersections, in addition to changing traffic lights to facilitate their traversal along the path, certain traffic lights can also be equipped with cameras (and other sensors) that can monitor intersections in advance of emergency vehicles entering or reaching particular intersections.

In some embodiments, emergency vehicles may communicate signals, via a cloud system, to other vehicles in their path. For example, if an emergency vehicle is traveling in a direction and there are several cars in front, the cars in front may be provided with an alert or display indicator alerting them that an emergency vehicle is approaching behind them, and to move over to the left or right (or stop if they are being pulled over for some infraction or potential infraction).

This information can also be used to communicate safety information to approaching emergency vehicles, such that emergency vehicles are notified if particular intersections are blocked in their intended traverse direction. If intersections are blocked, rerouting of emergency vehicles can take place in addition to resetting of traffic lights to suit the intended direction of emergency vehicles. The location of emergency vehicles can be tracked, just as any other connected object is tracked, and the state of the traffic lights (connected objects) can also be tracked, such that cloud services can provide the appropriate information to the vehicles as well as to the connected objects.

Figure 32:
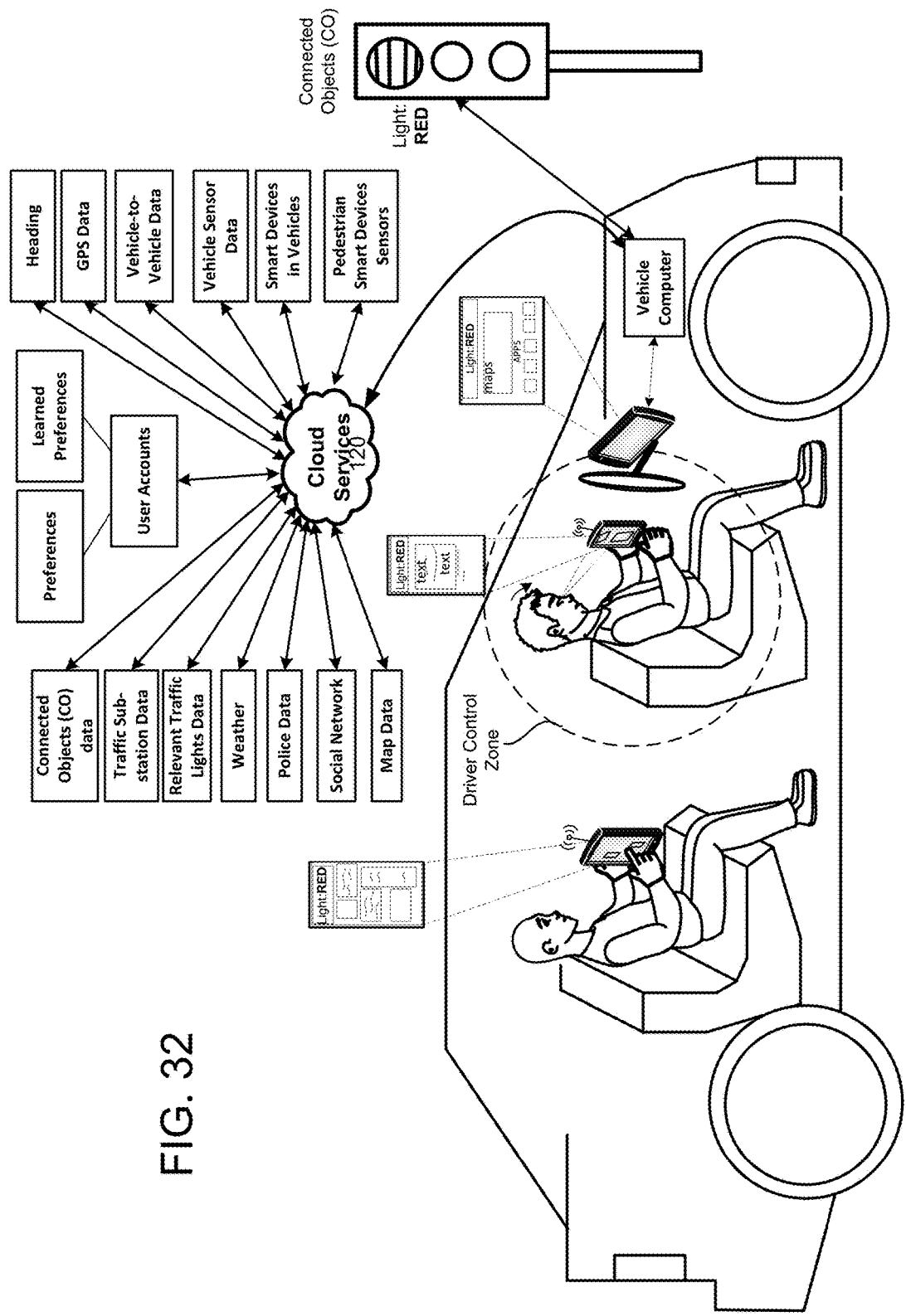
FIG. 32 illustrates an example of a vehicle with a driver sitting in a driver control zone and the passenger utilizing a smart device within the vehicle, in accordance with one embodiment of the present invention.

FIG. 32 illustrates an example of a vehicle with a driver sitting in a driver control zone and the passenger utilizing a smart device within the vehicle, in accordance with one embodiment of the present invention. As shown, the driver is manipulating a mobile device, and is at a stop light. The vehicle is therefore stopped waiting for the traffic light (connected object) to turn green. During this time, the driver has look down and is focused on his mobile device, to interact in texting or some other application. This example also shows the passenger interacting with his mobile device.

The mobile device of the passenger can control features of the vehicle, such as settings associated with his or her seat, air conditioning, windows, radio, apps of the car, and other features. In one embodiment, the passenger can be communicating with the vehicle computer to provide access to those specific features that affect the passenger. During the manipulation and interaction with applications on the mobile device, by the passenger, one embodiment may include providing an identifier on some portion of the screen that identifies the state of the traffic light. For example, the state of the traffic light is red, so at some portion of the display screen, the identifier can be presented on the mobile device while the user is interacting with other applications. The same can be said for the mobile device of the driver as well as the display unit of the vehicle. As shown, the display of the vehicle can include various applications, mapping applications, and other features.

While the vehicle is stopped, the state of the traffic light (red) can be displayed so that users focusing in on their applications or mobile devices will see that the traffic light is red. As further shown, the vehicle computer can also be communicating with cloud services 120. In this example, the vehicle can be associated to the user account and preferences of the vehicle and of the driver can be maintained. The preferences can include preferences that are entered by the driver or learned preferences for the specific vehicle. For example, the preferences can include information as to how the user wishes to be notified when the traffic light changes from red to green. Notification can include audio notification, text notification, tactile feedback notification, multiple notifications, multiple messages, color changes on the display screen, color indicators on the display screen, and the like.

Figure 33:
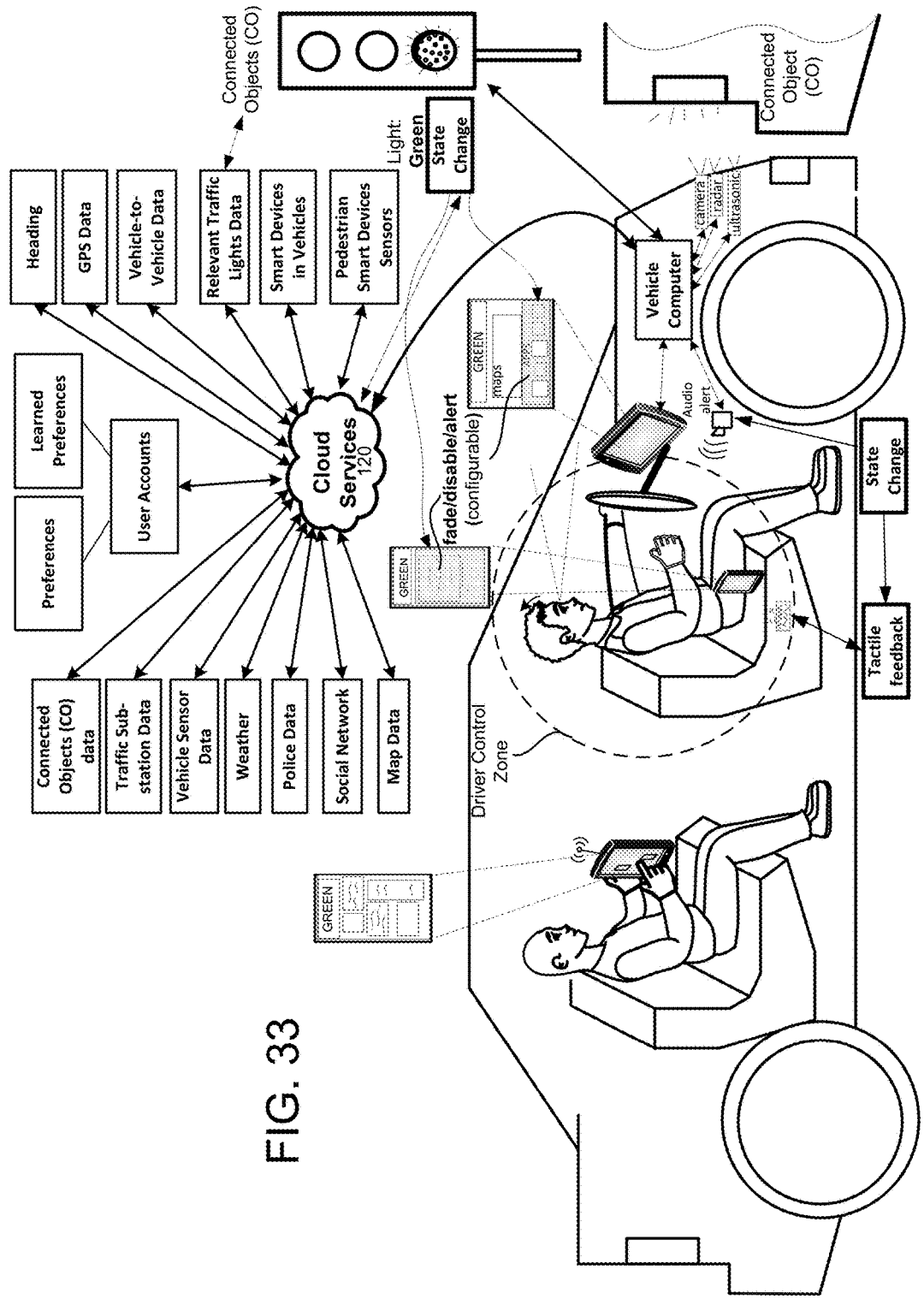
FIG. 33 illustrates an example of when the traffic light has changed date and has moved from red to green in accordance with several embodiments.

FIG. 33 illustrates an example of when the traffic light has changed date and has moved from red to green. In this example, the state change can be communicated to cloud services 120 and also to connected objects such as the vehicle and devices proximate or in the vehicle. In the illustrated example, the driver is notified that the state changes occurred and the mobile device will show that the color green is identified for the traffic light. At this point, certain features of the applications running on the mobile device can be faded out, disabled, inactivated, or an alert can be generated to notify the user that the light has turned green. Still further, other examples can include changing the activity or accessibility of certain applications on the display of the vehicle computer.

The activation or disabling or fading of certain applications is required or configurable based on local regulations, laws, or settings. By disabling or fading certain applications on either or both of the mobile devices that are provided with accessible reach in the driver control zone, drivers are alerted that a traffic light has changed so the driver can proceed to look forward and pay attention to driving instead of connected devices. As shown, the vehicle computer can also be communicating with other sensors. Certain sensors can include cameras, radar, ultrasonic, audio sensors, tactile feedback sensors, etc. Certain sensors can be used to identify when a vehicle at a stop sign or stop light is required to proceed with movement when the state change of the traffic light indicates that the vehicle should move forward. For example, if the vehicle in front of the subject vehicle has already moved forward and the connected light is green, yet the subject vehicle has not moved forward, the vehicle computer can provide state change information to tactile feedback units within the vehicle to alert the user that the traffic light has turned green.

In addition to tactile feedback or instead of tactile feedback, audio alerts can be provided to the driver, or simply stayed changes to the applications, displays, functionality, interactivity, of devices and display screens that are accessible to the driver. In one embodiment, passengers in the vehicle may also be provided with information of the state change, such as the light turning green. However, because the passenger is not required to pay attention to driving, the applications on devices of passengers may remain active.

In another embodiment, a way to keep someone from texting and driving is to not let their text be sent when the car is moving. In one embodiment, a parent/friend that is concerned about a kid/friend texting can place a setting on their device. For instance, the user can send a message to another user indicating that no message will be read from that person while their device is detected to be in the vehicle that is being driven. For example, a parent can send a message to a kid notifying the kid that if the kid sends a message while driving, that message will not be received by the parent. Thus, the kid will be discouraged from sending text messages to the parent, as the parent would not be receiving those messages while the vehicle is moving. The same can be done by any friend utilizing an application that notifies the friend that no message it will be red if messages are sent from their device and the devices associated with a moving vehicle. For example, I put a setting on MY phone that does not let ME receive any texts when my friend or kid "the text SENDER," is driving.

If all my friends set their phones to NOT let me send them texts when I am driving then I will not be sending any texts because they will not get them. As a "real friend," most friends will set this settings on their phone apps or devices so friends will drive safely. In one embodiment, a determination is made if a particular device is associated with a driving person. This determination can be made by sensors or proximity sensors within the driving zone of a vehicle. As shown in FIG. 33, if the cell phone is proximate to the driver even if not being viewed by the driver, that cell phone will be disabled while the vehicle is moving. If the cell phone is moved away from the driver control zone, that phone would be enabled, and usable by another passenger.

Thus, messages sent to the mobile device or attempted to be sent from the mobile device while the driver is handling the device in the driver control zone will not be sent. In one embodiment, this feature can be included as part of an application of the vehicle. In another embodiment, this feature can be enabled as a standalone application of a device. In other embodiments, the application can communicate with electronics of the vehicle to identify movement of the vehicle or with GPS or other cloud services to identify movement of the vehicle and identify the position of the mobile device within the vehicle.

In one embodiment, one or more servers of a cloud system can execute methods, which enable sending of data to connected objects (e.g., connected vehicles and/or other connected objects), and receiving data from connected objects (e.g., connected vehicles and/or other connected objects). The server or servers of a cloud system that may provide cloud services, may receive one or more geo-locations of a vehicle over time. This geo-location data may be used to identify the location of the vehicles and the movement of the vehicles around various areas traversed. In some embodiments, sensor data of the vehicle may be used. The sensor data may include various types of sensors, such as to detect the presence of other vehicles or objects and detect when other vehicles or objects have moved.

In one embodiment, a vehicle and/or a server of the cloud system may receive information from the vehicle, and the vehicle may be getting information from some other device, e.g., traffic light, another car, a sensor, a building, a road, a light post, or some other thing that is connected or can communicate with other connected objects or one or more servers connected to the internet or a network. In one embodiment, an area of influence (with respect to a subject vehicle) may be within 500 feet (or within 50-200 feet), if the connected object is a traffic light.

In some embodiments, it is understood that various connected objects are independent of each other, meaning one connected object does not control the other. For instance, a traffic light, being a connected object, is independent of a vehicle, which is also a connected object. In some embodiments, each connected object may have its own independent connected identify, such as an IP address or internet ID, or serial number or code or identifier, so that each can be identified and distinguished. In other embodiments, one connected object may control another connected object. In some embodiments, a vehicle may receive data from more than one connected object, either directly by communication with the connected objects or via a wireless connection to the internet.

In some embodiments, a current geo-location is the geo-location identified by a GPS coordinate, and that coordinate can be associated to a mapped location, and the mapped location can be associated to traffic lights, buildings, businesses, and other objects nearby. In one embodiment, the state information of an object may change, from time to time. In the example of a traffic light, the state change may be if the light changes from green to red, or red to green or is yellow or is an arrow of red or green color or is in a transition between any color or text or state.

In one embodiment, the heading direction of a vehicle may be where the vehicle is pointed or oriented. This may provide an indicator as to which light the vehicle is facing (i.e., in front of the car). Or at least an area ahead of the vehicle, so a user may view the light, from the current "orientation/heading." In one embodiment, the direction of travel can be straight, can include a turn up ahead, a curve up ahead, or multiple turns up ahead. In some examples, the direction of travel may exclude reads or turns behind that are not current options of travel due to the current geo-location and or movement direction.

In some embodiments, information regarding at least the stationary objects that are in the direction of travel are used for determining that the state information changed while the current geo-location of the vehicle remains unchanged for the threshold period of time after the state information changed. The threshold period of time can vary, for example between 2-12 seconds, and more likely between 2-6 seconds, and more likely, between 1-5 seconds, and more likely, between 1-3 seconds. In one embodiment, the threshold is configurable by a user, such that the threshold is reached sooner or later, depending on how urgent or desperate or casual the driver may be. For example, city drivers may request a lower threshold (e.g. closer to the less than 3 seconds), while country drivers may request or set a higher threshold (e.g. closer to less than 10 seconds).

Figure 34:
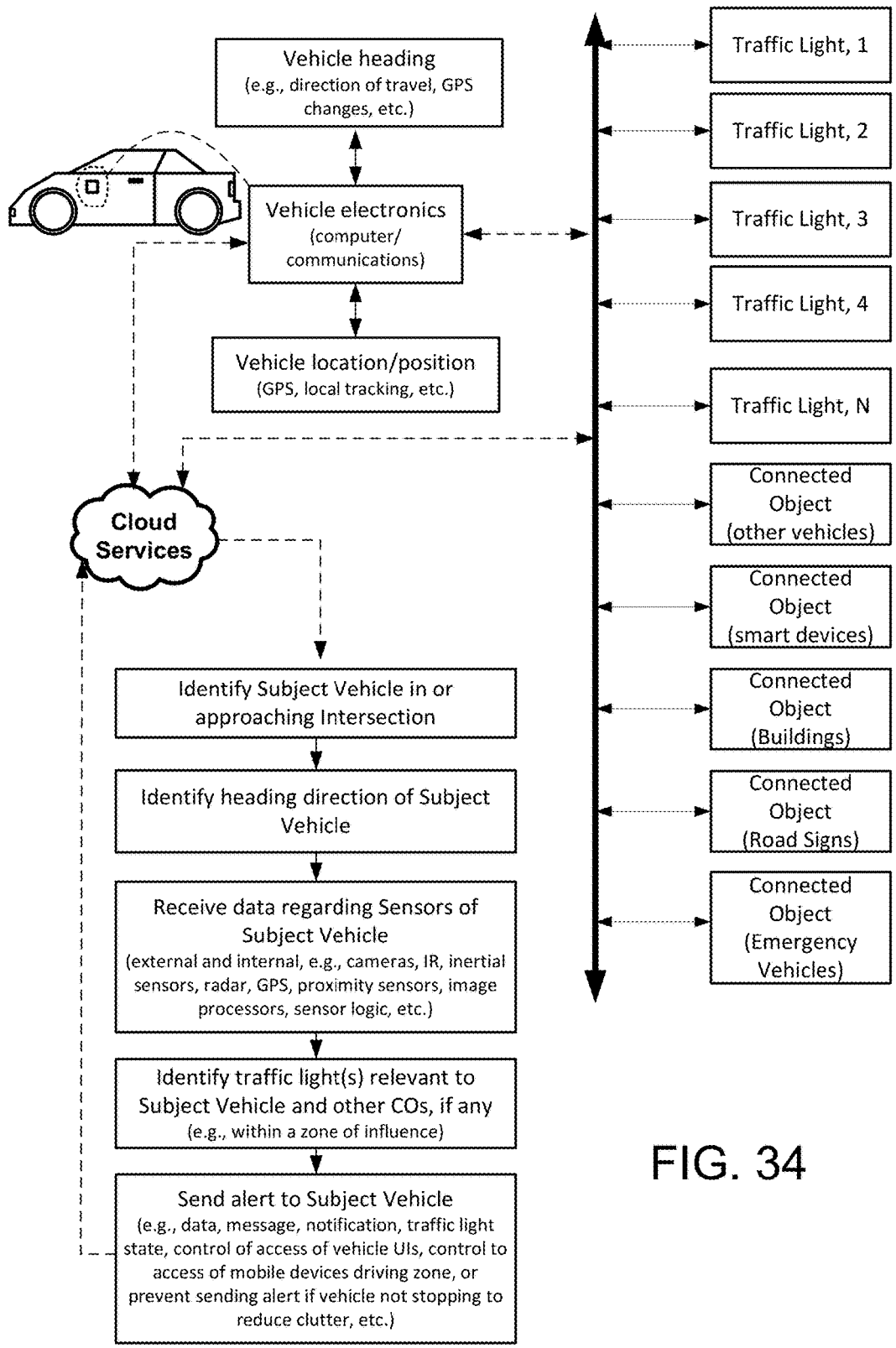
FIG. 34 illustrates an example diagram of methods for communicating between cloud services and connected objects, and interaction with vehicle electronics and displays of users, and associated user preferences, learned preferences, and the transferability of preferences to various vehicles.

FIG. 34 illustrates an example diagram of systems that communicate between vehicle electronics, computers, and communications with other systems, including cloud services. As shown. Vehicle electronics may be communicating with vehicle heading information, such as the direction of travel information GPS data and changes in GPS. Additionally, vehicle electronics may be collecting or producing or accessing vehicle location and position data using GPS, local tracking, and or other tracking methods. This information can be then communicated to cloud services. As mentioned above, cloud services can include a plurality of servers, storage, management of user accounts, preferences, learned preferences, configurations, settings, and other information for users that are utilizing cloud services. The users may utilize cloud services by attaining user accounts. Cloud services may be operated by one or more entities. Some entities may have their own cloud services, while other entities may share cloud services. In some embodiments, certain cloud services may utilize APIs to access the cloud services or data of other cloud services.

In this example, vehicle electronics may communicate with connected objects either directly or via cloud services, such as the Internet, networks, local networks, wide area networks, or combinations thereof. In some cases, vehicle electronics may be able to communicate directly with certain connected objects, such as using peer-to-peer, cellular, wireless, radio, or other connection methods and/or systems. In this example, connected objects may include traffic lights, other vehicles, smart devices, connected buildings, road signs, emergency vehicles, and the like. In one embodiment, cloud services is receiving information from vehicle electronics regarding the vehicles heading and location changes. Utilizing this information, cloud services may identify the subject vehicle and whether or not it is approaching an intersection. The vehicles heading can also be identified relative to the intersection, such as to identify relevant traffic lights or other connected objects that will relate to the direction of travel of the vehicle. In some embodiments, identifying the direction of travel and the speed of the vehicle may also determine whether or not the vehicle may be stopping at the intersection.

If the vehicle is not stopping at the intersection, then alerts may be turned off or not activated. For instance, if the light is green notification to the display screen of the vehicle that the light is green is simply extra information that may clutter the screen and or audio output of the vehicle and may cause distraction instead of helping. Once it is determined with the identity of the heading direction is for the subject vehicle and the conditions of whether the vehicle is going to stop or not stop or is attempting to stop at an intersection or near a traffic light, the method can move to process and receive other data from the vehicle, such as sensor data. The sensor data can also be collected at any time and need not be collected after identifying the heading direction, so therefore the order of the method operations is not necessarily the order in which the processes will occur. In some embodiments, the processes will occur simultaneously, synchronously, or asynchronously or in different orders. The sensor data from the vehicle may include external sensors and internal sensors. Some centers may include cameras, infrared sensors, inertial sensors, radar sensors, GPS sensors, proximity sensors, image processors, sensor logic, and the like. For example, some of the sensors, which may include cameras inside the vehicle may detect the face or body parts of the driver to identify alertness, direction that the user is looking, whether the user is distracted, and other identifying information regarding the driver to provide information to the driver when the driver needs the information.

For example, if the driver is alertly looking toward a traffic light, the user may not need additional notifications or alerts to the display screens of the vehicle or audio displays. If the driver the vehicle is looking away from the traffic light or toward the display screen of the vehicle or a passenger, the alert may be more likely to be rendered or provided to the driver or vehicle. In one embodiment, if the vehicle is at intersection and traffic lights are relevant to the subject vehicle, information such as state of the traffic lights can be provided to the vehicle. Once it is determined that certain connected objects are relevant to the subject vehicle, it is determined whether or not to send the information to the vehicle. One filtering process may include identifying whether the connected objects are within the zone of influence of the subject vehicle. If the connected objects are too far away or outside of the zone of influence of the subject vehicle, and alert may not be sent to the vehicle, as those connected objects may not be relevant to the driver and will increase clutter not helpful for reducing distracted driving. Once it is determined which connected objects are relevant to the connected vehicle, cloud processing may determine to send an alert to the subject vehicle. As mentioned above, the alerts can take on various forms. And alert can be simply to provide data to the subject vehicle which is then processed by the vehicle electronics, computers, applications running on the vehicle, and other decisions can take place in the subject vehicle before presenting the alert to the displays, audio, tactile feedback objects, and other systems.

In one embodiment, the alert can also take on the form of a message, a notification, a traffic light state (e.g. the light is green, the light is red, the turn signal is green, the turn signal was red, a pedestrian is in the right away, an oncoming car is approaching an intersection when the light is green, emergency vehicle is approaching, and emergency vehicle is requesting that the subject vehicle stop, etc.). In some embodiments, certain user interfaces of the vehicle will be disabled when the vehicle is determined to be moving, traversing, or active driving is taking place or should be taking place. In some embodiments, certain applications or user interfaces of the vehicle will be enabled when the vehicle is at a stop, and intersection, or is in Park. In some embodiments, when the state changes of the connected objects, such as the light turning green, certain features or applications or functions of the computing systems of the vehicle, display screens, or user devices within the vehicle may be disabled, deactivated, place to sleep, paused, stopped, turned off, etc. In some embodiments, the activity that takes place to those connected devices can be configured by the user, and can be set as part of preferences of the user account. In one embodiment, the preferences and settings made during times of use can be monitored to identify patterns and predict what features the user wishes to activate, learned preferences, and improve the interfaces for the particular users.

In one embodiment, when users enter different vehicles, the user can pair his or her user account to any vehicle. Therefore, the preferences, learned settings, and interactions that are specific to specific users can be transferred from vehicle to vehicle utilizing the information stored in cloud services. Accordingly, the functionality and features described herein are not necessarily tied to a specific vehicle that can be ported over to many vehicles or the vehicle's that correspond to the particular drivers users and user accounts managed by one or more cloud services. With the above features in mind, it should be understood that more or less of the features described herein may be integrated together to defined specific implementations.

In one embodiment, at a remote location, a user is able to access a user interface for an application, which provides users access to user accounts. A user account can be for a user and the user can add one or more vehicles, objects, data or appliances for remote reporting, viewing and control. In one embodiment, a user is an owner or user of a vehicle. The user can register the vehicle with a remote service.

The remote service can be accessed over the Internet, such as via a website or application of a portable device. The remote service can provide a multitude of cloud services for the user, such as remote control features, remote viewing services, remote alarm controls, remote camera activation, remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person standing proximate to the vehicle. The remote user can then communicate with a person standing proximate to the vehicle using microphones and speakers of the vehicle.

In some embodiments described herein, vehicles, structures and objects may include circuitry and communication logic to enable communication with a cloud processing system over the Internet.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user. The input from a user can also be provided by voice input, facial recognition, eye-retina scans, fingerprint scans, a combination of biometrics, or via a capacitive or regular touchscreen contained or displayed within the vehicle, the vehicle's glass, doors, dashboard, etc.

In one embodiment, vehicles can maintain information regarding where they are, where they are heading and their destination maintained which is maintained by GPS and navigation systems on board. The information collected and maintained by every vehicle may be mutually exclusive, meaning that each individual vehicle is aware of its own heading, rate of speed and current location. This information, in one embodiment is crowd sourced and/or crowd shared/consumed for use in for accident avoidance or other communication. By networking vehicles within a certain radius together, all individually location-aware vehicles become aware of all other vehicles in their sphere of influence. Vehicles may network with vehicles in their range using wireless communication systems such as but not limited to Wi-Fi, Wi-Gig LTE, cellular, radio, near field communication or other methods.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

The access to the data can also be encrypted to prevent unauthorized access to the data. GPS and mapping services can also be in communication with the cloud processing 120 provide data concerning the locations of the vehicles and activities that occurred to the vehicles when at particular locations. The cloud processing 120 can be access by the vehicles themselves using their electronics and communications, via mobile devices, from home, from work, etc.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

A user's APP homepage may also include dynamically updating sections in which the most relevant information at a given time may be displayed or surfaced to a user. If a user has parked in a certain parking area, he or she may want to monitor metrics related to incidents that may have occurred to his or her vehicle, vehicles around his or her vehicle, any dynamically received alerts, as well as precaution levels. Additionally, a user may choose to configure his or her APP homepage to display the most pertinent audio and video feeds to their needs.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another.

This local communication will enable one or both vehicles to take correction actions or alert a driver to change course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

In one embodiment, a method for customizing a user interface is provided. The method includes receiving a request to customize a user interface of a vehicle and providing selection options to identify a vehicle type among a plurality of vehicle types. Each vehicle type is associated with system components native to the vehicle type and one or more of the control interfaces that can be mapped to an application programming interface (API). The method includes identifying a plurality of applications available for the vehicle type, where each of the applications has a link to at least one of the control interfaces via the API of the system components. The method includes receiving selection of the vehicle type at cloud services, which interfaces with a website over the Internet or a backend of a website over the Internet.

The method includes receiving selection of an application selected from the plurality of applications; the selection of the application is made so as to add an app interface for the application to the user interface of the vehicle. The method, at cloud services, generates a custom configuration of the user interface for the vehicle type that includes system interfaces for some of the system components native to the vehicle type and the app interface for the application. The custom configuration is saved to a user account, at a database in cloud storage associated with cloud services. In one embodiment, code for the custom configuration is transferred to a vehicle that is to be associated with the user account. The code of the custom configuration is defined to set a display of the vehicle to provide the user interface having the system interfaces along with the app interface, the method is executed by one or more processors.

In some embodiments, the method includes receiving a request to modify the custom configuration; enabling changes to the selection of the application, the changes including adding additional applications or removing the application; regenerating the custom configuration with the changes; saving the custom configuration to the user account, and transferring the custom configuration having the changes to the vehicle.

In some embodiments, the method includes enabling identification of a second vehicle for the user account, the second vehicle having a second vehicle type.

In some embodiments, the method includes processing a request to transfer the custom configuration to the second vehicle. The processing of the request includes, automatically updating the system components for the second vehicle type, the system components of the second vehicle including more or less features based on the second vehicle type as defined by a manufacturer of the second vehicle; and determining if the application functions for the second vehicle type, and providing options to select an update for the application in response to processing the request to transfer the custom configuration when the application does not fully function for the second vehicle type.

In some embodiments, the manufacturer of the vehicle and the second vehicle is either the same or different.

In some embodiments, the method includes processing a request to use the custom configuration on a second vehicle. The processing of the request includes, receiving login credentials for the user account to enable the use of the custom configuration from the second vehicle, automatically updating the system components for the second vehicle type, the system components of the second vehicle including more or less features based on the second vehicle type as defined by a manufacturer of the second vehicle; and determining if the application functions for the second vehicle type, and if the application does not function for the second vehicle type, either omitting the application from the custom configuration or providing a replacement application for the application.

In some embodiments, the method includes maintaining a database of user accounts, each user account having one or more custom configurations of the user interface; processing a request to use a second custom configuration on the vehicle, the request being received from the vehicle upon entering credentials to access a second user account; transferring the second custom configuration to the vehicle for use while the credentials of the second user account are active on the vehicle, wherein the request to use the second custom configuration terminates use of the custom configuration in favor of the second custom configuration.

In some embodiments, the method includes terminating a session of use of the custom configuration on the vehicle, termination of the session acts to, reset the display of the vehicle to provide the user interface with system interfaces that are default set by the manufacturer of the vehicle; or set a second custom configuration for a second user account.

In some embodiments, the display of the vehicle includes any one or more of a main dashboard display, or a center console display, or a headrest display, or a movable display, or a wireless display, or a wire-connected display.

In some embodiments, the method includes receiving a request to make changes to add or remove applications from the custom configuration.

In some embodiments, the method includes enabling a user interface tool to arrange some of the system components and app components of the application on a display; the arranging includes defining positional locations for graphical user interface (GUI) items of the custom configuration.

In some embodiments, the method includes enabling linking of one or more applications executed on a mobile device to be presented on the display of the vehicle in accordance with the custom configuration, the linking enabled upon pairing the mobile device with electronics of the vehicle.

In some embodiments, the method includes receiving user input via the custom configuration, learning patterns of user input over time, and automatically programming one or more components of the custom configuration based on the learned patterns of user input.

In some embodiments, the method includes automatically adjusting positional locations for graphical user interface (GUI) items of the custom configuration based on the learned patterns; and saving the adjustments to the user account, the user account being saved in a database that is interfaced over the Internet with cloud services that execute code using one or more processors.

In some embodiments, the one programming of one or more components of the custom configuration includes automatically setting input based on times of day or days of week, or dates of month, or combinations thereof.

In some embodiments, the custom configuration of the vehicle is transferable to a second vehicle.

In some embodiments, the custom configuration is saved to the user account in cloud storage, and cloud processing provides communication with the vehicle over the Internet.

In some embodiments, the cloud processing provides a website interface to enable selection of the vehicle type and the application to define the custom configuration and also enables updates to the custom configuration to add, delete or update applications to be associated with the custom configuration.

In some embodiments, the code for the custom configuration is transferred to the vehicle upon receiving credentials to access the user account from the vehicle so as to associate the vehicle to the custom configuration, the association of the custom configuration to the vehicle being for a period of time.

In some embodiments, the period of time is for a session that remains until logged out of the user account, or a second user account logs in to define a new session with a second custom configuration of the second user account.

In some embodiments, the vehicle electronics are programmed with a master account, the master account being in communication with cloud services over the Internet, the master account enabling use of the custom configuration with one or more restrictions.

In some embodiments, the restrictions include enabling, disabling or regulating system components of the vehicle, enabling or disabling certain applications of the custom configuration, wherein the restrictions being updateable over a website that enables remote configuration and monitoring of the vehicle using cloud services over the Internet for the master account, the master account enabling one or more user accounts to be used on the vehicle, such that one or more custom configurations are usable on the vehicle during respective sessions.

In some embodiments, the predefined code is application programming interface (API) for communicating with at least one control interface of the system component.

In one embodiment a computer implemented method is provided. The method provides providing access to cloud services over the Internet for customizing a user interface of a vehicle; providing selection options to identify a vehicle type among a plurality of vehicle types, each vehicle type being associated with system components native to the vehicle type; identifying a plurality of applications available for the vehicle type, each of the applications provided with code for linking to at least one control interface of the system components; receiving selection of an application selected from the plurality of applications, the selection of the application being made so as to add an app interface for the application to the user interface of the vehicle; generating a custom configuration of the user interface for the vehicle type that includes system interfaces for some of the system components native to the vehicle type and the app interface for the application; saving the custom configuration to a user account in a database interfaced with the cloud services; and transferring the custom configuration to electronics of a vehicle from database, the custom configuration being defined to set a display of the vehicle to provide the user interface having the system interfaces along with the app interface, the method being executed by a processor.

The various embodiments may be embodied in computer readable media, which is saved in storage. The storage may be saved on cloud storage, data centers, or the like, which are accessible over the Internet. The access may be wired or wireless. In vehicles, the connection to the Internet may be wireless, and the connection can be continuous or non-continuous depending connection. Code on the vehicle electrons can execute at least some of the method operations when not connected and other operations are executed jointly between vehicle electronics (e.g., memory, code and processors of a vehicle) and cloud processing, which may implement one or more servers, either virtual or not.

It will be obvious, however, to one skilled in the art, that the present invention may be practiced without some or all of these specific details. In other instances, well known process operations have not been described in detail in order not to unnecessarily obscure the present invention. Some embodiments are defined by combining features from embodiments defined throughout the present application and materials incorporated by reference.

In some implementations, the learning and predicting embodiments may utilize learning and prediction algorithms that are used in machine learning. In one embodiment, certain algorithms may look to patterns of input, inputs to certain user interfaces, inputs that can be identified to biometric patterns, inputs for neural network processing, inputs for machine learning (e.g., identifying relationships between inputs, and filtering based on geo-location and/or vehicle state, in real-time), logic for identifying or recommending a result or a next input, a next screen, a suggested input, suggested data that would be relevant for a particular time, geo-location, state of a vehicle, and/or combinations thereof. In one embodiment, use of machine learning enables the vehicle to learn what is needed by the user, at a particular time, in view of one or more operating/status state of the vehicle, in view of one or more state of one or more sensors of the vehicle. Thus, one or more inputs or data presented to the user may be provided without an explicit input, request or programming by a user at that time. In one embodiment, reference is made to learning and prediction, wherein both terms may be referencing the same or similar function, e.g., looking at user interactions, preferences, tendencies, etc., in order to identify or select a particular type of data that may be useful for the user based on the learning or prediction. In other embodiments, learning may be defined closer to the traditional sense of machine learning, pattern learning, historical data input analysis, etc., while prediction is may be defined closer to the traditional sense of identifying some data, which is predicted to be relevant based on analysis of the context in which the data is predicted. In still other embodiments, prediction and learning may be hybrids, used in conjunction for providing contextually relevant supplemental content to a vehicle, user account, user device, or some target associated with a user account or profile.

Overtime, machine learning can be used to reinforce learned behavior, which can provide weighting to certain inputs. For instance, the more times a user turns on the windshield wipers when it is raining, and within two minutes of turning on the car, may signal that this patterns is likely to happen again. In another example, if a user stops to charge his vehicle at a particular charge station, which is 20 miles from his home, repeatedly on Tuesdays, at 6 pm, when nobody is a passenger in the vehicle, and the vehicle had less than 5% charge, may be used as a strong pattern that this may occur again in the future. This data, combined with other data, may be used to recommend data regarding the charge station in advance, so that the user need no look up the charge station to reserve a spot, or the like. It should be understood that these are just simplified examples to convey examples of recommendations which may be based on some learning, preferences or pattern analysis, or likelihoods.

Thus, context awareness across multiple dimensions will allow for more accurate predictions, learning (e.g., by building and refining behavior models), and surfacing/suggesting recommendations of supplemental content or settings, when it is most probable or likely or useful, or needed by the user or vehicle and user, or relevant at a current or proximate or near or destination geo-location.

For purposes of providing example ways of processing learning algorithms, machine learning methods, predictions, data analysis, and the like, without limitations to any specifically claimed embodiment, reference may be made to a book entitled "*Introduction to Machine Learning*", Second Edition, by Ethem Alpaydin, The MIT Press (ISBN 978-0-262-01243-0), Cambridge, Mass., London England (2010), which is herein incorporated by reference for all purposes.

In one embodiment, a display of a vehicle can include one or more displays. For example, a display screen of the vehicle may include any one or more of a main dashboard display, or a center console display, or a combined main dashboard and center console display, or a surface display, or a glass surface, or a windshield display, or a window display, or a touch surface display, or a headrest display, or a movable display, or a wireless display, or a wire-connected display, or combinations thereof.

In one embodiment, biometrics may be associated to the user account. The biometrics may be used to monitor use of the vehicle and determine if the custom user interfaces is to be enabled, or if a guest custom user interface is to be enabled, or if public custom user interface is to be enabled, or identify an interaction mode. The user account may include profile data defining when particular custom user interfaces are to be enabled or interactions modes are to be used. The biometrics may include one or more of image data of a driver's face, a passenger's face, a finger print, a retina scan, a signature, a gesture, a user input, a login, a key, a paring device, or combinations of two or more thereof.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the description and claims.

The invention claimed is:

1. A method, comprising,
    receiving, by a server, geo-locations of a vehicle;
    receiving, by the server, heading direction of the vehicle based on changes in the geo-locations of the vehicle;
    receiving, by the server, sensor data for a surrounding area of the vehicle;
    receiving, by the server, state information from a connected object that is located within an area of influence associated with a current geo-location of the vehicle, wherein the connected object is independent of the vehicle, wherein the state information from the connected object is utilized for when the current geo-location of the vehicle is within the area of influence; and
    sending, by the server, an alert to the vehicle for processing during a time when the vehicle is at the current geo-location, the alert being sent after determining that the state information from the connected object changed while the current geo-location of the vehicle remains substantially unchanged for a threshold period of time after the state information changed, the method being executed by a processor.

2. The method of claim 1, further comprising,
    receiving state information from additional connected objects that are within the area of influence of the current geo-location of the vehicle; and
    identifying which of the connected object or one of the additional connected objects is a primary connected object to be used for determining that the state information changed, wherein the processing by the server is by a remote server that is accessible over a wireless connection of the vehicle or by a local server that is part of or is interfaced with on-board electronics of the vehicle, or a combination of said remote server and said local server.

3. The method of claim 2, wherein the primary connected object is identified based at least in part on the heading direction and current geo-location of the vehicle.

4. The method of claim 1, wherein the alert is one of a notification to a computer of the vehicle, or a notification to a user device located in the vehicle, or a combination thereof.

5. The method of claim 1, wherein the alert includes instructions communicated to a device of a passenger of the vehicle, the instructions directing activation of tactile feedback to the device of the passenger as an indication that the state information changed.

6. The method of claim 1,
    wherein the connected object has an independent connected identity, the connected object being in communication with the server and a network of one or more servers and storage, the storage is configured to store data received from the connected object including the state information and changes to the state information;
    wherein state information and the changes to the state information of the connected object are received by a cloud services server that is connectable to the server, the server being part of the vehicle or remote from the vehicle.

7. The method of claim 1, wherein the connected object is one of another car, or a sensor, or a building, or a road sensor, or a traffic light, or a traffic metering sensor, or a global positioning system device, or a stationary device, or a moving device, or an intersection sensor, or a camera, or a motion sensor, or a radar sensor, or multiple traffic lights, or multiple cars, or a connected device, or an internet connected device, or a light post, or a light, or combinations thereof.

8. The method of claim 1, wherein the received sensor data for a surrounding area of the vehicle is defined by one or more of motion sensors of the vehicle, or one or more cameras of the vehicle, or radar sensors of the vehicle, or biometric sensors of the vehicle, or weight sensors of the vehicle, or temperature sensors of the vehicle, or climate sensors of the vehicle, or tire sensors of the vehicle, or brake sensors of the vehicle, or seat sensors of the vehicle, or occupancy sensors of the vehicle, or user identification sensors of the vehicle, or passenger sensors of the vehicle, or pedestrian sensors around the vehicle, or object sensors around the vehicle, or combinations thereof.

9. The method of claim 1, wherein the heading direction obtained by processing the changes in geo-location of the vehicle identify a direction of travel, and wherein in the area of influence, a plurality of connected objects are identified, the method further comprising, identifying, from the plurality of connected objects, stationary connected objects and non-stationary connected objects;

filtering stationary connected objects in the area of influence to exclude connected objects that are not in the direction of travel; and selecting the connected object based on the connected object being a stationary object and based on being in the direction of travel.

10. The method of claim 1, wherein the heading direction obtained from the changes in geo-location of the vehicle identify a direction of travel, and wherein the direction of travel is periodically updated using changes in the geo-location of the vehicle, and/or turn signal indicator data, and/or steering direction changes, and/or mapped direction data.

11. The method of claim 1, wherein the alert further includes control information for causing one or more of, a change in state of operation of a user interface of the vehicle; and a change in state of operation of a user device within a driver control zone of the vehicle.

12. The method of claim 11, wherein when the alert is indicative that active driving should resume, the change in state of operation includes one of a disabling, fading or reduction in function of content accessible or apps usable via the user interface of the vehicle or a user interface of the user device within a driver control zone within the vehicle.

13. The method of claim 1, wherein receiving sensor data for a surrounding area of the vehicle includes processing sensor data from sensors of the vehicle and/or sensor data of other co-located vehicles and/or sensor data of connected objects within the area of influence to the vehicle.

14. The method of claim 1, wherein the alert further includes or is data that is used to set a color indicator on a screen of the vehicle or a screen of a device within the vehicle, the color indicator being a color of a traffic light, the traffic light being the connected object;

wherein updates to the data used to set the color indicator are received such that the color indicator changes when or after the color of the traffic light changes.

15. The method of claim 14, wherein when the color indicator changes to red or stop, a reduction in functional operation of certain applications or content of the screen of the vehicle and/or the screen of the device is processed.

16. A method, comprising, receiving, by a server, geo-locations of a vehicle;

receiving, by the server, heading direction of the vehicle based on changes in the geo-locations of the vehicle;

receiving, by the server, state information from a connected object that is located within an area of influence associated with a current geo-location of the vehicle, wherein the connected object is independent of the vehicle; and sending, by the server, an alert to the vehicle for processing during a time when the vehicle is at the current geo-location, the alert being sent after determining that the state information from the connected object changed while the current geo-location of the vehicle remains substantially unchanged for a threshold period of time after the state information changed;

wherein the alert includes instructions for enabling tactile feedback to be applied by a portion of the vehicle, such that the tactile feedback provides an indication that the state information changed for the connected object;

wherein the tactile feedback is applied when the state information changed or after a period of time passes from when the state information changed.

17. The method of claim 16, wherein the connected object is one of another car, or a sensor, or a building, or a road sensor, or a traffic light, or a traffic metering sensor, or a global positioning system device, or a stationary device, or a moving device, or an intersection sensor, or a camera, or a motion sensor, or a radar sensor, or multiple traffic lights, or multiple cars, or a connected device, or an internet connected device, or a light post, or a light, or combinations thereof;

and further receiving sensor data for a surrounding area of the vehicle, the sensor data is defined by one or more of motion sensors of the vehicle, or one or more cameras of the vehicle, or radar sensors of the vehicle, or biometric sensors of the vehicle, or weight sensors of the vehicle, or temperature sensors of the vehicle, or climate sensors of the vehicle, or tire sensors of the vehicle, or brake sensors of the vehicle, or seat sensors of the vehicle, or occupancy sensors of the vehicle, or user identification sensors of the vehicle, or passenger sensors of the vehicle, or pedestrian sensors around the vehicle, or object sensors around the vehicle, or combinations thereof.

18. The method of claim 16, wherein the processing by the server is by a remote server that is accessible over a wireless connection of the vehicle or by a local server that is part of or is interfaced with on-board electronics of the vehicle, or a combination of said remote server and said local server.

19. The method of claim 16, wherein the heading direction is obtained by processing the changes in geo-location of the vehicle to identify a direction of travel, and wherein in the area of influence, a plurality of connected objects are identified, the method further comprising, identifying, from the plurality of connected objects, stationary connected objects and non-stationary connected objects;

filtering stationary connected objects in the area of influence to exclude connected objects that are not in the direction of travel; and selecting the connected object from among a plurality of connected objects in the area of influence based on the connected object being a stationary object and based on being in the direction of travel.

20. A method, comprising, identifying geo-locations of a vehicle;

identifying heading direction of the vehicle based on changes in the geo-locations of the vehicle;

receiving state information from a connected object that is located within an area of influence associated with a current geo-location of the vehicle; and processing an alert for the vehicle during a time when the vehicle is at the current geo-location, the alert being sent after determining that the state information from the connected object changed while the current geo-location of the vehicle remains substantially unchanged for a threshold period of time after the state information changed;

wherein the alert further includes control information for causing one or more of, a change in state of operation of a user interface of the vehicle or a change in state of operation of a user device within the vehicle, the alert is indicative that active driving should resume, the change in state of operation includes one of a disabling, fading or reduction in function of content accessible or apps usable via the user interface of the vehicle or a user interface of the device within in the vehicle;

wherein the connected object is independent of the vehicle and has an independent connected identity, the connected object further being in communication with a network of one or more servers and storage, the storage is configured to store data received from the connected object including the state information and changes to the state information;

wherein the method is executed at least in part by an on-board computer of the vehicle.

21. The method of claim 20, wherein the heading direction is obtained by processing the changes in geo-location of the vehicle to identify a direction of travel, and wherein in the area of influence, a plurality of connected objects are identified, the method further comprising, identifying, from the plurality of connected objects, stationary connected objects and non-stationary connected objects;

filtering stationary connected objects in the area of influence to exclude connected objects that are not in the direction of travel; and selecting the connected object from among a plurality of connected objects in the area of influence based on the connected object being a stationary object and based on being in the direction of travel.

* * * * *